United States Patent [19]

Hashizume et al.

[11] Patent Number: 5,592,258
[45] Date of Patent: Jan. 7, 1997

[54] FILM TRANSPORTING APPARATUS AND FILM PROCESSING SYSTEM USING THE SAME

[75] Inventors: Keiji Hashizume, Kainan; Junichi Owaki, Wakayama; Yasuhito Tauchi, Wakayama; Kohji Seki, Wakayama, all of Japan

[73] Assignee: Noritsu Koki Co., Ltd., Wakayama-ken, Japan

[21] Appl. No.: 342,833

[22] Filed: Nov. 21, 1994

[30] Foreign Application Priority Data

| Nov. 22, 1993 | [JP] | Japan | 5-292064 |
| Nov. 22, 1993 | [JP] | Japan | 5-292065 |
| Nov. 22, 1993 | [JP] | Japan | 5-292066 |
| Sep. 13, 1994 | [JP] | Japan | 6-219031 |
| Sep. 13, 1994 | [JP] | Japan | 6-219032 |
| Sep. 13, 1994 | [JP] | Japan | 6-219033 |

[51] Int. Cl.⁶ ................................ G03B 27/52
[52] U.S. Cl. ................ 355/41; 355/50; 355/75
[58] Field of Search ................ 355/41, 40, 50, 355/75

[56] References Cited

U.S. PATENT DOCUMENTS

| 3,658,223 | 4/1972 | Bergly | 226/33 |
| 4,727,399 | 2/1988 | Matsumoto | 355/41 |
| 4,736,228 | 4/1988 | Ito | 355/75 |
| 4,922,289 | 5/1990 | Kogane | 355/41 X |
| 4,933,713 | 6/1990 | Tsuji et al. | 355/41 |
| 4,933,716 | 6/1990 | Imamura et al. | 355/75 |
| 4,994,850 | 2/1991 | Imamura et al. | 355/41 |
| 4,996,555 | 2/1991 | Takemoto et al. | 355/44 |
| 5,038,167 | 8/1991 | Suzuki | 355/41 |
| 5,119,126 | 6/1992 | Tokuda | 355/41 |
| 5,157,437 | 10/1992 | Takenaka | 355/41 |
| 5,214,468 | 5/1993 | Seto | 355/41 |
| 5,253,011 | 10/1993 | Zahn | 355/41 |
| 5,257,066 | 10/1993 | Hicks | 355/75 |
| 5,285,235 | 2/1994 | Frick | 355/41 |
| 5,289,230 | 2/1994 | Hosoya et al. | 355/50 |
| 5,343,272 | 8/1994 | Hicks | 355/75 |
| 5,369,463 | 11/1994 | Terashita et al. | 355/38 |
| 5,424,555 | 6/1995 | Kimura et al. | 355/41 X |
| 5,432,586 | 7/1995 | Tokuda | 355/41 |

FOREIGN PATENT DOCUMENTS 0516055  2/1992  European Pat. Off. .

*Primary Examiner*—R. L. Moses
*Attorney, Agent, or Firm*—Felfe & Lynch

[57] ABSTRACT

A film transporting apparatus for a film processing system. The apparatus includes a pair of frame members pivotably connected to each other to be opened and closed, a transport mechanism provided to each of the frame members and operable to transport a film along a predetermined film transport passage when the frame members are closed, an optical sensor for detecting film information including a light emitting portion provided in one of the frame members and a light receiving portion provided in the other frame member, positioning engaging portions provided respectively to the frame members and coming into engagement with each other in association with a pivotal movement of the frame members to a closed state. The apparatus further includes a movable frame member movably provided to one of the frame members. This movable frame member supports the positioning engaging portions and the light emitting portion or the light receiving portion and allows relative movement between the positioning engaging portions provided respectively to the pair of frame members.

24 Claims, 30 Drawing Sheets

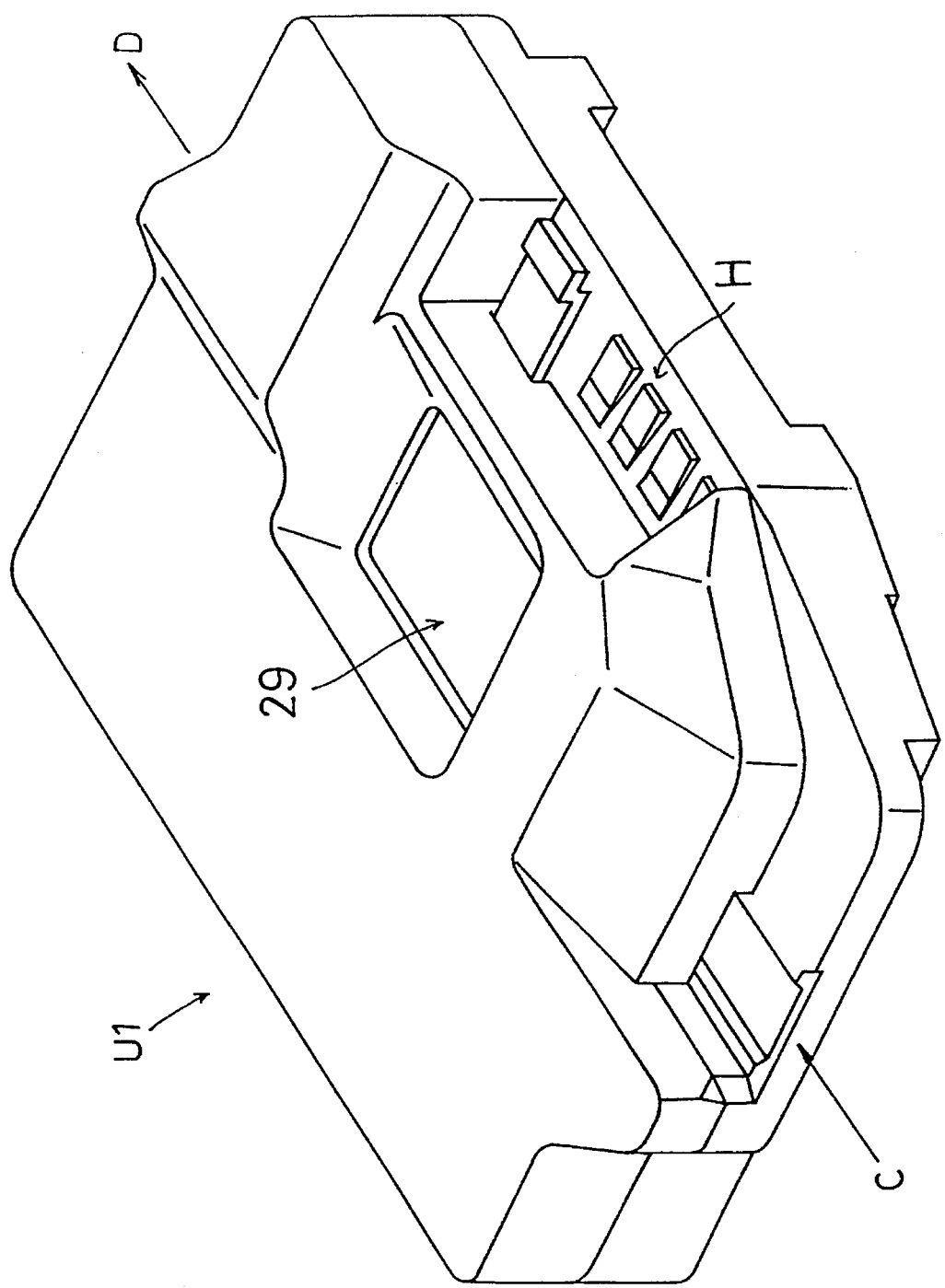

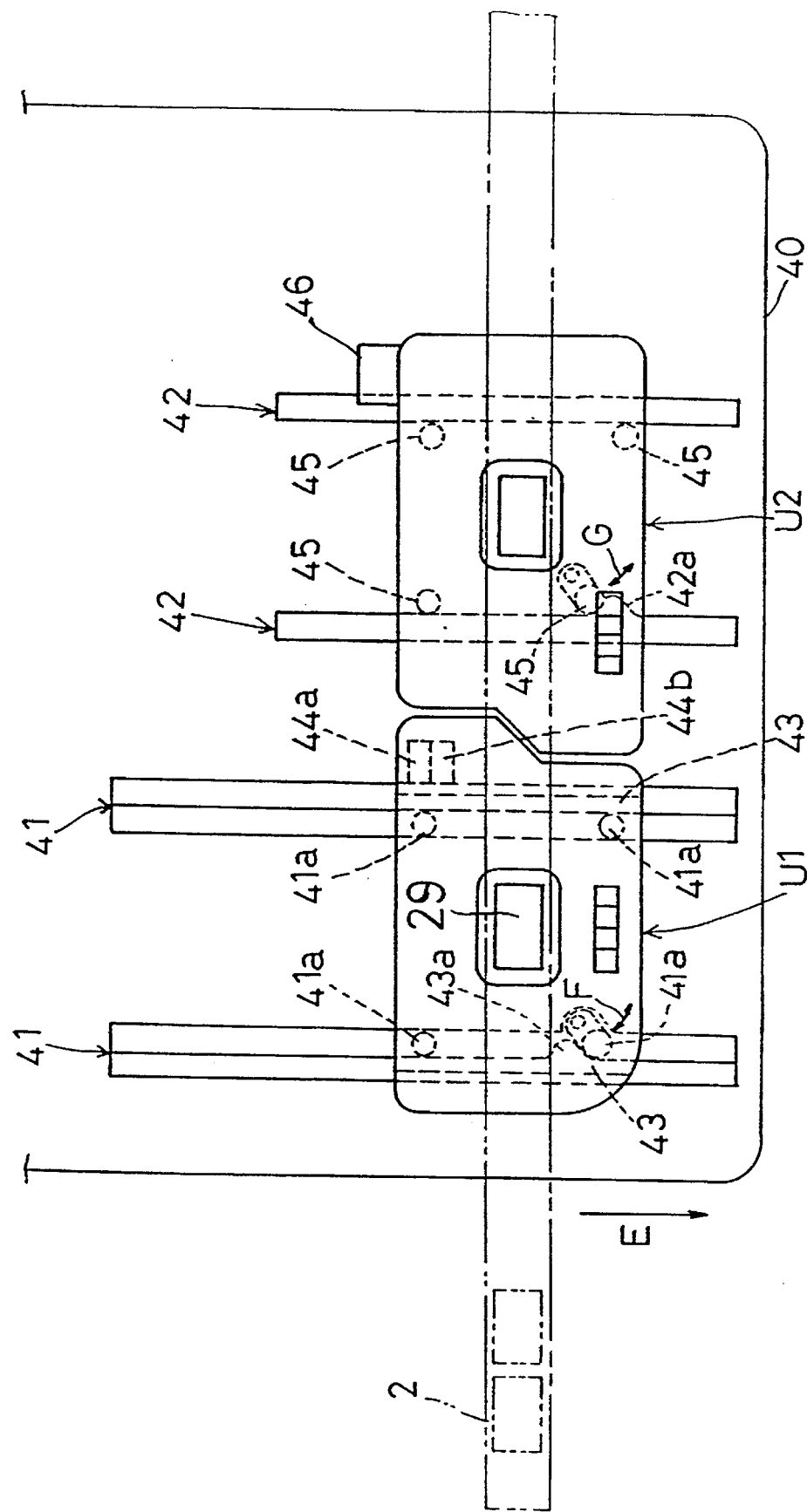

FILM TRANSPORTING APPARATUS AND FILM PROCESSING SYSTEM USING THE SAME

BACKGROUND OF THE INVENTION

1. Field of the Invention

The present invention a film transporting apparatus for a film processing system and a film processing system using the apparatus, and more particularly to a film transporting apparatus including a pair of frame members pivotably connected to each other to be opened and closed, transport means provided to each of the frame members, a light emitting portion provided in one of the frame members, a light receiving portion provided in the other frame member and constituting an optical sensor together with the light emitting portion and positioning engaging portions provided respectively to the frame members and coming into engagement with each other in association with a pivotal movement of the frame members to a closed state, and the invention relates also to a film processing system using a film transporting apparatus of the above-described type.

2. Description of the Related Art

With the above film transporting apparatus, as used in a film processing system such as a photographic printing system for printing an image recorded on a film onto a print paper, the apparatus functions to transport the film while detecting film image information such as a DX code identifying a type of the film, or a position of a perforation by means of a light-transmission type optical sensor.

A typical conventional construction of a film transporting apparatus is shown in FIGS. 41 and 42. In this, in order to facilitate e.g. a cleaning operation of a film transport passage, a pair of frame members 100, 101 are pivotably interconnected to each other to be opened and closed. These frame members 100, 101 respectively include guides 100a, 101a acting as transport means. Then, as illustrated in FIG. 42, the film is transported when the pair of frame members 100, 101 are closed.

The frame members 100, 101 respectively include either a light emitting portion 102a or a light receiving portion 102b of an optical sensor 102 for detecting film information. When the frame members 100, 101 are closed, the light emitting portion 102a and the light receiving portion 102b together constituting the optical sensor and disposed in opposition other must be precisely fixed in position relative to each other.

In this respect, when the frame members 100, 101 are closed, positioning engaging portions 103a, 103b come into engagement with each other to effect the above-described positioning. However, since the frame members 100, 101 are pivoted relative to each other to be opened and closed, in order to prevent the positioning engaging portions 103a, 103b from being locked to each other in the middle of the pivotal stroke, the engaging portions are provided with some dimensional play as shown in FIG. 42 (in particular, the engaging portions 103a comprising recesses are formed slightly larger than the other engaging portions 103b comprising projections).

Accordingly, since the frame members 100, 101 may be displaced slightly relative to each other, such displacement leads to mutual displacement of the light emitting and receiving portions 102a, 102b of the optical sensor 102 as well.

With occurrence of such displacement, there occurs reduction in the amount of light to be received by the light receiving portion 102b. Then, adjustment of a processing circuit for processing an output signal from the light receiving portion must be adjusted. Alternatively, after the closure of the frame members 100, 101, the positions of these frame members 100, 101 must be adjusted relative to each other with monitoring the output signal from the light receiving portion 102b. As a result, maintenance and handling of this film transporting apparatus tends to be troublesome.

Regarding to the above-described problem, in place of those shapes shown in FIG. 41, the positioning engaging portions 103a, 103b may be shaped differently, such as arcuate configurations precisely following the pivotal path of the frame members 100, 101, thereby to reduce the dimensional play between the positioning engaging portions 103a, 103b. However, it requires a technical skill of great precision to form the positioning engaging portions 103a, 103b of such shapes in the pair of frame members 100, 101. Hence, the manufacture of the members tends to be troublesome and costly.

The present invention attends to the above-described state of the art. A primary object of the present invention is to provide an improved film transporting apparatus which allows easier manufacture and positioning and a film processing system using this film transporting apparatus.

SUMMARY OF THE INVENTION

In order to achieve the above-noted object, a film transporting apparatus for a film processing system, according to the present invention comprises:

a pair of frame members pivotably connected to each other to be opened and closed;

transport means provided to each of the frame members and operable to transport a film along a predetermined film transport passage when said frame members are closed;

an optical sensor for detecting film information including a light emitting portion provided in one of the frame members and a light receiving portion provided in the other frame member;

positioning engaging portions provided respectively to the frame members and coming into engagement with each other in association with a pivotal movement of the frame members to a closed state; and a movable frame member movably provided to one of said frame members, said movable frame member supporting said positioning engaging portions and said light emitting portion or said light receiving portion, said movable frame member allowing relative movement between said positioning engaging portions provided respectively to said pair of frame members.

According to the above construction, as the pair of frame members of the film transporting apparatus are being pivoted to be closed, the positioning engaging members provided to the respective frame members are moved closer to each other as well.

One of the positioning engaging members provided respectively to the pair of frame members is supported to the movable frame member together with either the light emitting portion or light receiving portion of the optical sensor. Thus, even if these engaging members come into contact with such postures that the members will not engage each other as they are, a subsequent engagement therebetween is enabled and assured by a relative movement of the movable frame member supporting one of the positioning engaging members.

Thus, even if the dimensional play, i.e. a mechanical looseness, to be provided between the positioning engaging members of the respective frame members under the closed state thereof is reduced sufficiently for the purpose of restricting the displacement between the light emitting and receiving portions of the optical sensor, the positioning engaging members may come into engagement with each other in a reliable manner with requiring any special adjustment operation.

As a result, by simply providing the movable frame member capable of relative movement, the positioning engaging members may come into engagement with each other in a reliable manner with requiring any special adjustment operation. Consequently, the invention has achieved its primary object of providing an improved film transporting apparatus for a film processing system, which apparatus allows easier manufacture and positioning.

According to one aspect of the present invention, the transport means provided to the frame member attached with the movable frame member is also supported to the movable frame member.

With this construction, the movable frame member also supports the transport means. Then, when the pair of frame members are closed, the transport means provided to the respective frame members too may be properly fixed in position relative to each other.

As a result, since the transport means provided to the respective frame members too may be properly fixed in position, the film transport apparatus for a film processing system having this construction will be even more convenient.

According to a further aspect of the present invention, in the film transporting apparatus of the above type, the light emitting portion and the light receiving portion are disposed on one side and the other side of the film at positions facing perforation portions of the film to be transported by the transport means, so that the transportation of the film is controlled with detecting movement of perforations based on an output signal from the light receiving portion.

This construction is advantageous for allowing precise control of a film transport amount.

According to a still further aspect of the present invention, on an optical path extending between the light receiving portion and the light emitting portion and between the light receiving portion and the film face, there is interposed a lens having an aperture angle thereof restricted in such a manner as to allow passage of only a portion of the light beam traveling through the perforation portions of the film toward the light receiving portion.

With the above-described construction, between the light receiving portion and the film face, there is interposed a lens having an aperture angle thereof restricted in such a manner as to allow passage of only a portion of the light beam traveling through the perforation portions of the film toward the light receiving portion. Thus, any light which is incident to this lens with an angle greater than the restricted aperture angle can not reach the light receiving face. That is to say, the construction provides the same effect as provided when the beam of the light emitting portion is constricted.

As a result, in comparison with the afore-described convention, it becomes possible to obtain a steeper change in the waveform of the output signal transmitted from the light receiving portion in the vicinity of the edges of the perforations, so that the perforation edges may be detected with higher precision.

According to a still aspect of the present invention, said lens comprises a rod type lens to allow an image of the film face to be formed on the light receiving portion.

With the above construction, the film face is imaged on the light receiving portion by means of the rod type lens, i.e. the transmission light on the film surface is imaged on the light receiving face.

As a result, even if the light receiving face of the light receiving portion is reduced to form the light receiving portion more compact, the light beam on the film face where the perforations are present may be received with high precision on the light receiving face.

According to a still further aspect of the present invention, said light receiving portion, said light emitting portion and said lens are disposed within an integral processing unit including said transport means and an opening for processing the film.

With the above construction, the processing unit accommodates therein the device for detecting the film perforations together with drive rollers for transporting the film.

As a result, such unit may be readily attached to e.g. a photographic printer.

According to a still further aspect of the present invention, a binary signal is generated by comparing the output signal from the light receiving portion with a reference signal and the perforation edge is detected based on said binary signal.

With the above construction, is is possible to compare the waveform of the output signal transmitted from the light receiving portion in the vicinity of the perforation edge with the reference signal.

As a result, through the comparison between the waveform of the output signal transmitted from the light receiving portion in the vicinity of the perforation edge with the reference signal, and then based on a rising portion or a dropping portion in the waveform of the binary output signal, the perforation edge may be detected. Thus, even when there is variation in the density of the film portion where the perforation is present, the perforation edge may be detected in a proper and reliable manner.

According to a still further aspect of the present invention, said film processing system comprises a photographic printing system including a film transporting apparatus as set forth in the appended claim 1.

Preferably, the photographic printing system includes a scanner-section film transport unit for transporting the film in a scanner section for detecting the image information of the film and an exposure-section film transport unit provided separately from said scanner-section film transport unit and adapted for transporting the film in an exposure section for exposing the film image information onto a photosensitive material, wherein said scanner-section film transport unit and said exposure-section film transport unit are independently switchable between a set state where said either film transport unit is set to a film transporting position thereof and a retracted state where said film transport unit is retracted away from said film transporting position.

With the above construction, in effecting an exposure operation of a film of a size transportable by the scanner-section film transport unit and the exposure-section film transport unit, these two film transport units are set to the set states for the film transports, and a reading operation of the film image information is effected in the scanner section and an exposure operation is effected in the exposure section.

On the other hand, in effecting an exposure operation of a film of a size which can not be transported by the two transport units, the two transport units are set to the retracted states where the units are retracted to the positions thereof away from the film transporting positions in the scanner section and the exposure section.

As a result, in the scanner section and the exposure section, a portion of a reading optical path in the scanner section and a portion of an exposing optical path in the exposure section are opened.

Then, by positioning the film to be exposed at these opened portions of the optical paths; in the scanner section the film image information is read, and in the exposure section an exposure operation is effected based on exposure conditions determined based on the read image information.

Further, the scanner-section film transport unit and the exposure-section film transport unit are provided as two separate units which may be set to the retracted state independently of each other.

Therefore, even if the scanner section and the exposure section are disposed in the vicinity of each other, such an operation is possible, for instance, that with retracting only the scanner unit alone the operator freely sets the exposure conditions without using the function of the scanner section and the film is exposed in the exposure section under these conditions while being transported by the exposure-section film transport unit.

As a result, by the simple construction of rendering the two transport units switchable between the set states and the retracted states, the scanner section and the exposure section may cope not only with those sizes of film transportable by the two transport units but with the other sizes of films which are not transportable by the transport units. Further, when the function of the scanner section is not used, the exposure section alone may be used independently. Thus, the present invention provides a photographic printing system which allows its components to function properly and independently depending on a particular kind of usage.

According to a still further aspect of the present invention, said exposure-section film transport unit may be set to the film transporting position either with a posture for transporting the film in a direction identical to a film transporting direction of said scanner-section film transport unit or with a further posture for transporting the film in a direction transverse to the film transporting direction of said scanner-section film transport unit.

With the above construction, the exposure-section film transport unit may be set to the film transporting position either with a posture for transporting the film in a direction identical to a film transporting direction of said scanner-section film transport unit or with a further posture for transporting the film in a direction transverse to the film transporting direction of said scanner-section film transport unit. Then, in the case of the posture for transporting the film in the direction identical to the film transporting direction of the scanner-section film transport unit, the film transport operation in the scanner section and the film transport operation in the exposure section may be effected in series.

On the other hand, when the exposure-section film transport unit is set to the posture for transporting the film in the direction transverse to the film transporting direction of the scanner-section film transport unit, the film transport direction in the exposure section is set transverse to the above-described direction.

With this, it becomes possible for the system to cope with an exposure of e.g. a half-size film frame which has different vertical and lateral frame directions than the standard full-size film frame.

As a result, with the additional capability of coping with exposure of e.g. the half-size film frame, the photographic printing system with this feature will be move convenient.

According to a still further aspect of the present invention, an auxiliary unit including a film holder and a guide frame for guiding the film holder selectively to either the scanner section or the exposure section may be set to said film processing system when said two film transport units are retracted to the respective retracted states.

With the above construction, by setting the scanner-section film transport unit and the exposure-section film transport unit to the respective retracted states, the auxiliary unit may be set to the system.

After setting the auxiliary unit, the film is charged to the film holder of the auxiliary unit and first the image information of the film is read by positioning the film holder in the scanner unit. Next, the film holder is moved along the guide frame to be positioned in the exposure section, where an exposure operation of the film is effected under exposure conditions determined based on the read image information of the film.

That is to say, the movement of the film from the scanner section to the exposure section may be effected simply by moving the film holder along the guide frame.

As a result, in effecting an exposure operation of a film can not be transported by the scanner-section film transport unit and the exposure-section film transport unit, the movement of the film from the scanner section to the exposure section may be effected simply by moving the film holder along the guide frame, so that the exposure operation may be effected easily and the photographic printing system with this construction will be even more convenient.

According to a still further aspect of the present invention, in a film processing system including film transport means for transporting a film to a position where a frame of the film is processed and film processing means for effecting a detecting or printing operation of image information of the film by irradiating the frame located at the processing position with a light source;

wherein an index for indicating a proper position of the frame located at said processing position in a film transport direction is disposed out of an optical path from said light source through said frame to a light receiving portion and in such a condition as to allow a visual confirmation thereof together with said frame located at said processing position as viewed from the outside said optical path to said processing position.

With the above-described construction, when the operator sees the processing position after the film frame is transported and stopped at this processing position, both the index indicating the proper position of the film frame in the film transport direction and the film frame come within the range of view of the operator. With this, the operator may judge whether the film frame is stopped at the proper position or not.

That is to say, through the direct observation of the film frame whose stop position needs to be confirmed, the operator may judge whether this stop position is proper or not.

Needless to say, as the index used for the judgment is disposed outside the optical path from the light source irradiating the. processing position to the light receiving portion, this index does not obstruct the processing to be effected by the processing means. Further, since the index and the frame located at the processing position may be confirmed when the processing position is viewed from the outside the optical path, the operator may be free from such a trouble to locate his/her eyes into the optical path and he/she may effect the confirmation easily from the outside the optical path.

As a result, for the film frame located at the processing position as the target, the proper position of this frame relative to the film transport direction may be confirmed, so that the visual confirmation may be effected precisely. Moreover, since the judgment whether the frame located at the processing position is proper or not may be effected by viewing the processing position outside the optical path extending from the light source through the frame to the light receiving portion, this visual confirmation may be effected very easily. In addition, the original light source for irradiating the processing position may be utilized also as a light source for the observation, the construction may be simple. Thus, the invention provides an improved film processing system which allows a film frame to be stopped at the processing position with high precision and which allows the visual confirmation by a simple construction.

According to a still further aspect of the present invention, the film processing system is rendered capable of processing films having different frame lengths relative to the film transport direction, and said index includes a first index portion for a film having a long frame length relative to the film transport direction, said first index portion being positioned closer to said light receiving portion than to said film frame located at said processing position and covering the film and including an opening through which said frame is exposed and a second index portion for a further film having a short frame length relative to the film transport direction, said second index portion being positioned closer to said light source than to said film frame located at said processing position and allowing a visual confirmation thereof through said opening with said frame in an overlapping manner.

With the above construction, the system may cope with films having different frame lengths relative to the film transport direction. And, this system is provided with the index portions for both the film having a long frame length and the further film having a short frame length so as to indicate the proper position.

The first index portion acting as the index for the film having a long frame length relative to the film transport direction is so constructed as to cover the film and with the opening through which the frame is exposed. Then, by seeing whether the film frame is properly located within the opening or not, the operator may visually confirm whether the film frame is properly located at the processing position or not.

The second index portion as the index for the further film having a short frame length relative to the film transport direction is positioned closer to the light source than to the frame located at the processing position, and so constructed to as allow its visual confirmation with the frame in an overlapping manner. Then, the operator may judge whether the film frame is properly located at the processing position or not while observing the overlapped condition of the film frame and this second index portion.

As a result, any displacement of the film frame may be readily found also for films having different frame lengths relative to the film transport direction. Thus, the film processing system with this feature will be even more convenient.

According to a still further aspect of the present invention, the film processing system further comprises opening varying means for varying the dimension of an opening of an exposure opening for exposing the film frame located at an exposure printing position.

With the above construction, when frames of different sizes such as a full size and a panoramic size are present in a mixed state within a single roll of film, the opening dimension of the exposure opening may be variably adjusted according to the size of the frame, so that the printing exposure operation of the film roll may be effected properly.

According to a still further aspect of the present invention, said opening varying means includes a first light shielding member pivotable about a first axis extending parallel to a film transport surface, a first gear rotatable with said first light shielding member, a second light shielding member pivotable about a second axis extending parallel to said first axis, a second gear rotatable with said second light shielding member and meshing with said first gear and drive means to be connected to said first light shielding member, so that said opening dimension is varied with drive of said drive means.

With this construction, as the first light shielding member is driven through the direct meshing of the pair of gears rotatable respectively with the first and second light shielding members, the first and second light shielding members are pivoted in opposite directions.

As a result, since the first and second light shielding members are pivoted in the opposite directions in association with the direct meshing of the pair of gears rotatable respectively with the first and second light shielding members, the construction can eliminate an idle gear which was required by the conventional construction. Hence, the construction of the opening varying means may be more simple and the costs of the entire system may be further reduced.

According to a still further aspect of the present invention, the first light shielding member and the second shielding member are driven in such a manner as to switch the opening dimension between a first opening dimension having a predetermined area and a second opening dimension having an area smaller than said first opening dimension; and When the opening dimension is switched to said second opening dimension, a first contact portion provided to said first light shielding member and a second contact portion provided to said second light shielding member come into contact with each other to determine the magnitude of said second opening dimension.

With this construction, the second opening dimension is determined by the contact between the first contact portion provided to the first light shielding member and the second contact portion provided to the second light shielding member.

As a result, since the second opening dimension is determined by the contact between the first contact portion provided to the first light shielding member and the second contact portion provided to the second light shielding member, this construction, although simple, may provide higher precision of the opening dimension in comparison with e.g. a further construction in which the second opening dimension is determined by providing a stationary frame with a positioning element which comes into contact with the light shielding members.

According to a still further aspect of the present invention, the first light shielding member and the first gear are formed integrally to each other and the second light shielding member and the second gear are formed integrally to each other.

With the above construction, since the first light shielding member and the first gear are formed integrally to each other and the second light shielding member and the second gear are formed integrally to each other, it becomes possible to reduce the number of members in comparison with a further construction in which the gears and the shielding members are provided separately from each other.

According to a still further aspect of the present invention, the first light shielding member and the second light shielding member are formed of a same material.

With the above construction, since the first light shielding member and the second light shielding member are formed of a same material, it becomes possible to even further reduce the number of components.

According to a still further aspect of the present invention, said first axis and said second axis are disposed away from said film transport surface and an inter-axial distance between said first axis and said second axis is set shorter than a shorter dimension of said opening.

With the above construction, since the first and second axes are disposed as described above, in driving the light shielding members to provide a desired second opening dimension, it becomes possible to reduce the pivotal angle of the shielding members, in particular smaller than 90 degrees.

As a result, because of the reduced pivotal angle of the light shielding members, the energy required for driving the same may be small also. Hence, a small drive means requiring a very limited disposing space may be used. Consequently, the entire system may be formed compact.

According to a still further aspect of the invention, a film processing system comprises: a film transporting apparatus as set forth in the appended claim 1; film transport means for transporting a film so as to located a film frame at a processing position; film processing means for detecting or printing image information of the film by irradiating the film frame located at the processing position with a light source;

a first film stop position confirming portion for indicating, at said processing position, a proper position of an edge portion of the film frame extending normal to a transporting direction of the film; and a second film stop position confirming portion for indicating, at a position apart by a predetermined distance from said first film stop position confirming portion in the film transporting direction, an edge portion of a film frame other than said frame located at said processing position, said edge portion extending normal to the film transporting direction.

According to the above construction, when a film frame is transported and stopped at the processing position, this stop of the film may be confirmed by the first film stop position confirming portion disposed at the processing position and may be confirmed also by the second film stop position confirming portion. That is, the stop position of the film may be confirmed at a plurality of positions of the processing system.

As a result, if a film frame having an ambiguous edge portion is stopped at the first film stop position confirming portion thereby making the confirmation difficult, the film stop may be properly confirmed by using the second film stop confirming portion. Thus, this construction can avoid total disability of film stop confirmation, and the stop position of the film at the processing position may be confirmed in a reliable and precise manner.

Preferably, the system further comprises introducing means for introducing the irradiation light from the light source to said second film stop position confirming portion.

With the above construction, the irradiation light from the light source is utilized not only for irradiating the frame located at the processing position but also for irradiating the second film stop position confirming portion.

As a result, since the light source provided originally for such processes as detection or printing of the film image information may be utilized also for the confirmation of the film stop, there is no necessity of providing a further light source especially for the film stop position confirming portions. Hence, the number of components may be smaller than a further construction where a further light source dedicated for said purpose is provided, so that the entire costs of the system may be advantageously reduced.

According to a still further aspect of the present invention, the system further comprises a mirror tunnel for uniformly mixing the irradiation light from the light source and irradiating the frame located at the processing position, and said introducing means guides a portion of said irradiation light from said mirror tunnel to said second film stop position confirming portion.

With the above construction, in addition to the function and effects of the above-described feature, confirmation of the stop of the film frame at said first film stop position confirming portion and said second film stop position confirming portion may be effected by utilizing the uniformly mixed light through the mirror tunnel from the light source.

As a result, since the uniformly mixed light is introduced to the first and second film stop position confirming portions, the visual confirmation of the film stop may be facilitated.

Further and other objects, features and effects of the invention will become more apparent from the following more detailed description of the embodiments of the invention with reference to accompanying drawings.

BRIEF DESCRIPTION OF THE DRAWINGS

FIG. 11 is a perspective view of the major portions of the embodiment of FIG. 1, FIG. 12 is a plane view of the major portions of the embodiment of FIG. 1, FIGS. 13(a), (b) are section views of the major portions of the embodiment of FIG. 1.

DESCRIPTION OF THE PREFERRED EMBODIMENTS

A photographic printing system relating to a first embodiment of the present invention will be described in details with reference to the accompanying drawings.

Figure 1:
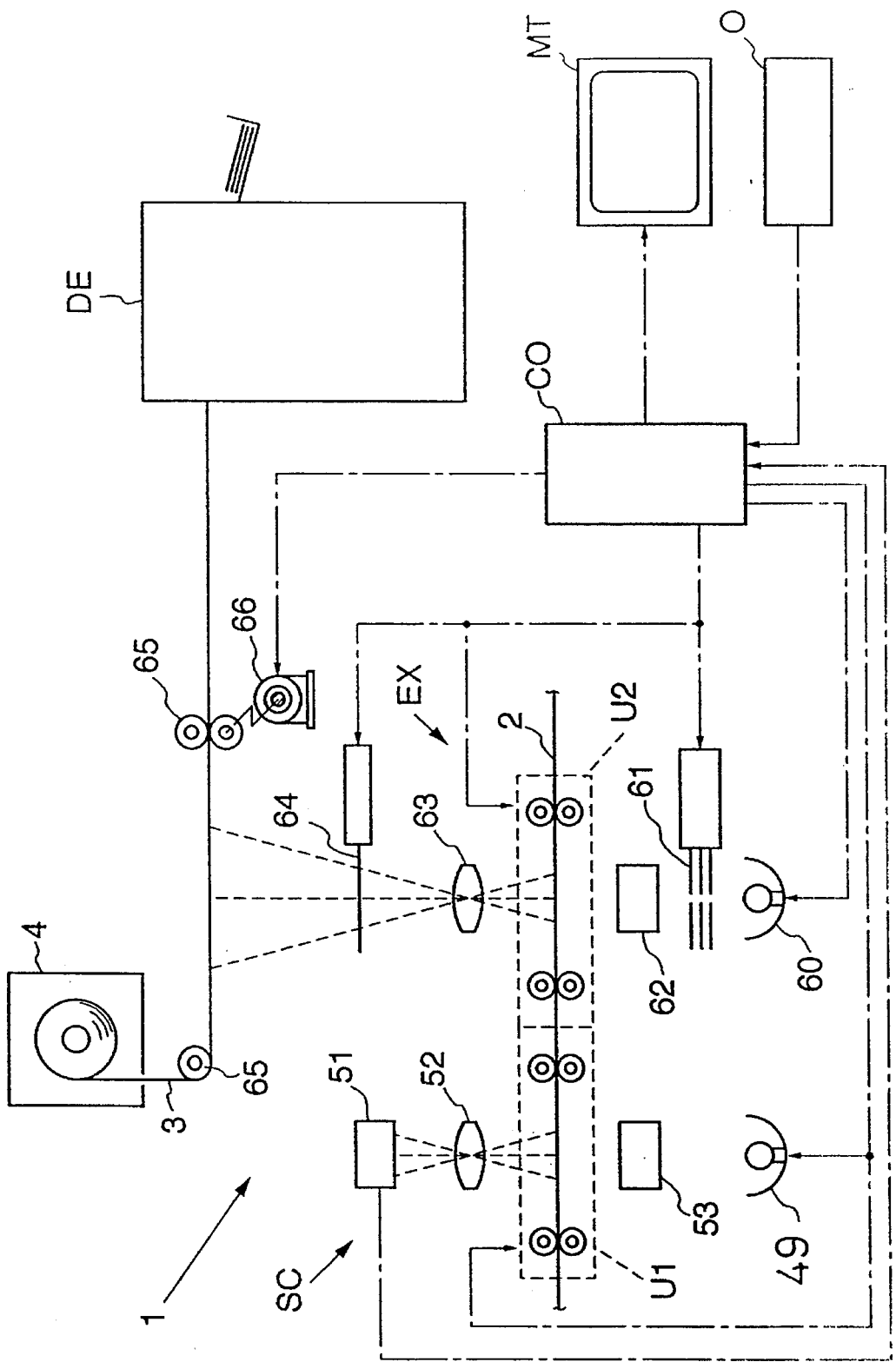
FIG. 1 is a schematic construction view showing a photographic printing system embodying the present invention.

As shown in FIG. 1, this photographic printing system 1 includes a scanner section SC for detecting image information of a film 2, an exposure section EX for projecting/exposing the image information of the film 2 onto a print paper 3, a developing section DE for developing the exposed print paper 3, and a controller CO for controlling the respective sections. The controller CO is connected to a control panel O for inputting a variety of control instructions and a monitor MT for displaying e.g. the image information read at the scanner section SC.

As the film 2 to be printed is inserted into the scanner section SC, the scanner section SC reads the image information of each frame of the film 2 and this image information is transmitted to the controller CO.

The film 2 which image information has been read at the scanner section SC is then transported to the exposure section EX.

Based on the image information read at the scanner section SC, the controller CO determines exposure conditions for each frame and produces a simulated image which would result from projection/exposure on the print paper 3 based on the determined exposure conditions.

An operator of the photographic printing system 1 observes the display on the monitor MT and if he/she finds out that the displayed image is not proper, instructions for correcting the determined exposure conditions may be inputted from the control panel O. Then, the controller CO corrects the exposure conditions based on the correction instructions and determines the final exposure conditions; and based on these finally determined exposure conditions, the controller controls the operations of the respective components of the exposure section EX and the image information of the film 2 is projected and exposed onto the print paper 3 withdrawn from a print-paper magazine 4.

The exposed print paper 3 is transported to the developing section DE for development and then is cut into pieces corresponding the respective frames of the film 2.

The scanner section SC includes a light source 49, a mirror tunnel 53 for uniformly mixing irradiation light of the light source 49, a scanner-section film transport unit U1 for transporting and positioning the film 2 at this scanner section SC, an image sensor 51 for converting the image information of the film 2 into electric signals, and a scanning lens 52 for imaging the image information of the film 2 on the image sensor 51.

The exposure section EX includes an exposure light source 60, a light modulating filter 61 for adjusting color balance of the irradiation light from the exposure light source 60 in association of introduction or retraction of color filters of yellow, magenta, cyanogen into and from an exposure optical path, a mirror tunnel 62 for uniformly mixing the light which color balance has been adjusted by the light modulating filter 61, an exposure-section film transport unit U2 for transporting and positioning the film 2 at this exposure section EX, a printing lens 63 for imaging the image information of the film 2 on the print paper 3, a shutter 64, transport rollers 65 and a motor 66 for driving the transport rollers 65.

The light modulating filter 61 and the shutter 64 are controlled by the controller CO. In accordance with the exposure conditions determined by the controller CO, the positions of the respective filters of the light modulating filter 61 and an opening time period of the shutter 64, i.e. an exposure time period, are controlled.

The motor 66, under the control of the controller CO, transports the print paper 3 one frame after another.

The developing section DE, though not shown, includes a plurality of processing tanks filled with a plurality of kinds of processing liquids for developing the exposed print paper 3 and a cutter for cutting each frame of the developed print paper 3.

Next, the constructions of the scanner-section film transport unit U1 provided at the scanner section SC and the exposure-section film transport unit U2 provided at the exposure section U2 will be described.

As the major portions of the constructions of the scanner-section film transport unit U1 and of the exposure-section film transport unit U2 are identical to each other, first the construction of the exposure-section film transport unit U2 will be explained. Then, as for the scanner-section film transport unit U1, only the differences between this scanner-section film transport unit U1 and the exposure-section film transport unit U2 will be briefly described.

Figure 2:
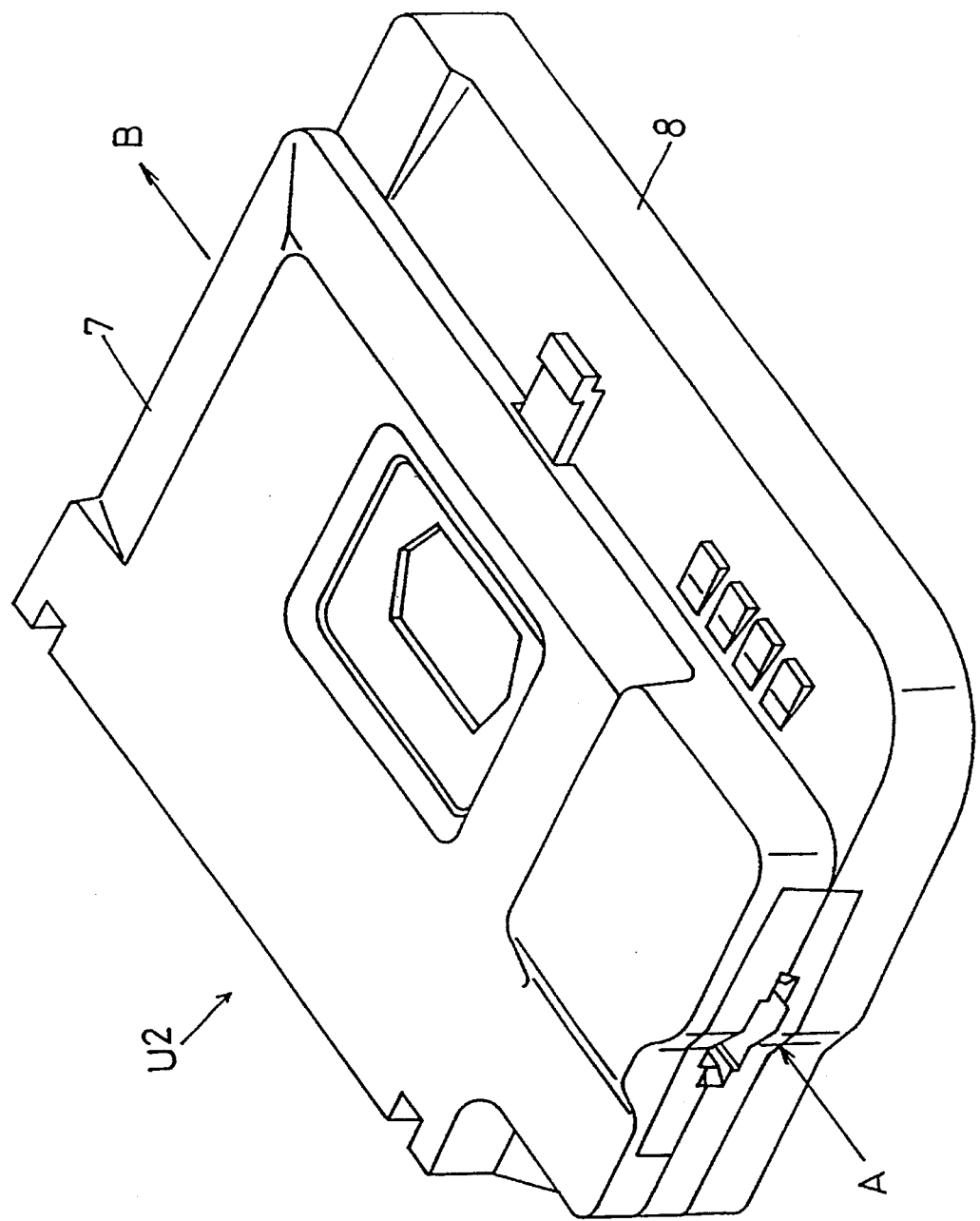
FIG. 2 is a perspective view showing a closed condition of a transporting unit relating to the present invention.

The exposure-section film transport unit U2, as shown in FIG. 2, includes a pair of frame members, i.e. an upper unit 7 and a lower unit 8 pivotably connected to each other to be opened and closed, and these units are urged to the opening direction by means of an unillustrated spring.

Figure 3:
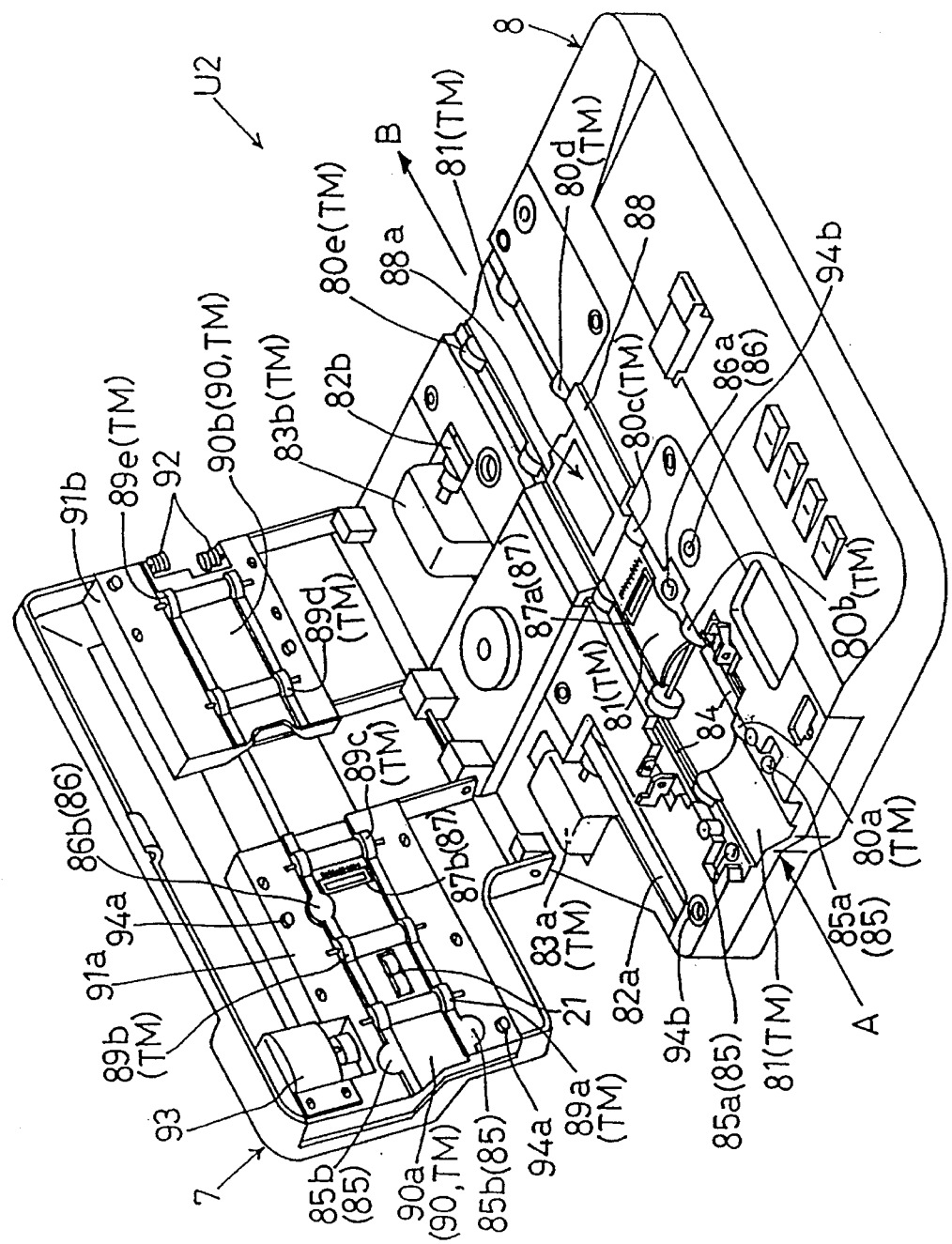
FIG. 3 is a perspective view showing an opened condition of the transporting unit relating to the present invention.

The closed condition of the upper unit 7 and the lower unit 8 is illustrated in FIG. 2, and an opened condition of the same is illustrated in FIG. 3. The film 2 is inserted in the arrowed direction A and discharged in the further arrowed direction B.

Figure 4:
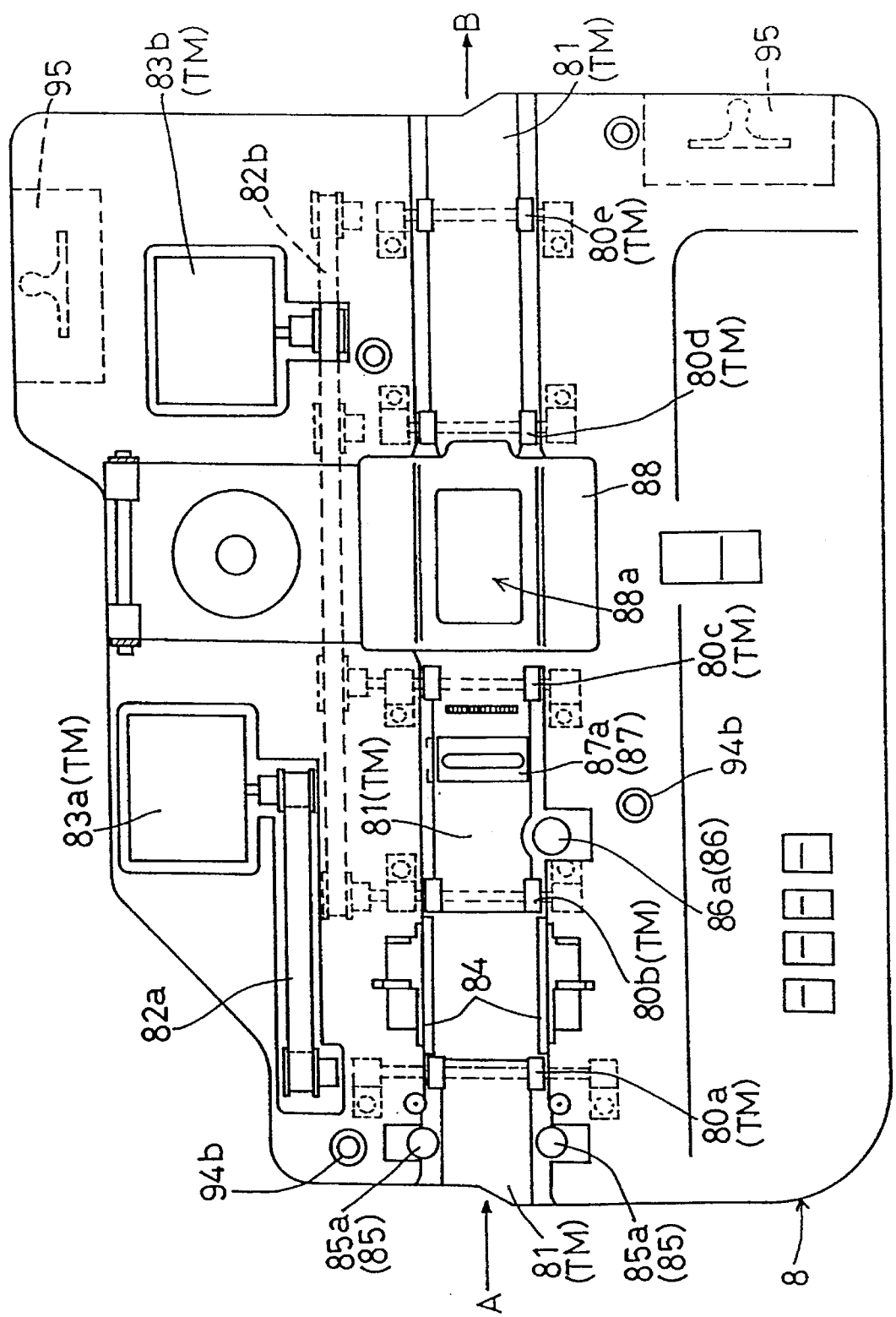
FIG. 4 is a plane view showing major portions of the embodiment of FIG. 1.

As shown in FIGS. 3 and 4, the lower unit 8 includes drive rollers 80*a*, 80*b*, 80*c*, 80*d*, 80*e*, a lower guide 81 for supporting and guiding right and left ends of the film 2 and defining a recess at a portion thereof where an image-bearing face of the film 2 is to pass through, a motor 83*a* for driving the drive roller 80*a* via a belt 82*a*, a further motor 83*b* for driving the rollers 80*b*, 80*c*, 80*d*, 80*e* via a further belt 82*b*, a pivot guide 84 which forms a part of a film loop forming mechanism R to be detailed later, a light emitting portion 85*a* of a DX code detecting optical sensor 85 for detecting a DX code of the film 2, a light emitting portion 86*a* of a perforation detecting optical sensor 86 for detecting perforations of the film 2, a light emitting portion 87*a* of an image detecting optical sensor 87 for detecting the image-bearing area of the film 2, and a negative mask 88 having an opening 88*a* for regulating an area to be printed on the print paper 3 of the image-bearing area of the film 2.

Incidentally, a plurality of types of negative masks 88 are provided to be exchangeable, so as to cope with films having different printing areas, such as the full-size, half-size panoramic size or the high-density type films.

The upper unit 7, as shown in FIG. 3, includes an upper guide 90 for supporting and guiding, in cooperation with the above-described lower guide 81, the right and left ends of the film 2 and also defining a recess at a portion thereof where the image-bearing face of the film 2 is passed through. The upper guide 90 consists essentially of an upstream portion 90*a* formed in an upstream support member 91*a* located on the upstream side of the transport passage of the film 2 across the position of the negative mask 88 where the irradiation light from the exposure light source 60 travels and downstream portion 90*b* formed in a downstream support member 91*b* disposed on the downstream side of the transport passage of the film 2.

The upstream support member 91*a* includes pressing rollers 89*a*, 89*b*, 89*c* disposed in positions corresponding to the drive rollers 80*a*, 80*b*, 80*c* when the upper unit 7 and the lower unit 8 are closed to each other, a light receiving portion 85*b* of the DX code detecting optical sensor 85, a light receiving portion 86*b* of the perforation detecting optical sensor 86, a light receiving portion 87*b* of the image detecting optical sensor 87, and a solenoid 93 forming a further part of the film loop forming mechanism R to be described later. The downstream support member 91*b* includes pressing rollers 89*d*, 89*e* disposed at positions corresponding to the drive rollers 80*d*, 80*e* when the upper unit 7 and the lower unit 8 are closed to each other and an exit roller 92.

Figure 5:
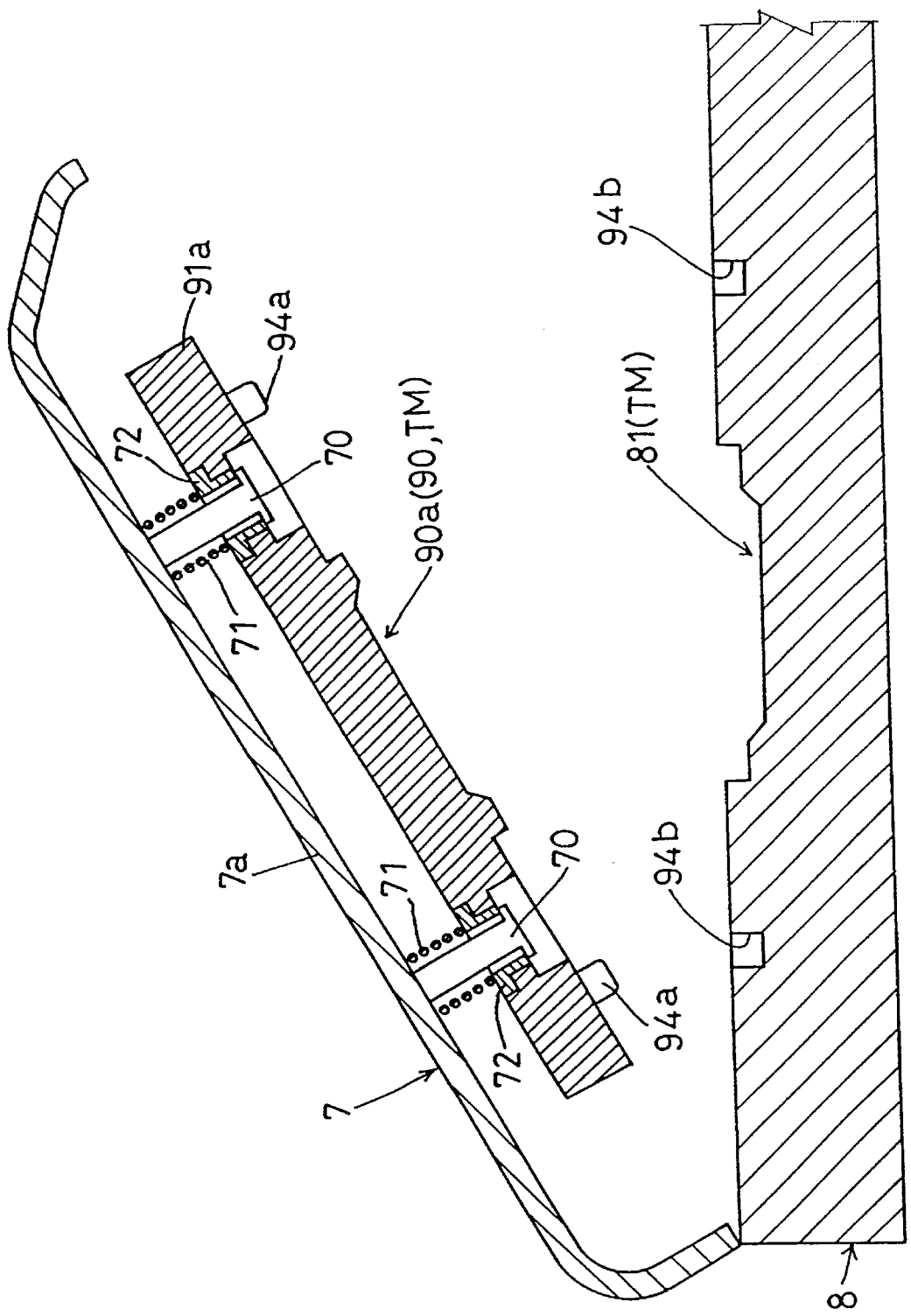
FIG. 5 is a view illustrating functions of the major portions of the embodiment of FIG. 1.
Figure 6:
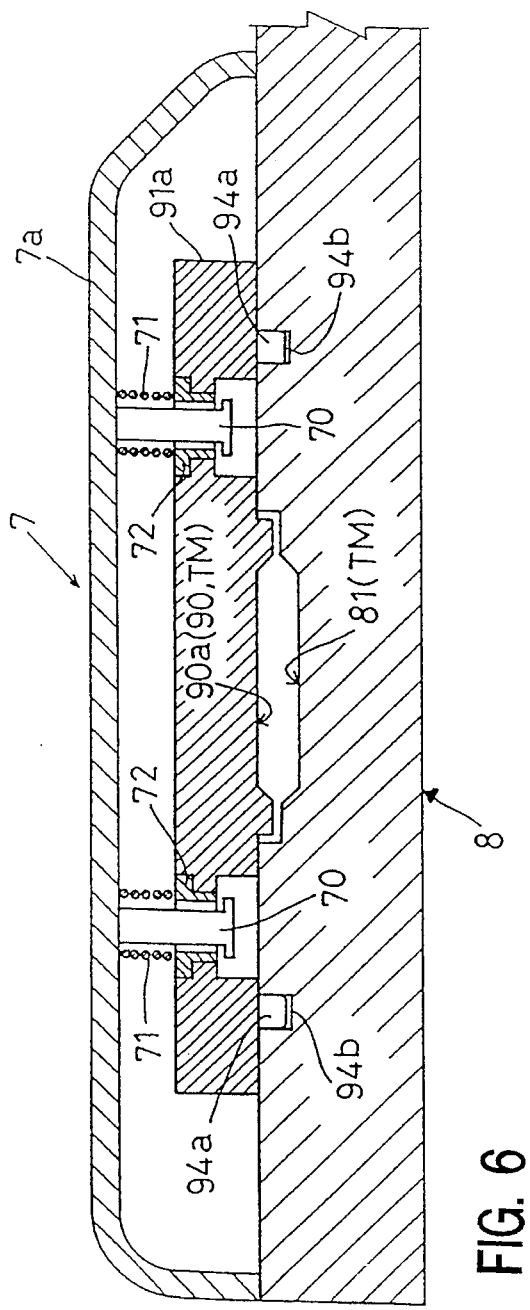
FIG. 6 is a further view illustrating functions of the major portions of the embodiment of FIG. 1.
Figure 7:
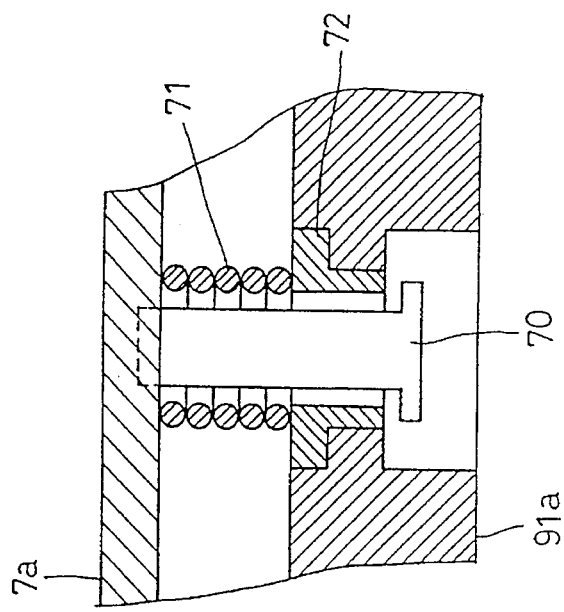
FIG. 7 is an enlarged view of the embodiment of FIG. 1.

As shown in the schematic section views of FIGS. 5 through 7, the upstream support member 91*a* is supported to a cover 7*a* of the upper unit 7 via a pin 70 and a compression coil spring 71. The pin 70 is fixed at its leading end to the cover 7*a* and a large head portion thereof is retained to the upstream support member 91*a*. The compression coil spring 71 urges the cover 7*a* and the upstream support member 91 away from each other.

A through hole of the pin 70 of the upstream support member 91*a* is formed by a slide metal 72 embedded in the upstream support member 91*a*. An inner diameter of the through hole of the pin 70 is larger than an outer diameter of the same (the outer diameter of the portion except the head), so that the upstream support member 91*a* is pivotable relative to the cover 7*a*.

As shown in FIGS. 5 and 6, the upstream support member 91*a* includes a cylindrical positioning pin 94*a* acting as a positioning engaging portion of the upper unit 7. The lower unit 8 includes a positioning hole 94*b* acting an a positioning engaging portion of the lower unit 8.

When the upper unit 7 and the lower unit 8 are being closed from the opened condition of the same for an exchange or interior cleaning of the negative mask for instance, first, the positioning pin 94*a* provided at the pivot center of the upstream support member 91*a* comes into contact with the positioning hole 94*b* defined in the lower unit 8. The outer diameter of the positioning pin 94*a* and the inner diameter of the positioning hole 94*b* are designed to be substantially equal to each other in order to provide a precise positioning. For this reason, at the time of the initial contact, the positioning pin 94*a* is inclined relative to the positioning hole 94*b*.

Then, as the upper unit 7 and the lower unit 8 are further closed, since the upstream support member 91*a* is pivotable relative to the cover 7*a*, the posture of the upstream support member 91*a* is varied to be parallel to the lower unit 8 against the urging force of the compression coil spring 71.

As a result, the positioning pin 94*a* now assumes a different posture engageable with the positioning hole 94*b* and these come into complete engagement with each other as illustrated in FIG. 6.

Incidentally, the downstream support member 91*b* too is pivotably attached to the cover 7*a*.

On the other hand, the film loop forming mechanism R is a mechanism for forming and accumulating a loop of the film 2 until it is exposed at the position of the negative mask 88 for the purpose of improving the processing efficiency of the film 2. This film loop forming mechanism R is provided between the drive roller 80*a* and the drive roller 80*b* and also between the pressing roller 89*a* and the pressing roller 89*b*.

Figure 8:
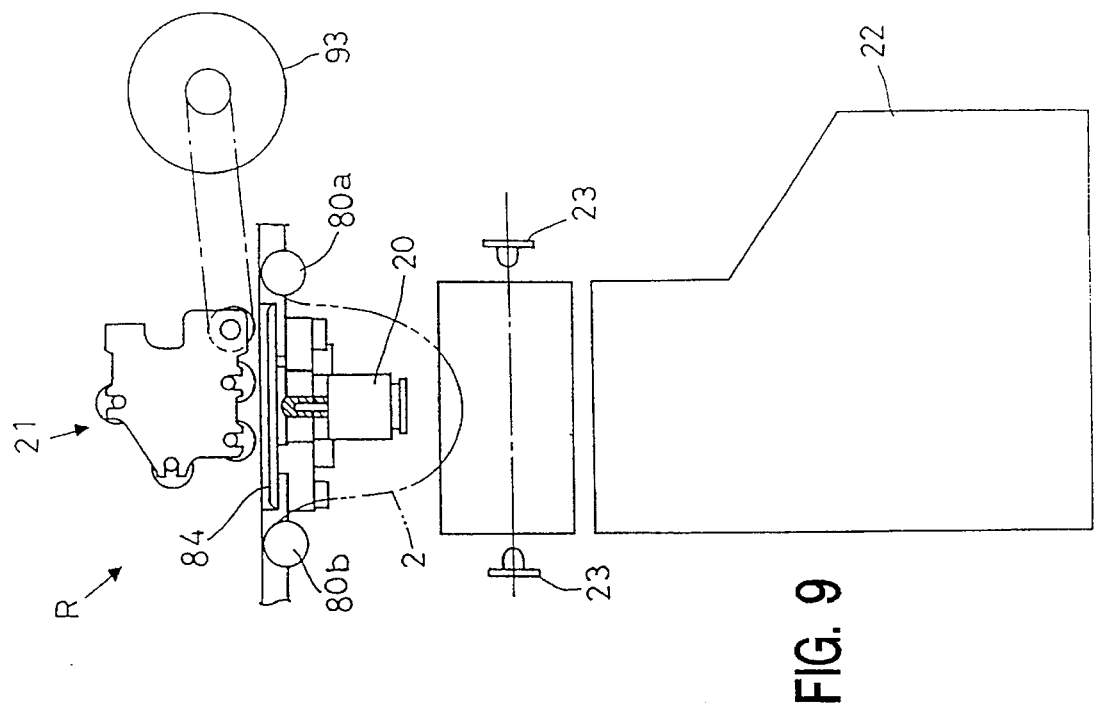
FIG. 8 is an enlarged side view of the major portions of the embodiment of FIG. 1.
Figure 9:
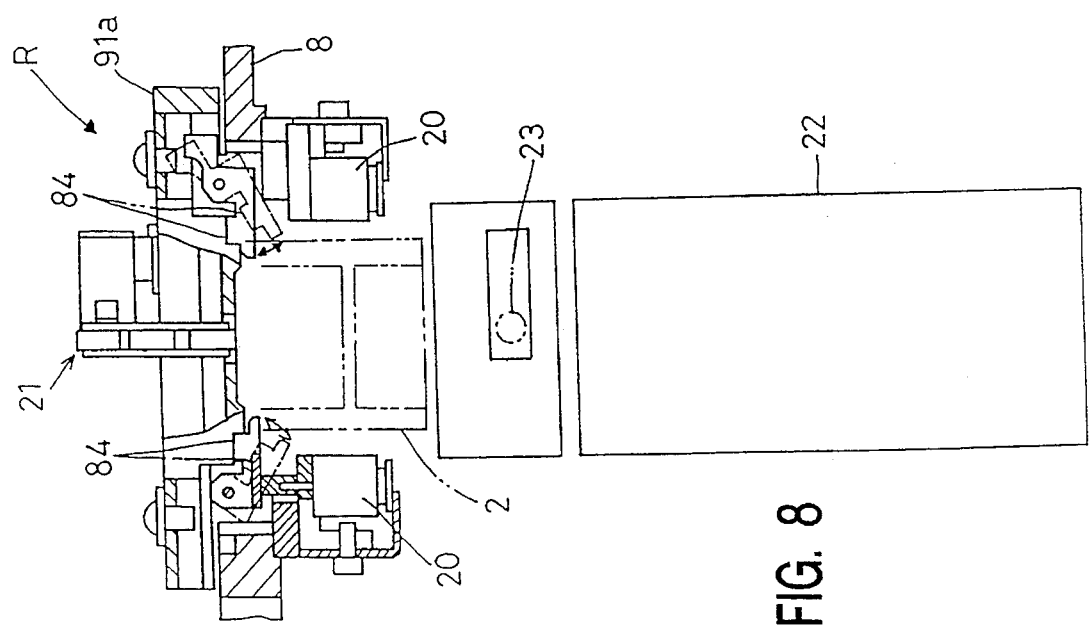
FIG. 9 is a further enlarged side view of the major portions of the embodiment of FIG. 1.
Figure 10:
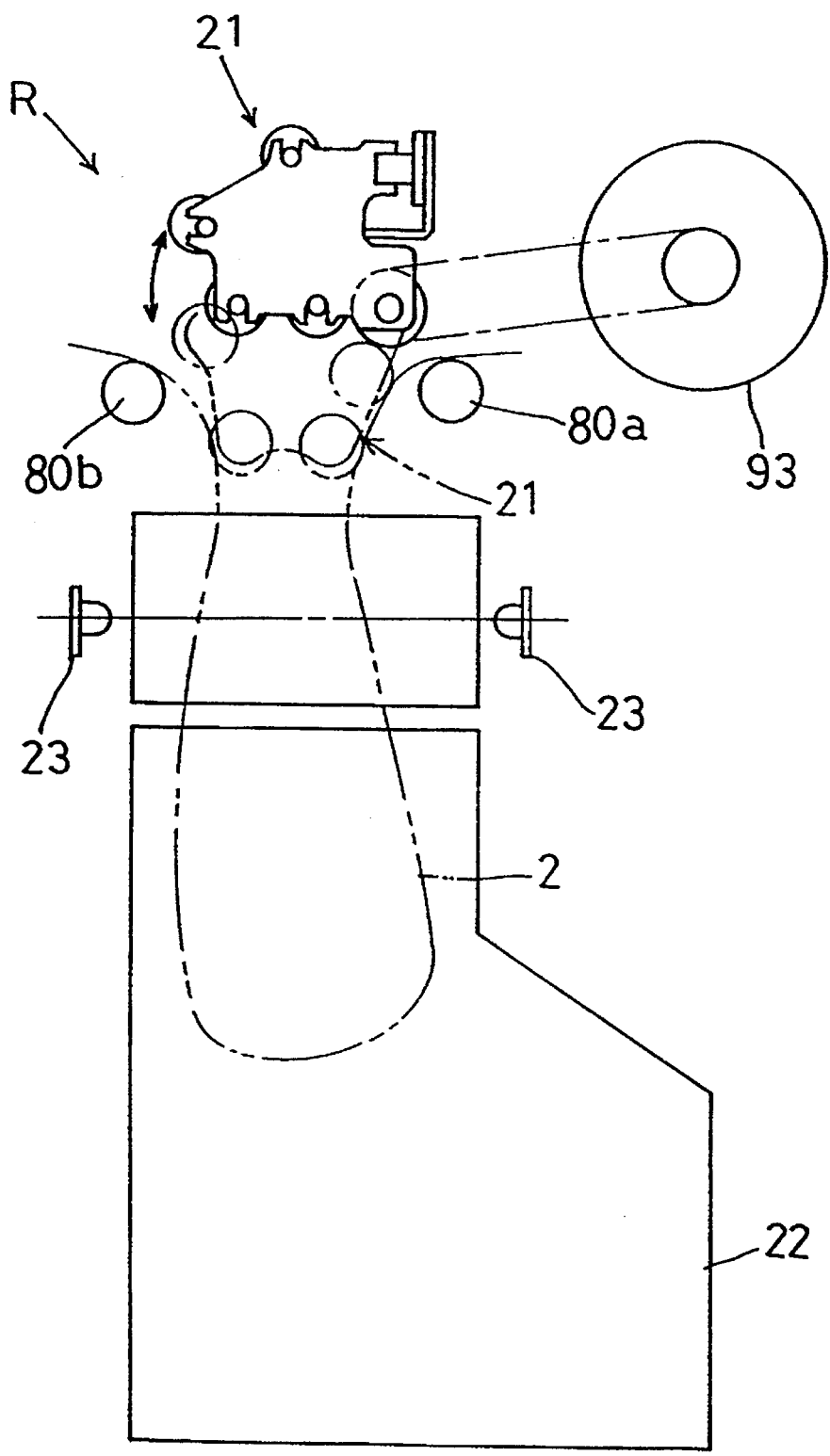
FIG. 10 is a still further enlarged side view of the major portions of the embodiment of FIG. 1.

As shown in FIGS. 8 through 10, the film loop mechanism R includes the pivot guide 84 provided to the lower unit 8, the solenoid 20 for pivotably driving the pivot guide 84, a loop down roller 21 provided to the upstream support member 91*a* of the upper unit 7 and a further solenoid 93 for pivotably driving the loop down roller 21.

The loop down roller 21 includes four rollers pivotably supported by a right and left pair of plate members.

For forming a loop of the film 2 by the above-described film loop forming mechanism R, the motor 83*b* is stopped to stop the transport of the film 2 on the downstream side relative to the drive roller 80b. Then, the motor 83a is activated to transport the film 2 by the drive roller 80a and then the solenoid 93 is energized. Thereafter, the loop down roller 21 is pivoted from a posture denoted by a solid line in FIG. 10 retracted from the transport passage of the film 2 to a further posture projecting into the transport passage of the film 2, thereby to prevent frictional contact between film strips and resulting damage thereto.

As a result, as illustrated in FIG. 10, the film 2 is accumulated in a loop tank 22 disposed under the exposure-section film transport unit U2.

Incidentally, presence or absence of the loop of the film 2 may be detected by a loop detecting optical sensor 23 disposed above the loop tank 22.

The control of the operations of the respective components is effected by means of an unillustrated control circuit provided within the lower unit 8.

Next, the functions and operations of the exposure-section film transport unit U2 having the above-described construction will be briefly described.

As the film 2 is inserted into the exposure-section film transport unit U2, the film 2 is transported with its right and left ends being pinched by the drive rollers 80a, 80b, 80c, 80d, 80e and the pressing rollers 89a, 89b, 89c, 89d and 89e.

In the course of this transport, the image detecting optical sensor 87 discriminates between the image area and the non-image area of the film 2. Based on this detection, the afore-mentioned control circuit controls the operation of the motor 83b to properly stop the image area of the film within the opening 88a of the negative mask 88 and an exposure operation is effected under the control of the controller CO. The transport control of the film 2 is effected by detection of the movement of the perforations by the perforation detecting optical sensor 86.

In the course of the above, when a next film is transported, the film loop forming mechanism R is activated in the above-described manner to adjust its further transportation.

Accordingly, the drive rollers 80a, 80b, 80c, 80d, 80e, the pressing rollers 89a, 89b, 89c, 89d, 89e, the motors 83a, 83b, the upper guide 90 and the lower guide 81 together function as the transport means TM for transporting the film 2 along the predetermined passage.

The scanner-section film transport unit U1 has an outer appearance as shown in FIG. 11 for introducing the film in an arrowed direction C and discharging the same in an arrowed direction D.

The inner construction and functions of the scanner-section film transport unit U1 are substantially the same as those of the exposure-section film transport unit U2. Further, the transport means TM for transporting the film 2 in this scanner-section film transport unit U1 schematically shown in FIG. 1 is also substantially the same.

The differences are the construction of the negative mask 31 and the disposing location of the film loop forming mechanism R which in this case is disposed on the downstream side of the transport passage of the film 2 relative to the opening 29 for detecting the image information of the film 2.

That is, while the negative mask 88 of the exposure-section film transport unit U2 is exchangeable, the negative mask 31 of the scanner-section film transport unit U1 is fixedly provided in one type only having an opening 31a corresponding to the size of the frame of the full-size film 2. Then, when the frame of the film 2, i.e., the image-recording portion thereof is located within this opening 31a, the image sensor 51 reads the image information. Thus, this disposing position of the negative mask 31 is the processing position for detecting the image information of the film 2.

Figure 18:
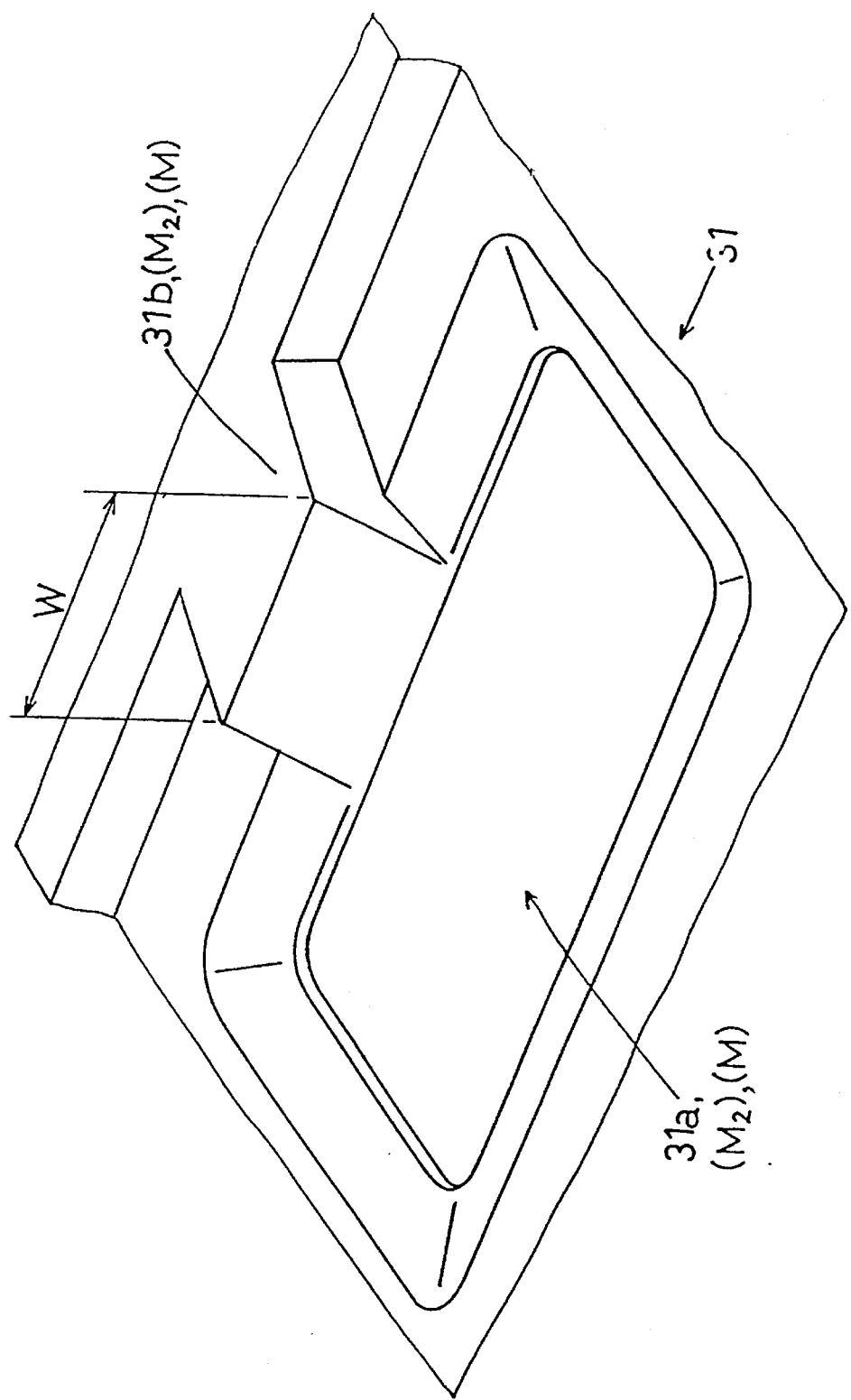
FIG. 18 is a perspective view showing the major portions of the embodiment of FIG. 1.

The negative mask 31 of the scanner-section film transport unit U1, as shown in FIG. 18, includes, in its face on the side of the mirror tunnel 53 of the scanner section SC, a projection 31b contacting the edge of the opening 31a. This projection 31b has a width W corresponding to the shorter length of the frame of the half-size film. This is provided for confirming whether a frame 2a which is the image portion of the half-size film 2 is stopped at the proper position within the opening 31a or not.

Figure 19:
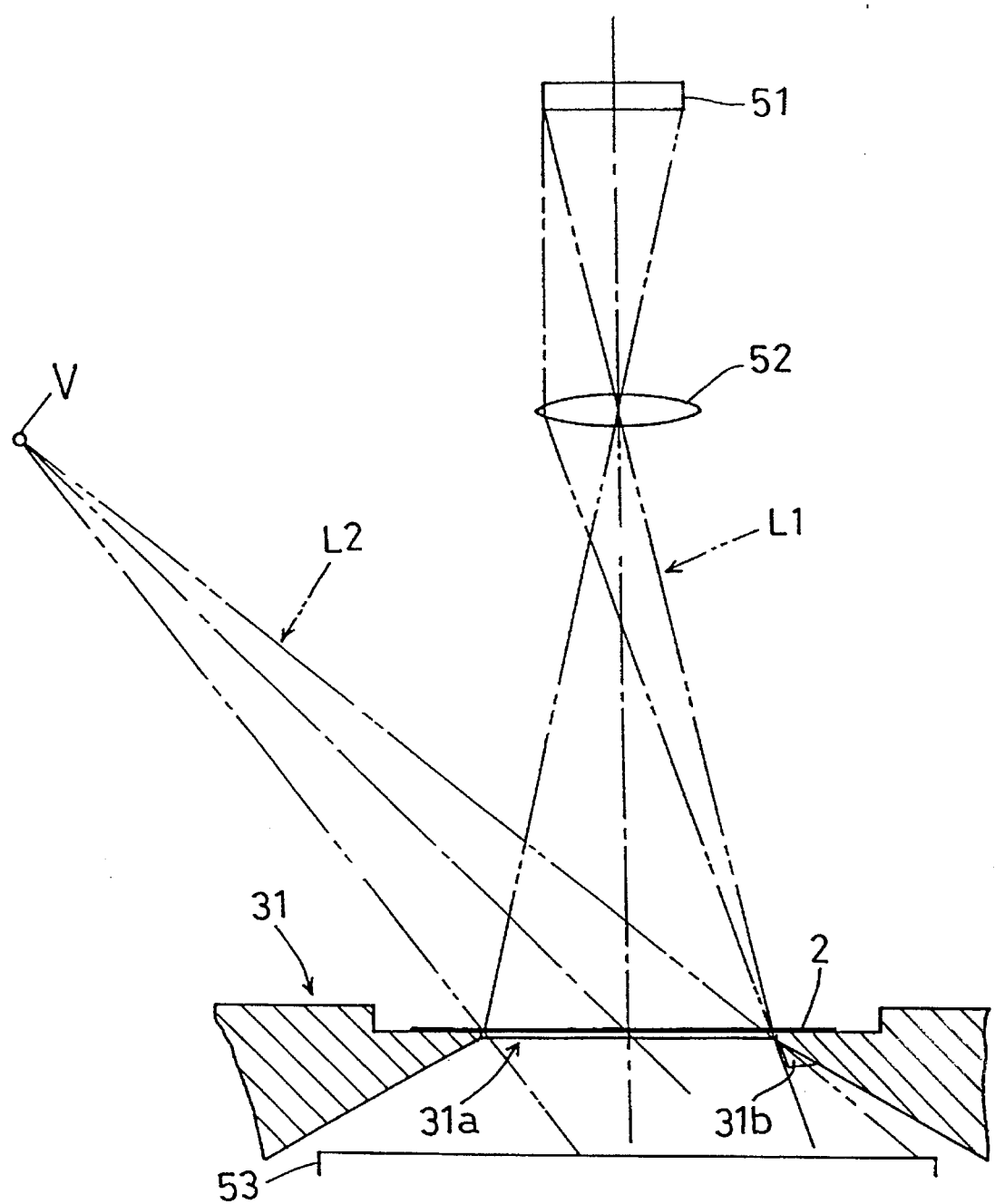
FIG. 19 is a view illustrating an optical path relating to the embodiment of FIG. 1, FIGS. 20(a), (b) are enlarged perspective views of a rod type lens relating to the embodiment of FIG. 1.

The projection 31b, as shown in FIG. 19, has such a cross section as described next. when the operator views the processing position from the outside an optical path L1 extending from the light source 49 through the frame 2a to the image sensor 51, i.e. the optical path L1 along which the image sensor 51 senses the area of the film 2 regulated by the opening 31a, i.e. he/she views the negative mask 31 from a view point denoted with a point V in FIG. 19, he/she may see the projection as located within the view range together with the frame 2a of the film 2.

Figure 20A:
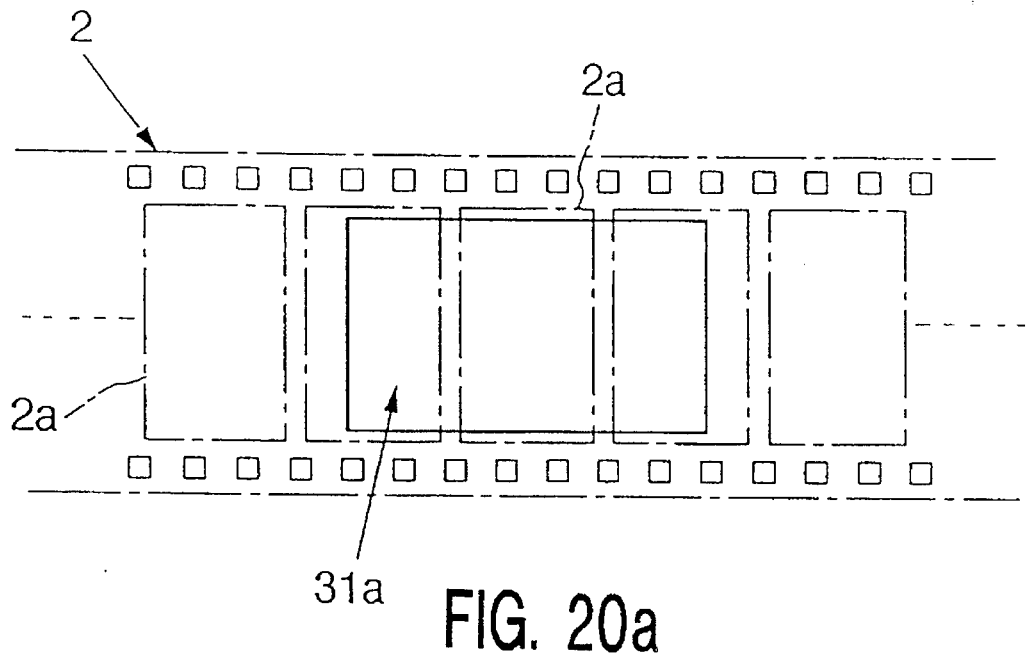
Figure 20B:
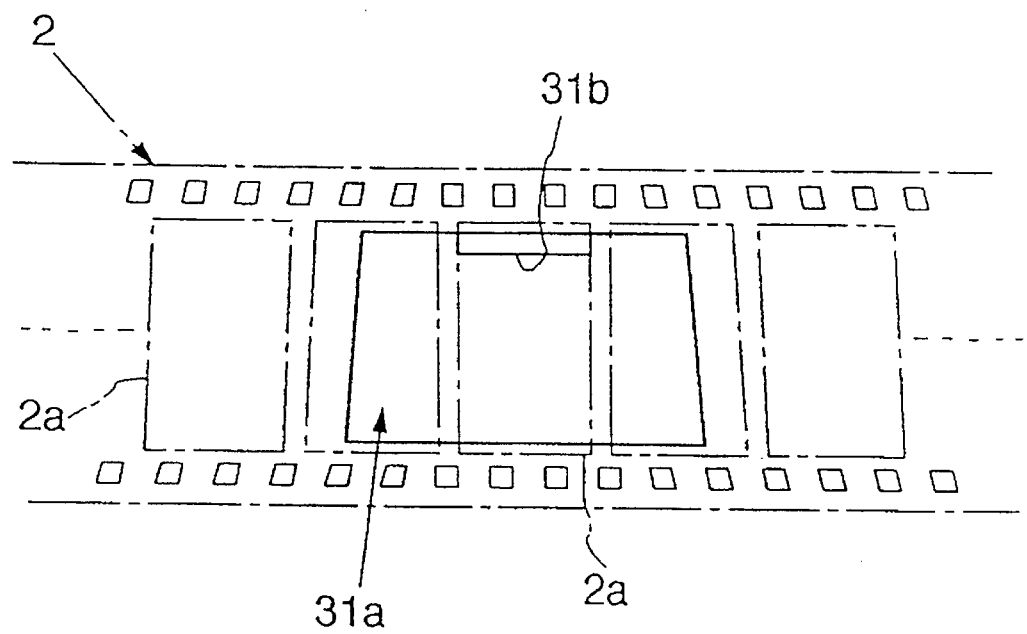

When the image sensor 51 images the opening 31a of the negative mask 31 along the optical path L1 when the half-size film 2 is located on the negative mask 31, as illustrated in FIG. 20(a), the projection 31b is not observed and the frame 2a comprising the image portion of the film 2 is located within the opening 31a. On the other hand, when the opening 31a of the opening 31 is observed from the view range L2 of the operator, as illustrated in FIG. 20(b), the projection 31a may be observed as being overlapped with the frame 2a of the film 2. Since this projection 31b has the width W corresponding to the length of the shorter side of the half-size film frame as described hereinbefore, by seeing whether the projection 31b is precisely overlapped with the frame 2a of the film 2 or not, it may be confirmed whether the image area, i.e. the frame of the film 2 is stopped at the proper position or not.

When the full-size film frame 2 is located on the negative mask 31, by observing whether the image area, i.e. the frame 2a of the film 2 is contained within the opening 31a of the negative mask 31 or not, it may be judged whether the frame is stopped at the proper position or not.

If the stop position is found to be improper regardless of the size of the film, an adjustment is made by using a field key H provided to the scanner-section film transport unit U1 for instructing advancement of the film 2 to the control circuit, so as to cause the projection 31b and the frame of the film 2 to correspond in position to each other.

Accordingly, the negative mask 31 and the projection 31b of this negative mask, as may be apparent from the above-described construction, are disposed in such manner that these may be viewed together with the frame 2a when the processing position is viewed from the outside of the optical path L1 and at a position out of this optical path L1 extending from the light source 49 through the frame 2a to the image sensor 51. So, the negative mask 31 and the projection 31b of the negative mask 31 together function as an index M for indicating a proper position of the frame of the film 2 in the transport direction of the same. Of these components, the negative mask 31 functions as a first index portion M1 having the opening 31a which covers the film 2 and also exposes the frame. Whereas, the projection 31b functions as a second index portion M2 which is provided for the half-size film 2 having the shorter-length frame 2a in the transport direction and which may be viewed through the opening 31*a* in a manner overlapped with the frame 2*a*.

The scanner-section film transport unit U1 and the exposure-section film transport unit U2 are normally used as being mounted on a support table 40 in conditions shown in FIG. 12. Under the disposed condition shown in FIG. 12, the opening 29 of the scanner-section film transport unit U1 is located on the optical path of the irradiation light of the light source 49 of the scanner section SC and the opening 88*a* of the negative mask 88 of the exposure-section film transport unit U2 is located on the optical path of the irradiation light from the exposure light source 60; thus, these are set at the film transport positions of the scanner section and the exposure section, respectively. And, the transport passage of the film 2 of the scanner-section film transport unit U1 and that of the exposure-section film transport unit U2 are aligned continuously.

The support table 40 fixedly mounts thereon a scanner-section table rail 41 for sliding the scanner-section film transport unit U1 and an exposure-section table rail 42 for sliding the exposure-section film transport unit U2.

The scanner-section film transport unit U1 is slidable along the scanner-section table rail 41 in a direction opposite to an arrowed direction E from a position shown in FIG. 12 (the side of the arrowed direction E will be referred to as the 'forward side' and the opposite side will be referred to as the 'rear side', respectively hereinafter). Further, the exposure-section film transport unit U2 may be detached from the photographic printing system 1 by sliding the same along the exposure-section table rail 42 to the forward side.

Figure 13A:
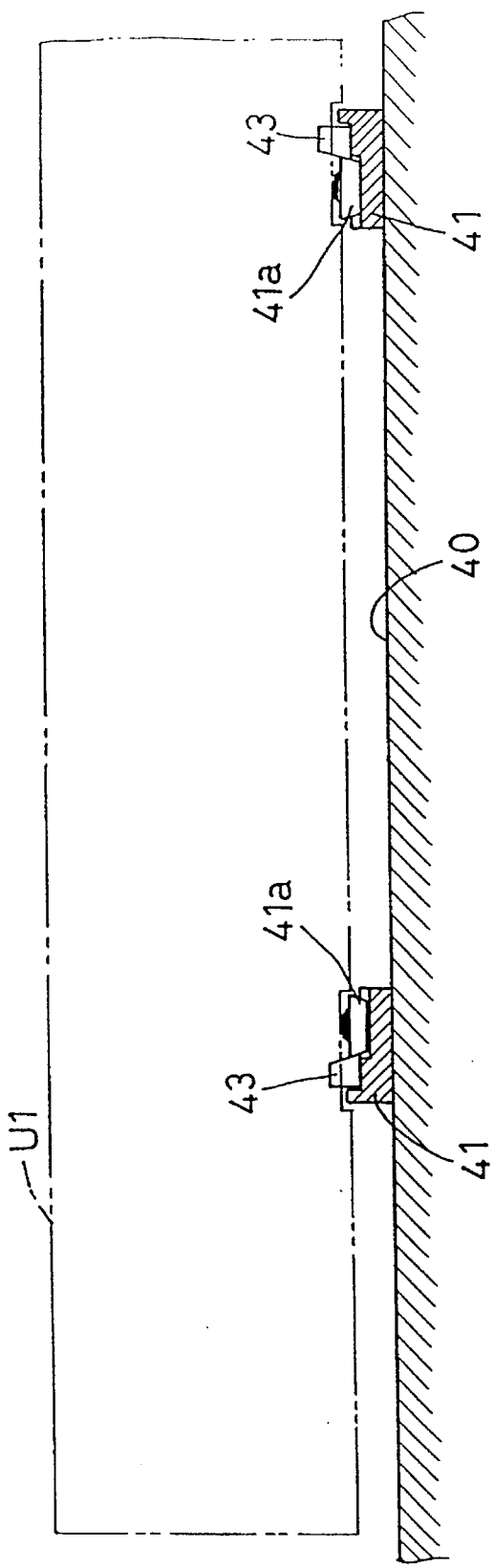
Figure 13B:
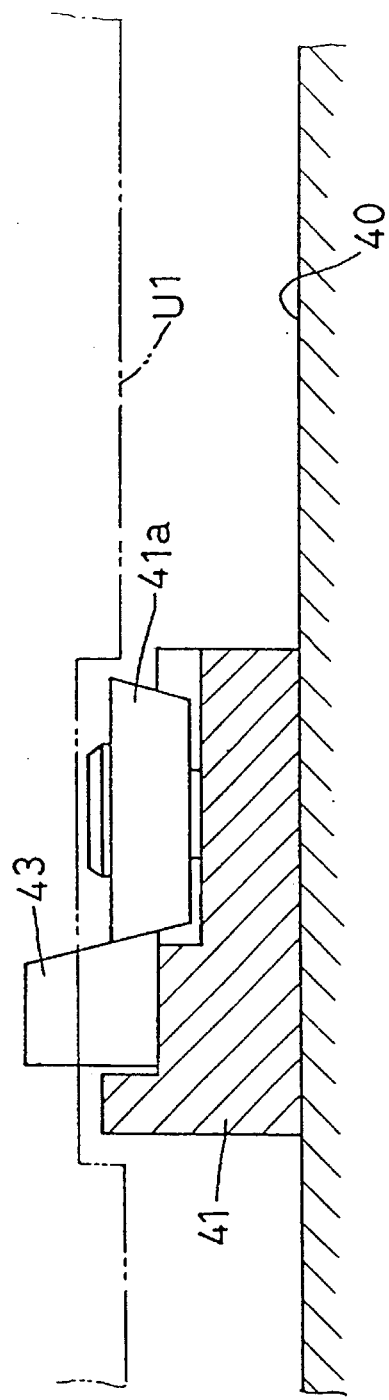

As shown in FIGS. 13(*a*) and (*b*), the scanner-section film transport unit U1 fixedly mounts, on its bottom, a unit-side rail 43 which comes into contact with conical rotary rollers 41*a* provided on the scanner-section table rail 41.

The conical rotary rollers 41*a* are provided at four positions. Of these, the side left roller 41*a* is pivotable in the arrowed direction E as being urged back to the position shown in FIG. 12.

On the other hand, as shown in FIG. 12, the unit-side rail 43 forms a projection 43*a*. And, as this projection 43*a* comes into contact with the pivotable roller 41*a*, the scanner-section film transport unit U1 is prevented from moving to the rear side.

The position of the scanner-section film transport unit U1 is slided to the forward side position shown in FIG. 12 is determined by contact between a positioning projection 44*a* formed on the bottom of the scanner-section film transport unit U1 and a positioning projection 44*b* formed on the support table 44.

The exposure-section film transport unit U2 carries, at its bottom, four conical rotary rollers 45 for coming into contact with the exposure-section table rail 42 thereby to regulate the right and left positions of the same. Of these rollers, the forward left roller 45 is pivotable in an arrowed direction G with being urged back to the position shown in FIG. 12.

The left-side exposure-section table rail 42 forms a projection 42*a*. As shown in FIG. 12, as this projection 42 comes into contact with the pivotable conical rotary roller 45, the exposure-section film transport unit U2 is prevented from being moved to the forward side.

Incidentally, the exposure-section film transport unit U2 becomes fixed at the position shown in FIG. 12 as a connector holder 46 of the support table 40 becomes connected with a connector 95 of the exposure-section film transport unit U2. Incidentally, the direction of the exposure-section film transport unit U2 may be varied by 90 degrees as will be more particularly described later. For this reason, the connected 95 too is provided at two locations as shown in FIG. 4.

When the scanner-section film transport unit U1 and the exposure-section film transport unit U2 are set under the condition illustrated in FIG. 12, as the film 2 is introduced into the scanner-section film transport unit U1, the image information of the film 2 is serially read by the image sensor 51 of the scanner section SC. Then, this film 2 whose image information has been read is inserted directly into the exposure-section film transport unit U2 to be exposed serially.

In addition to the above-described standard operation mode, the photographic printing system 1 of the present invention can provide other operation modes to be described next, depending on the manner of disposing the scanner-section film transport unit U1 and the exposure-section film transport unit U2.

Figure 14:
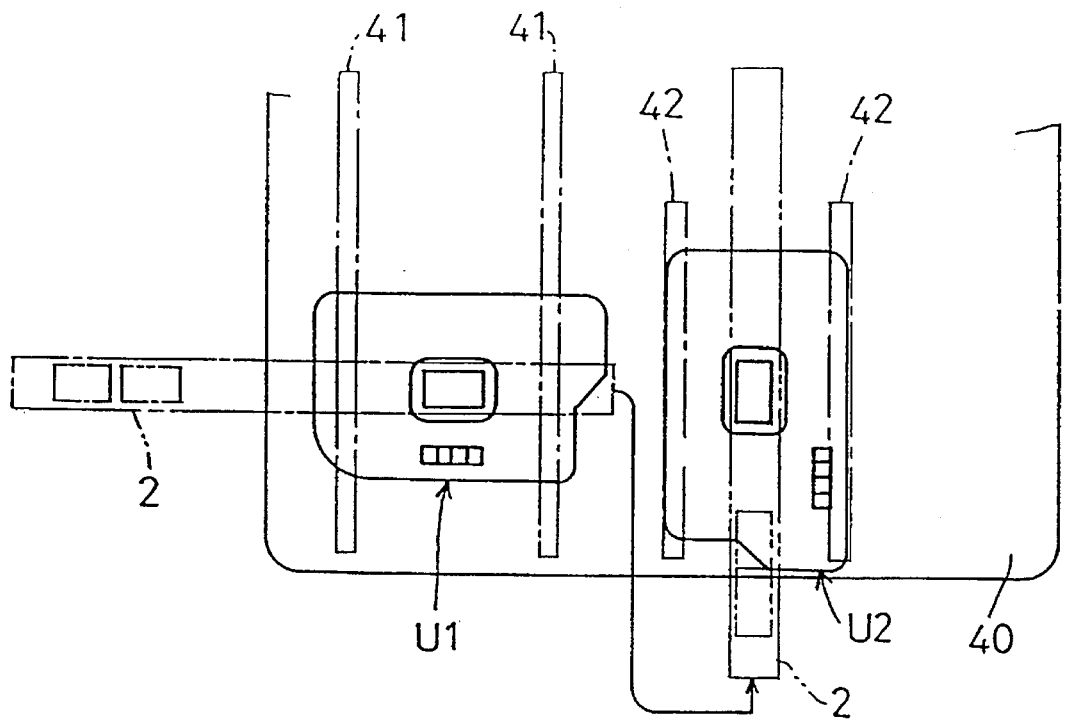
FIG. 14 is a plane view showing the major portions of the embodiment of FIG. 1.

First, the exposure-section film transport unit U2 is withdrawn along the exposure-section table rail 42 to the forward side and changed in its direction by 90 degrees to be again set along the exposure-section table rail 42, so that the unit is set as illustrated in FIG. 14.

Under this setting condition, the exposure-section film transport unit U2 is disposed at the film transporting position with the posture for transporting the film 2 in the direction transverse to the transport direction of the film 2 of the scanner-section film transport unit U1. Then, the image information of the film 2 is read by the scanner section SC and based on the read image information the controller CO determines the exposure conditions. The subsequent process of exposing at the exposure section EX under the determined exposure conditions is the same as the afore-described standard operation mode. However, since the transport direction of the film 2 at the exposure section EX is different by 90 degrees, the system may effect an exposure of the half-size film 2.

Under the setting condition shown in FIG. 14, it is also possible to effect the exposure of e.g. the half-size film 2 at the exposure section EX under exposure conditions freely determined by the operator, without using the function of the scanner section SC.

Figure 15:
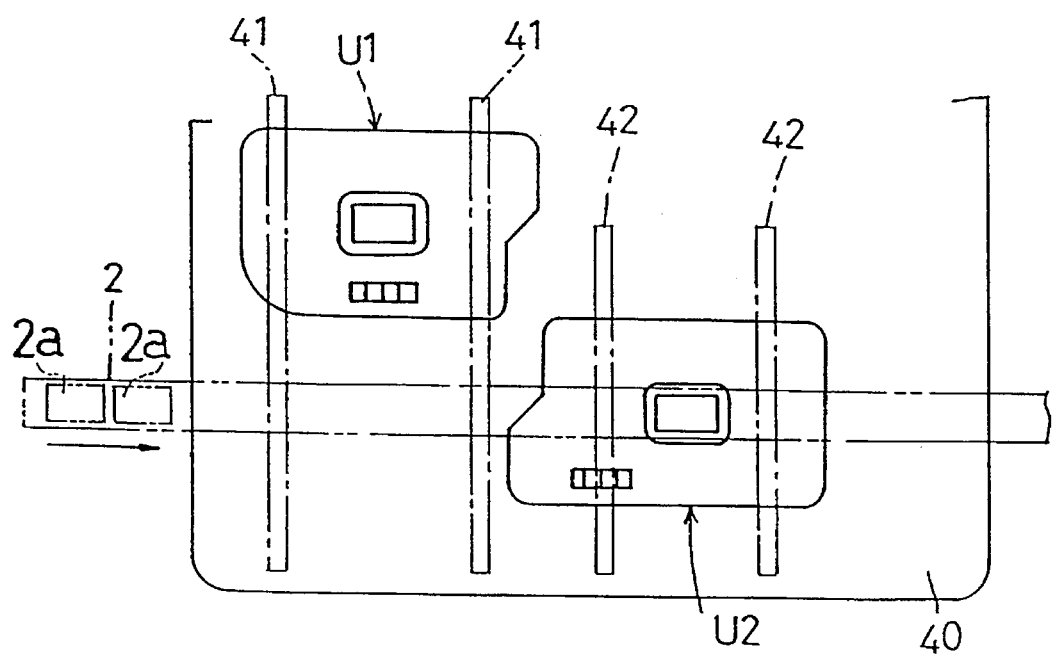
FIG. 15 is a plane view showing the major portions of the embodiment of FIG. 1.
Figure 16:
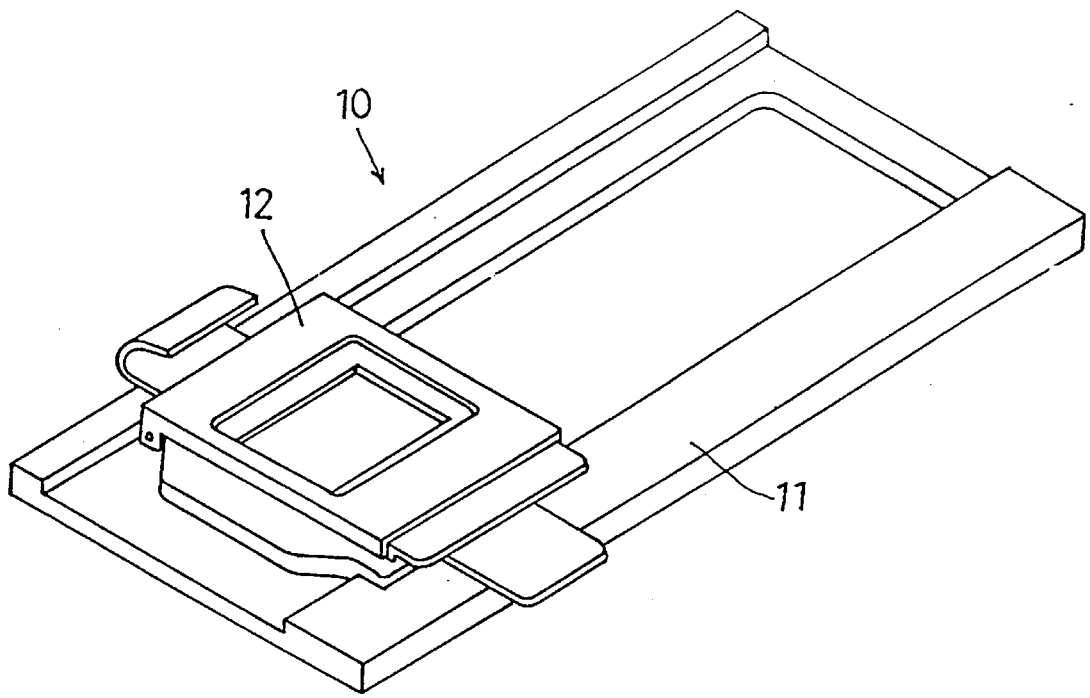
FIG. 16 is a perspective view showing the major portions of the embodiment of FIG. 1.
Figure 17:
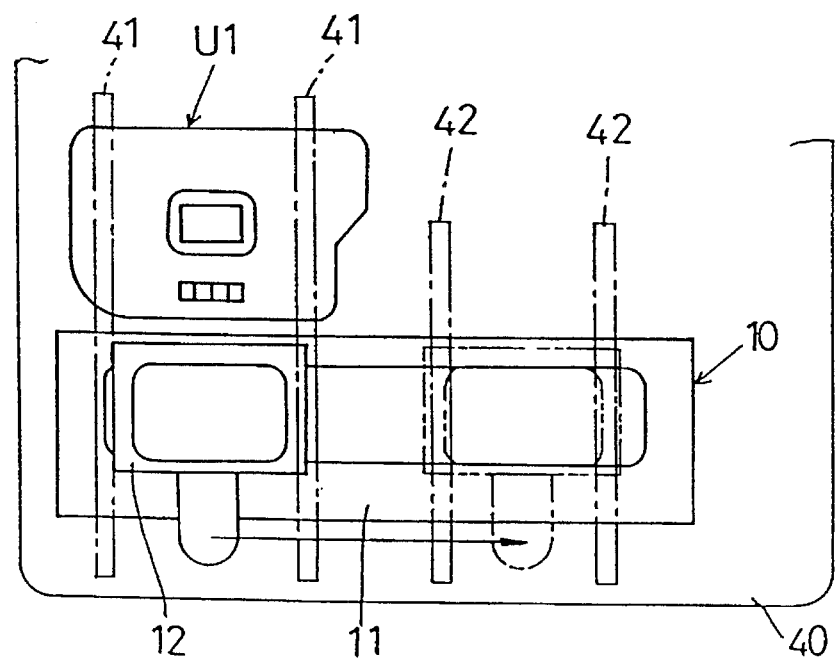
FIG. 17 is a plane view showing the major portions of the embodiment of FIG. 1.

Next, when the exposure-section film transport unit U2 is set to the standard position and the scanner-section film transport unit U1 is moved to the rear side to establish the setting position illustrated in FIG. 15, it becomes also possible to effect the exposure of a full-size film 2 at the exposure section EX under exposure conditions freely determined by the operator, without using the function of the scanner section SC.

A cropping mask 10 has a mask portion 12, which is the film holding portion, slidable on the support table 11 acting as the guide frame. At the mask portion 12, various sizes of films 2 such as the 110 size, 2B negative, may be set.

In the operation mode using the cropping mask 10, the film 2 is set to the mask portion 12 and the mask portion 12 is located on the optical path of the scanner section SC.

Then, under this condition, the image information of the film 2 is read by the image sensor 51 and then the mask portion 12 is slided to be on the optical path of the exposure section EX.

At this position, under the position conditions determined by the controller based on the image information of the film 2, an exposure operation is effected on the print paper 3.

Figure 21:
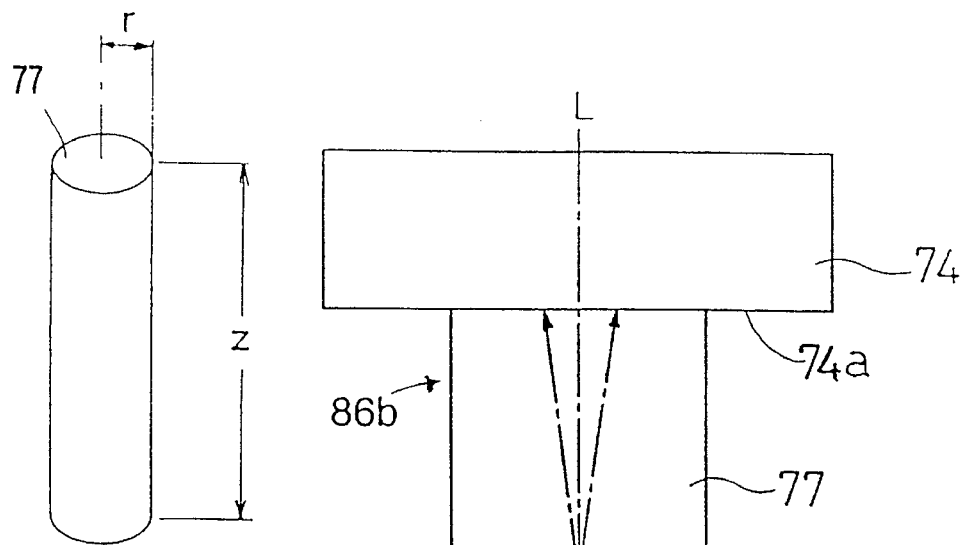
FIG. 21 is an enlarged perspective view of the rod type lens relating to the embodiment of FIG. 1, FIGS. 22(A), (B), (C), (D) are diagrams showing waveforms of an output signal from a light receiving portion relating to the embodiment of FIG. 1.

Next, the perforation detecting unit will be particularly described with reference to FIGS. 21 through 23.

The light emitting portion 73 and the light receiving portion 74 are disposed in opposition to each other across the film 2. The light emitting portion 72 is constructed from such an element as a light emitting diode and a leading end 73a of this light emitting portion has an approximately spherical shape so as to cover the light to some extent. The light emitted from the light emitting portion 73 is limited to the width AW by means of the limiting walls 75, 76 provided in the processing system.

The light receiving portion 74 is constructed of such an element as a photo transistor and includes a light receiving face 74a. This light receiving portion 74 generates an output signal corresponding to the amount of light reaching the light receiving face 74a.

Forwardly of the light receiving portion 74, there is disposed a rod type lens 77. This rod type lens 77 is disposed on an optical path L1 extending from the light emitting portion 73 to the light receiving portion 74. And, the optical axis of the rod type lens 77 and the optical path L are substantially aligned with each other.

Figure 23:
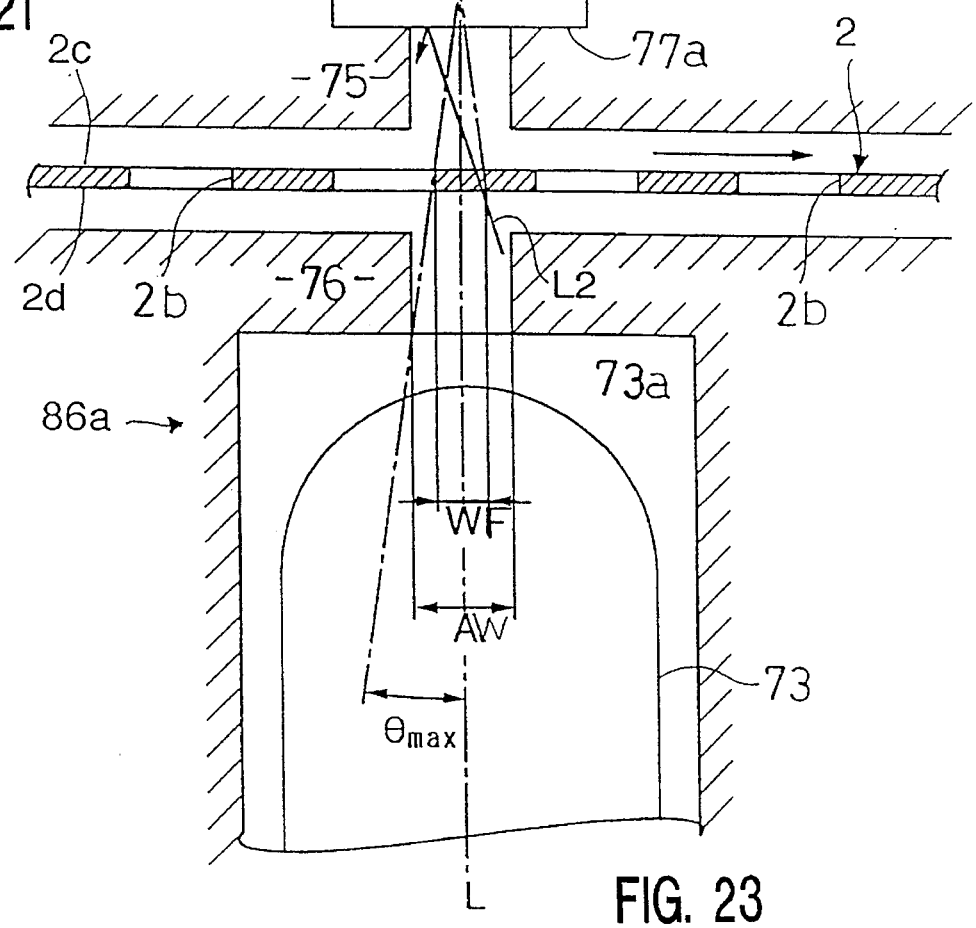
FIG. 23 is an enlarged view showing the major portions of the embodiment of FIG. 1.

In operation, the film 2 is transported in an arrowed direction in FIG. 23 between the light emitting portion 73 and the rod type lens 77. The transport direction of the film 2 and the optical axis L extend normal to each other. The amount of light reaching the light receiving face 74a varies between a condition where the perforation 2b of the film 2 is located on or near the optical axis L and a further condition where the perforation 2b is located away from the optical axis L.

Next, the rod type lens 77 will be briefly described. The rod type lens refers to a refractive index distributing type lens and comprises a micro lens 77 having a substantially cylindrical configuration as shown in FIG. 21. As an example, there is provided one commercially available under the trade name of: "SELFOC lens" (manufactured and sold by Nippon Plate Glass Co., Ltd.).

Now, supposing the micro lens 77 has a longitudinal length (z) and a radial coordinate value (r); then, this micro lens 77 has a refractive index pattern represented by a following Expression (1)

$$n^2(r) = n^2(\Omega) [1 - (\zeta r)^2]$$  Expression (1)

The light has the tendency to be refracted to the side having a higher refractive index than the other. So, by appropriately selecting the length (z) of the micro lens 77, this lens can be formed as a converging type lens, i.e. a lens for imaging a certain film face on the light receiving portion 74a. In the case of the construction of FIG. 23, the upper face of the film 2 is imaged on the light receiving face 74a.

The film 2 includes an emulsion face 2c and a base face 2d. Then, in FIG. 23, the base face 2d is placed in opposition to the light emitting portion 74 while the emulsion face 2c is placed in opposition to the light receiving portion 74.

The beam irradiated from the light emitting portion 73 has a flux limited by the width AW of FIG. 23. This light beam L1, after reaching the base face 2d, is somewhat attenuated. The light reaching the perforation 2b of the film 2 arrives as it is at an inlet opening 77a of the rod type lens 77. This rod lens 77 has a predetermined aperture angle θ max. Then, any beam component incident to this lens 77 with an angle greater than said aperture angle: θ max is reflected by the inlet opening 77a because of the relationship between the refractive index value of this rod lens 77 and that of the surrounding air. For instance, such beam L2 as illustrated in FIG. 23 has an incident angle greater than the aperture angle: θ max, so that this beam is reflected by the inlet opening 77a and can not enter the rod lens 77.

Therefore, the width of beam which may enter the rod lens 77 will be represented on the film face as a width WF in FIG. 23. That is to say, any beam component which tries to enter the inlet opening 77a from an angle outside the width WF on the film face will be reflected by the inlet opening 77a. In other words, while the magnitude of the flux of the light emitted from the light emitting portion 73 is the width AF of FIG. 23, that of the light component which is allowed to actually reach the light receiving portion 74a is the one determined by the width WF on the film face.

As described above, by providing the rod type lens 77, the same effect may be achieved as provided by constricted beam. Incidentally, in FIG. 23, the width WF is shown slightly greater than the actual width. Further, since the light to reach the light receiving face 74a is limited by the width WF on the film face, there is no necessity to providing a slit plate in front of the light receiving face 74a. Further, although some of the components of the light reaching the film face are dispersed, the light receiving face 74a may be almost free from any adverse effect from such dispersed light component as being limited by the aperture angle: θ max as described hereinbefore.

Figure 22A:
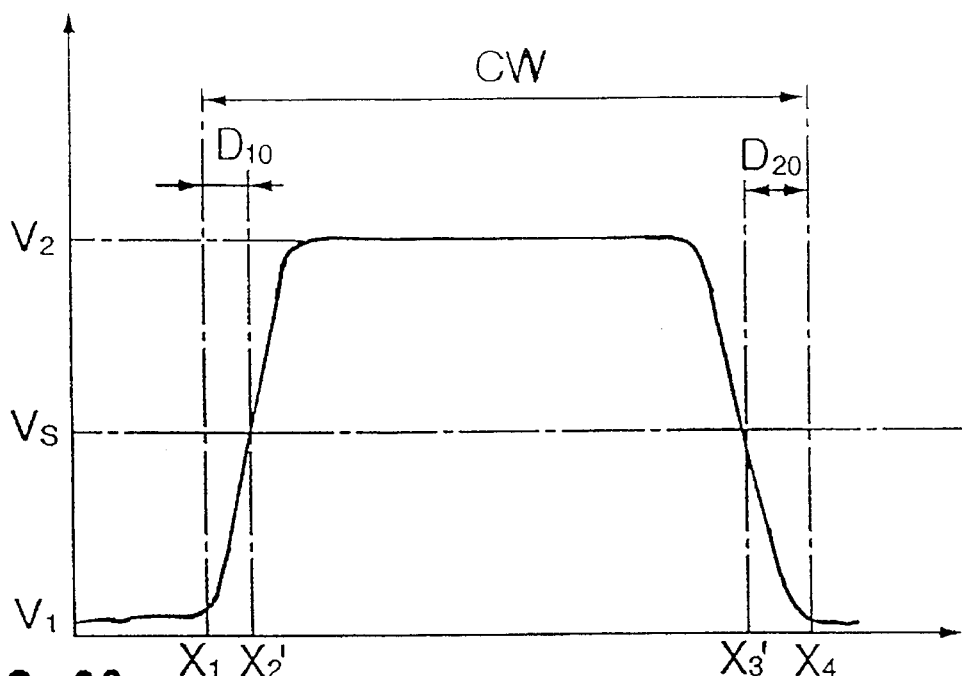

Next, a waveform of the output signal from the light receiving portion 74 of FIG. 23 is illustrated in FIG. 22(A). In FIGS. 24(A), (C), a mark (cw) denotes the width of the perforation.

Figure 22B:
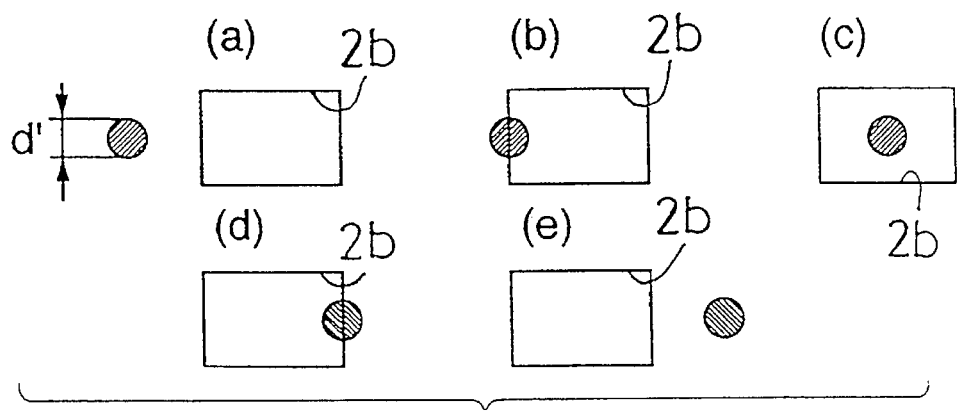
Figures 22C, 22D:
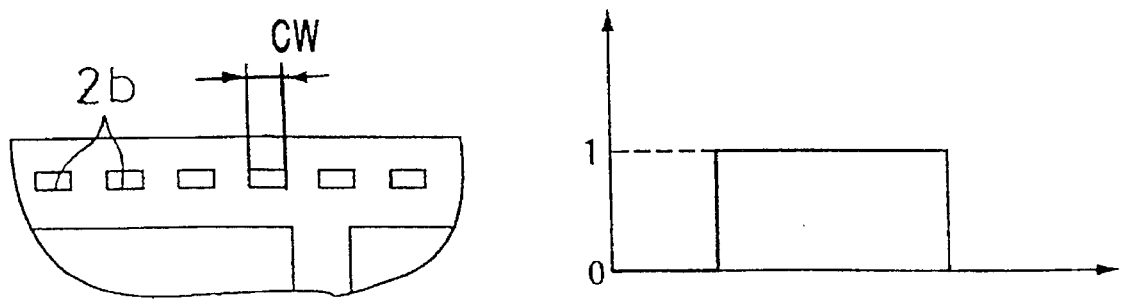

In FIG. 22(B), a mark (d') denotes the width of the beam as viewed on the film face and this corresponds also to the width of the beam to be actually imaged on the light receiving face 74a. The magnitude of this (d') is significantly smaller than that provided by the conventional art.

Therefore, in comparison with the conventional art, in the case of the waveform of the present invention, a time period required for the shift between a minimum output value V1 and a maximum output value V2 is shorter. In other words, this output signal waveform has a sharp inclination for the change from the minimum output value V1 to the maximum output value V2 or from the maximum output value V2 to the minimum output value V1. If a threshold level is Vs; then, an edge of the perforation will be judged to correspond to the points x2' and x3' in FIG. 22. Since the edges of the actual perforation are x1 and x4, detection errors will be represented by D10, D20 in FIG. 22 which is significant improvement over the conventional art.

The output signal waveform from the light receiving portion 74 of FIG. 22(A) is binarized into a '0' level signal and a '1' level signal. That is, if the output signal is greater than the threshold level Vs, the signal is determined as the '1' level signal, and if it is smaller than the same, the signal is determined as the '0' level signal. Then, the rising portion and the dropping portion of this binarized waveform are determined as the edge of the perforation by judging means provided to an unillustrated control means.

Figure 24:
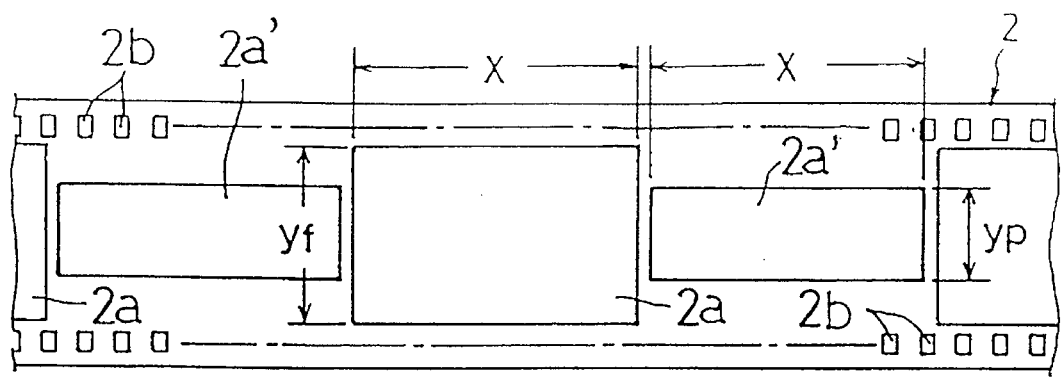
FIG. 24 is a view showing a film employed in the embodiment of FIG. 1, FIGS. 25(a), (b) are enlarged views of a negative mask employed in the embodiment of FIG. 1.

Next, the shapes of the films to be processed by the film processing system of the present invention will be described with reference to FIG. 24.

The film 2 comprises a 135 mm type film having exposed and developed frames. In this, the frames 2a, 2a' are disposed along the length of the film with substantially equal pitch. The larger frame 2a of the frames 2a, 2a' has a longitudinal dimension x and a short side dimension y and this is referred to as the full-size. On the other hand, the smaller frame 2a' has a longitudinal dimension x and a short-side dimension yp and this is referred to as the panoramic size. The longitudinal dimensions x of the full-size and the panoramic size are the same. This film 2 includes these full-size frames 2a and the panoramic size frames 2a' in an irregularly mixed state.

On the outer sides of the frames 2a, 2a' relative to the width of the frame 2, there are regularly arranged the perforations 2b along the longitudinal direction of the film. These perforations 2b are used for e.g. the control of the film transport. Also, the film 2 is transported along its longitudinal direction while being subjected to such processes as the reading operation of the image information and the printing operation of the same onto the print paper.

Based on the image information read at the scanner section SC, the controller Co determines whether the frame of the film 2 is the full-size or the panoramic size and stores this information. That is, the controller CO functions as the judging means for judging the size of the frame of the film and also as storage means for storing the frame size of the film. This stored information is utilized by opening varying means to be described later for controlling the dimension of an opening.

Though not shown in FIGS. 3 and 4, on a side of the negative mask 33 opposite to the film transporting side, the opening varying means is provided.

Incidentally, the opening 88a of the negative mask 33 has a size corresponding to the full-size frame.

Next, an embodiment of the opening varying means relating to the present invention will be described with reference to the accompanying drawings.

Figure 25A:
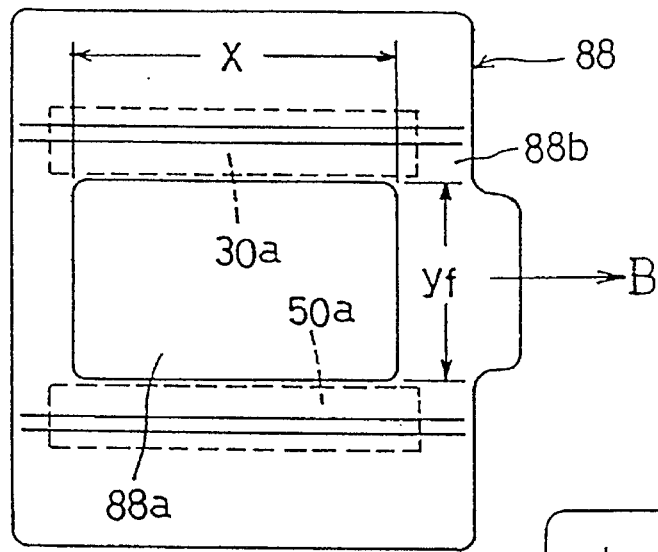

FIG. 25 shows the shape of the negative mask 88 and this mask has an opening 88a at the center thereof. The film 2 is transported in the arrowed direction B in the drawing on the film transporting face 88b of the negative mask 88. The image portion of the film 2 detected by the image detecting optical sensor 87 described before is stopped at this opening 88a. As shown in FIG. 25(a), this opening 88a has a longitudinal dimension X and a short-side dimension Yf and includes a first opening dimension corresponding to the full-size frame 2a.

Figure 25B:
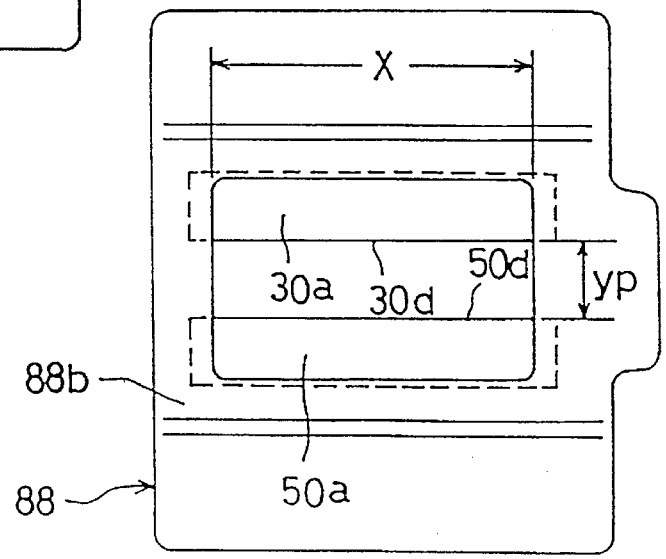

As shown in FIG. 25(b), the opening size corresponding to the panoramic size frame 2a' are the longitudinal dimension X and a short-side dimension Yp. This comprises a second opening dimension. The longitudinal dimension X is same for the full-size frame and also for the panoramic size frame; yet, the short-side dimension Yp of the panoramic size frame is shorter than that of the full-size frame.

Accordingly, for exposing and printing the panoramic size frame 2a', the upper and lower portions of the opening 88a in the longitudinal direction need to be partially shielded to provide the second opening dimension.

With reference to FIGS. 26 through 29, a specific construction of the opening varying means for realizing the second opening dimension will be described next.

A light shielding plate 30 acting as a first light shielding member includes a light shielding piece 30a having an elongated rectangular plate-like shape extending in a direction parallel with the film transport direction and the plate 30 further includes a side portion 30b at one longitudinal end thereof and a further side portion 30c at the other longitudinal end thereof, so that the light shielding piece 30a, the side portions 30b, 30c are connected to each other substantially in the form of the letter 'C'. The side portions 30b, 30c are shaped like flat plates extending normal to the film transport direction.

An end portion 30d of the light shielding piece 30a acts as an opening for the panoramic size frame.

Further, the side portion 30b includes an elongated hole 30e, a gear portion 30g acting as a first gear and a contact portion 30h. In the other side portion 30c also, a hole 30f, a gear portion 30g' acting as the first gear, and a contact portion 30h' are provided. The gear portions 30g and 30g' and the contact portions 30h and 30h' have substantially same shapes, respectively.

A line extending from the center of the elongated hole 30e and the hole 30f functions as a first axis and this extends parallel with the film transporting face and the film transporting direction.

On the other hand, a second light shielding member has the same shape as the first light shielding member. Namely, a light shielding plate 50 acting as the second light shielding member includes a light shielding piece 50a having an elongated rectangular shape extending in the direction parallel with the film transport direction, and the plate 50 further includes a side portion 50b at one longitudinal end thereof and a further side portion 50c at the other longitudinal end thereof, so that the light shielding piece 50a, the side portions 50b, 50c are connected to each other substantially in the form of the letter 'C'. The side portions 50b, 50c are shaped like flat plates extending normal to the film transport direction.

An end portion 50d of the light shielding piece 50a acts as an opening for the panoramic size frame.

Further, the side portion 50b includes a hole 50e, a gear portion 50g acting as a first gear and a contact portion 50h. In the other side portion 50c also, a hole 50f, a gear portion 50g' acting as the first gear, and a contact portion 50h' are provided. The gear portions 50g and 50g' and the contact portions 50h and 50h' have substantially same shapes, respectively.

A line extending from the center of the elongated hole 50e and the hole 50f functions as a second axis and this extends parallel with the film transporting face and the film transporting direction.

The first axis and the second axis are disposed apart from each other with a distance therebetween suitable for meshing and engaging the gear portion 30g, the gear portion 50g and the gear portion 30g' and the gear portion 50g', respectively.

Further, the contact between the contact portions 30h, 50h and between the contact portions 30h', 50h' provides the precision to the second opening dimension for the panoramic size frame determined by the end portions 30d, 50d. The light shielding plates 30, 50 are formed by pressing metal plates such as SUS304 (stainless steel: JIS). Further, these light shielding plates 30, 50 are preferably painted in black or plated in order to improve the reliability of their light shielding actions and to restrict reflection of light at the end portions 30d, 50d.

Next, the mechanism for supporting the light shielding plates 30, 50 will be described.

The elongated hole 30e is integrally connected with a drive shaft 24. The drive shaft 24 includes, at one end portion thereof 24a, an approximately oval projection engageable with the elongated hole 30e. And, by connecting means such as caulking, the drive shaft 24 and the light shielding plate 30 are connected integrally with each other. Further, the other end portion 24b of the drive shaft 24 is connected with a connected plate 35 to be described later. By interconnecting the drive shaft 24 and the light shielding plate 30 via the elongated hole 30e and the approximately oval projection, a drive force from a solenoid 48 to be described later may be transmitted in a reliable manner.

The drive shaft 24 is pivotably supported by means of a holder metal 33 secured to the lower unit 8. The hole 32f is engaged with the pin 32 secured to the lower unit 8, thereby to pivotably support the light shielding plate 30.

A hole 50*e* is engaged with a pin 54 secured to the lower unit 8, thereby to pivotably support the light shielding plate 50. Further, the elongated hole 55*f* is adapted to be engageable with an approximately oval projection 44*a* formed at one end of the pin 55 pivotably supported to the lower unit 8, and the pin 55 and the light shielding plate 50 are integrally connected with each other by such connecting means as caulking.

Figure 28A:
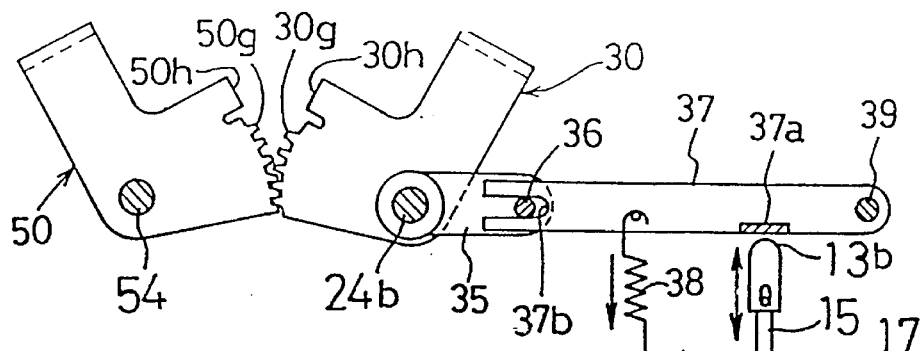
Figure 29:
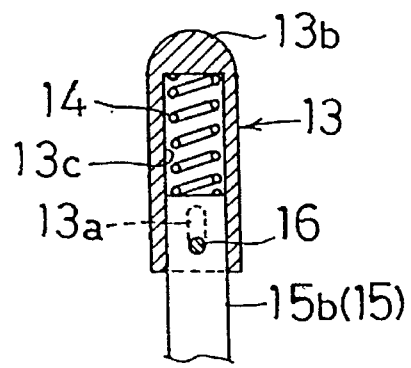
FIG. 29 is a partially enlarged descriptive view relating to the embodiment of FIG. 1.
Figure 30:
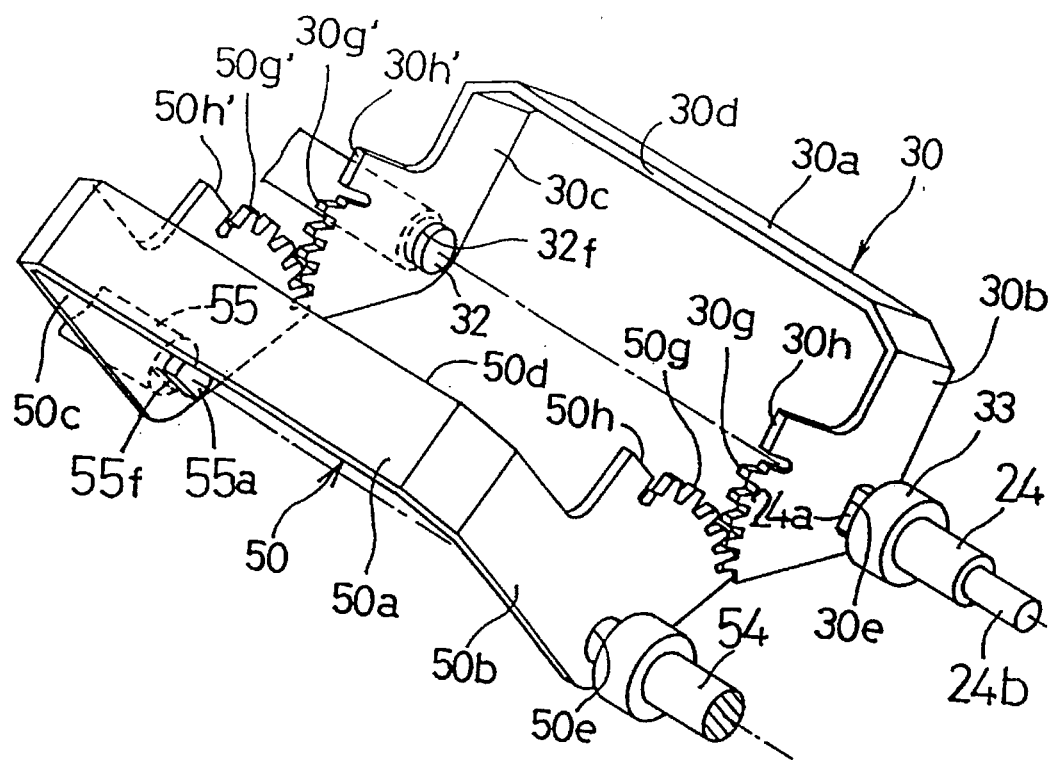
FIG. 30 is an enlarged perspective view of the major portions of the embodiment of FIG. 1.
Figure 31:
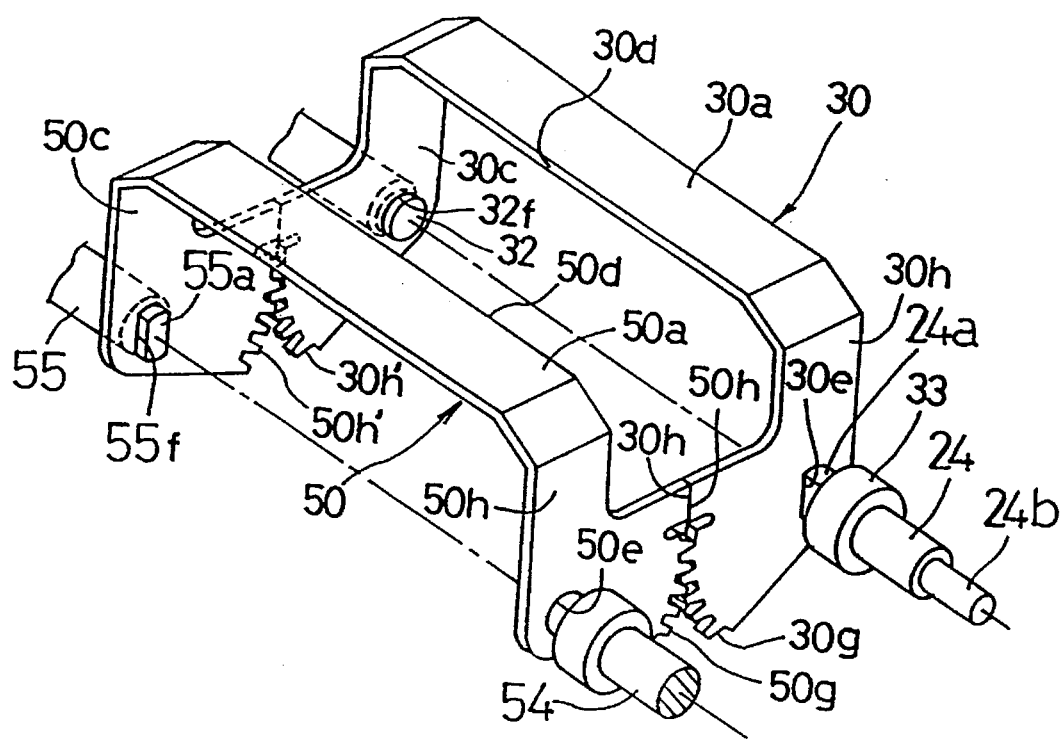
FIG. 31 is an enlarged perspective view of the major portions of the embodiment of FIG. 1.

Next, with reference to FIGS. 28 through 30, the drive means and the mechanism for transmitting the drive force of the drive means to the light shielding plates 30, 50 will be described.

In FIG. 28, there is provided the solenoid 48 as an example of the drive means. A movable portion 48*a* of this solenoid effects a linear movement in the arrowed direction in the drawing. A transmission plate 18 is pivotally supported to a pin 19 secured to a support plate 47. And, the movable portion 48*a* and the transmission plate 18 are rendered pivotable relative to each other via a pin 48*b*. The transmission plate 18 includes a bent portion 18*a*.

A transmission bar 15 has an elongated bar-like shape and is operable to slide a slide hole 17*a* formed in the support plate 17 in the arrowed direction of FIG. 28. A lower end portion 15*a* of the transmission bar 15 has an approximately spherical shape and is placed always in contact with the bent portion 18*a* of the transmission plate 18. A push-up member 13 is connected with an upper end portion 15*b* of the transmission bar 15. As shown in FIG. 29, this push-up member 13 defines a slide hole 13*e*, into which the upper end portion 15*b* is slidably engaged. Further, a compression spring 14 is fitted in this slide hole 13*c* for constantly urging the push-up member 13 in an arrowed direction in FIG. 28(*b*). Further, by means of the pin 16 provided at the upper end and a slot 13*a* defined in the push-up member 13, disengagement of the push-up member 13 from the transmission bar 15 is prevented. The push-up member 13 includes a leading end 13*b* having an approximately spherical shape.

A connecting plate 37 has an elongated flat plate-like configuration and is pivotably supported to a pin 39 secured to the lower unit 8. The connecting plate 37 is urged by a return spring 38 in the arrowed direction (the counter clockwise direction) in FIG. 28(*a*). A lower face of a bent portion 37*a* of the connecting plate 37 is disposed in opposition to the leading end 13*b* of the push-up member 13. In the condition shown in FIG. 28(*a*), there is formed a small gap between the lower face of the bent portion 37*a* and the leading end 13*b*. Further, on the other end of the connecting plate 37 opposite to its pivot, there is provided a slot 37*b*.

To the other end portion 24*b* of the drive shaft 24, the connected plate 35 is connected by means of e.g. caulking, so that the drive shaft 24 and the connected plate 35 are rotated in unison. The connected plate 35 includes a pin 36 which is engaged with the slot 37*b* of the connected plate 37. Through this engagement, the rotational force of the connected plate 37 is transmitted to the connected plate 35.

Figure 26:
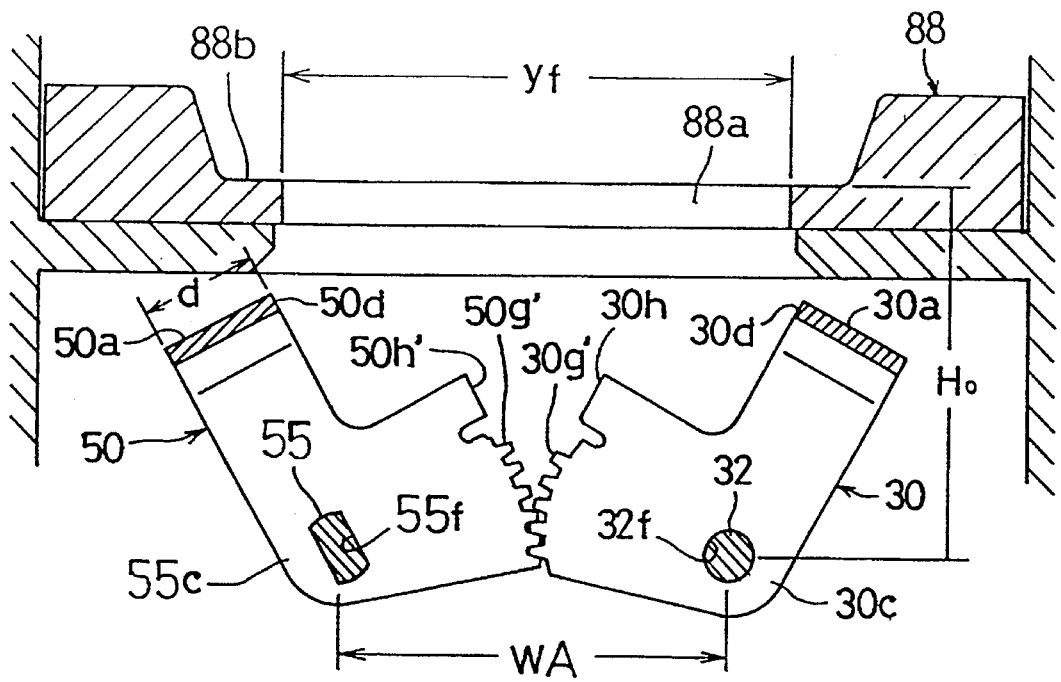
FIG. 26 is an enlarged section view showing the major portions of the embodiment of FIG. 1.
Figure 27:
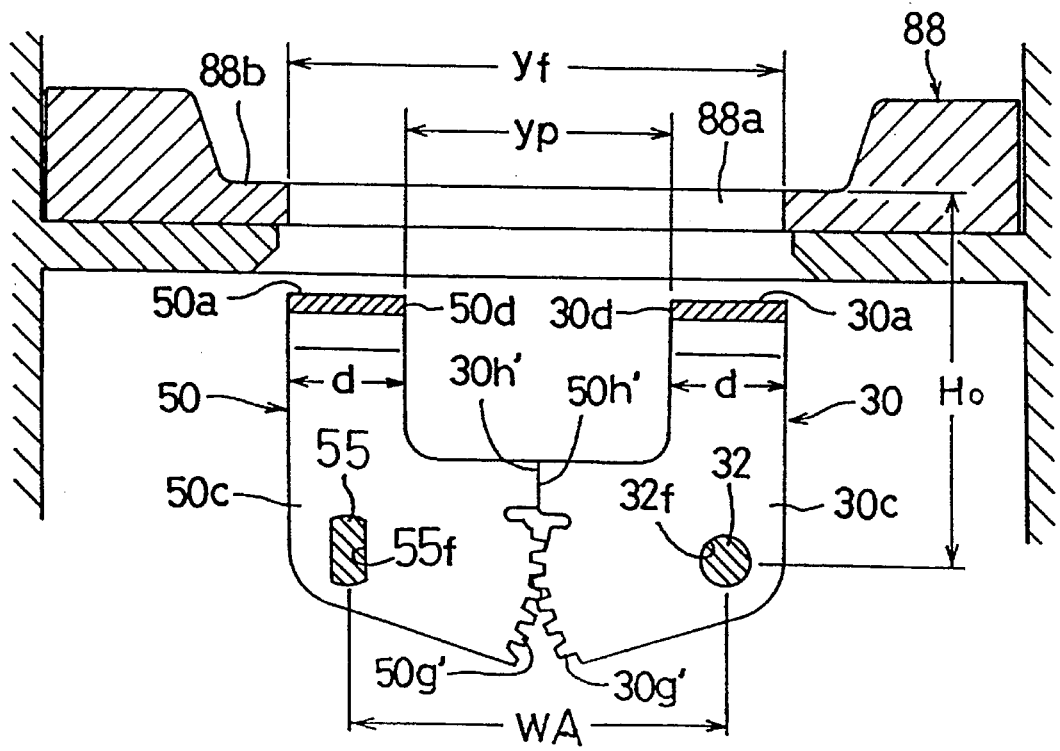
FIG. 27 is a section view showing the major portions of the embodiment of FIG. 1, FIGS. 28(a), (b) are views illustrating functions of the embodiment of FIG. 1.

Next, the function of the opening varying means will be described. FIGS. 26 and 28(*a*) show a condition for exposing and printing a full-size frame. In this condition, the light shielding pieces 30*a*, 50*a* of the light shielding plates 30, 50 are retracted away from the opening 88*a* of the mask 88, and this position will be referred to as the 'retracted position' hereinafter for the sake of convenience of description. FIGS. 27 and 28(*b*) show a further condition for exposing and printing a panoramic-size frame. In this condition, the light shielding pieces 30*a*, 50*a* of the light shielding plates 30, 50 are positioned to shield a portion of the opening 88*a* of the mask, and this position will be referred to as the 'light shielding position' hereinafter for the sake of convenience of description.

In exposing and printing the full-size frame, the opening 88*a* of the mask 88 functions an an opening having the first opening dimension. In this, the light shielding plates 30, 50 are located at the retracted position so as not to block the optical path for exposing and printing the full-size frame. In this retracted position, the solenoid 48 is un-energized. The light shielding plates 30, 50 are located at the respective retracted position, and these light shielding plates 30, 50 are urged to the retracted positions thereof by the urging force of the return spring 38 through the connecting plate 35 and the connected plate 37. More specifically, in FIG. 26, the light shielding plate 30 is urged clockwise and the light shielding plate 50 is urged counter clockwise.

After completion of the exposure-printing of the full-size frame, the film is transported so as to bring a next frame into the opening 88*a* of the mask 88. Then, if this next frame to be printed comprises a panoramic size frame, the opening dimension is varied as will be described next.

First, the solenoid 48 is switched over from the un-energized state to the energized state. With this, the movable portion 48*a* is moved in the arrowed direction in FIG. 28(*b*). In association with this movement, the transmission plate 18 is pivoted about the pin 19 in the arrowed direction (the clockwise direction) in FIG. 28(*b*), so that the bent portion 18*a* causes the transmission bar 15 to move along the straight path in the arrowed direction (the upper direction). Then, after the bent portion 37*a* and the leading end 13*b* come into abutment against each other, the connecting plate 37 is pivoted about the support pin 39 in the direction of the arrow (clockwise direction) in FIG. 28(*b*) against the urging force of the return spring 38. Then, in association with this pivotal movement of the connecting plate 37, the connected plate 35 is pivoted in the arrowed direction (the counter clockwise direction) and the drive shaft 24 rotatable in unison with the connected plate 35 is pivoted in the same direction as well.

The compression spring 14 functions as a damper for absorbing the shock caused by the abutment between the leading end 13*b* and the bent portion 37*a*. With this, the drive force of the solenoid 48 may be smoothly transmitted, so that the application of strong impact or load to the light shielding plates 30, 50 may be advantageously avoided.

With the above, the light shielding plate 30 is pivoted counter clockwise from the condition of FIG. 26. Since the gear portions 30*g*, 50*g* and the portions 30*g*', 50*g*' are respectively meshed with each other, the light shielding plate 50 is pivoted clockwise in FIG. 26 in association with the above-described counter clockwise pivotal movement of the light shielding plate 30. Then, after these light shielding plates 30, 50 are pivoted by predetermined angles, as illustrated in FIGS. 27, 28(*b*), the contact portions 30*h*, 50*h* and the portions 30*h*', 50*h*' respectively come into contact with each other, thereby to stop the pivotal movements of the light shielding plates 30, 50 at the light shielding positions thereof. With this, the short side of the panoramic-size opening dimension Yp (see FIG. 25) is determined by the end portions 30*d*, 50*d*. Incidentally, since the long side opening dimension for the panoramic size is identical with that of the full-size, this long side dimension of the opening 88*a* of the mask 88 for the panoramic size is determined by the long side dimension x of the opening 88*a* of the full-size mask 88. In the condition shown in FIGS. 27, 29, there is realized the second opening dimension comprising the opening dimension for the panoramic-size frame.

At the light shielding position, the light shielding pieces 30a, 50a are maintained to be substantially parallel with the film transport face 88b. Further, at this light shielding position, the compression spring 14 is slightly compressed.

Next, for driving the light shielding plates 30, 50 from the light shielding position to the retracted position, this may be realized by switching over the solenoid 48 from the energized state to the un-energized state. With this, the respective components will be operated in the opposite manner to that described above.

Figure 28B:
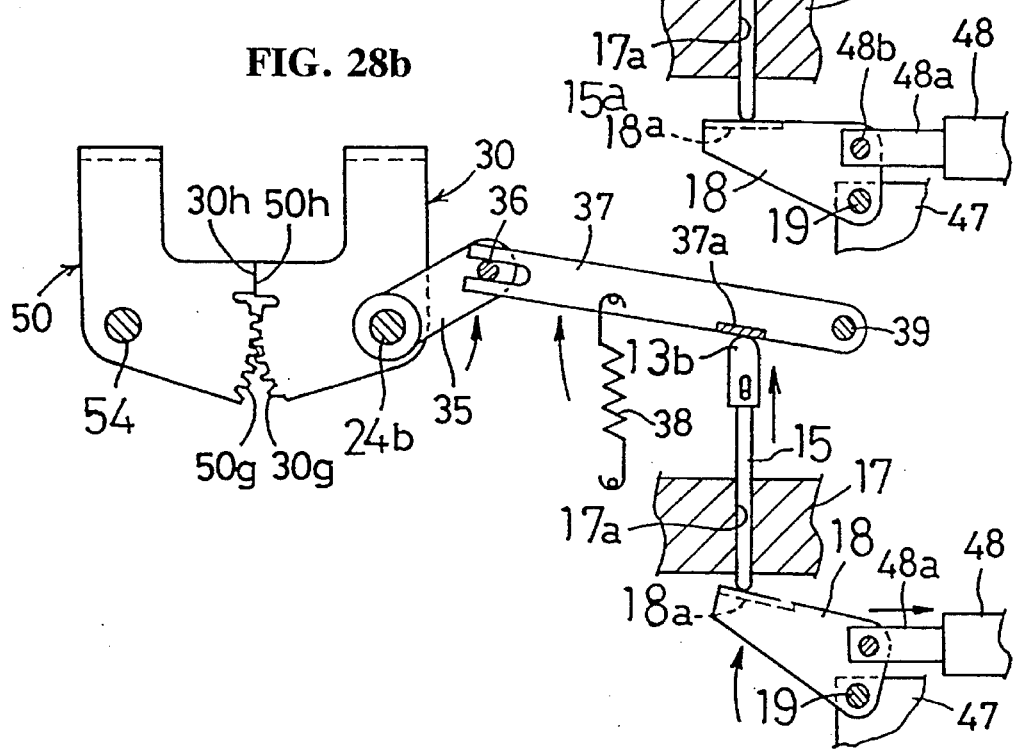

Specifically, the movable portion, 48a of the solenoid 48 is moved along the straight path in the opposite direction to the arrowed direction in FIG. 28(b). With this, the transmission plate 18 is pivoted counter clockwise in FIG. 28(b) and the transmission bar 15 too is returned in the downward direction. In association with this movement of the transmission bar 15, the leading end 13b of the push-up member 13 is moved in the direction away from the bent portion 37a. Thus, the connecting plate 37 is pivoted counter clockwise in FIG. 28(b) by the urging force of the return spring 38 and the connected plate 35 and the drive shaft 24 too are pivotably returned clockwise.

In association with the pivotal movement of the drive shaft 24, the light shielding plates 30, 50 too are pivoted back toward the respective retracted positions shown in FIGS. 27, 28(a).

The controller CO stores data to determine whether the image information obtained from the scanner-section transport unit U1 comprises a full-size frame 2a or a panoramic-size frame 2a'. Accordingly, the discrimination of the size of the frame to be next printed is possible in advance. Thus, based on this information, the energized state and the un-energized state of the solenoid 48 are controlled by the controller CO.

As shown in FIG. 26, the first axis and second axis of the light shielding plates 30, 50 are remote by a distance Ho from the film transport face 88b. Then, if this distance Ho is extended, the angle over which the light shielding plates 30, 50 have to pivot between the retracted position and the light shielding position may be smaller. And, with this reduction in the pivot angle, the energy required for driving the plates too may be smaller and the driving load on the solenoid 48 may be reduced correspondingly. Further, by disposing the axes remotely from the film transport face, the light shielding plates 30, 50 may be readily attached. Thus, the values of these dimensions should be appropriately selected with consideration to e.g. the size of the components of the exposure-section film transport unit U2.

As for a distance WA between the first axis and the second axis, this should be so determined that the light shielding pieces 30a, 50a may be located in parallel with the film transport face 88b at the retracted position. Specifically, supposing the width of the light shielding pieces 30a, 50a is (d); then, the first axis and the second axis should be disposed on the center line of this width (d). Accordingly, as shown in FIG. 27, the inter-axis distance WA is preferably shorter than the full-size short side dimension Yf and longer than the panoramic-size short side dimension Yp. Then, based on this distance WA, the specifications of the gear portions 30g, 50g will be designed.

Next, other embodiments of the present invention will be described.

(1) In the foregoing embodiment, the movable frame 91a is provided to the upper unit 7. Instead, this movable frame 91a may be provided to the lower unit 8.

(2) In the foregoing embodiment, the movable frame 91a is supported to the cover 7a of the upper unit 7 via the pin 70. An alternate construction is conceivable that one end of the compression spring 71 is secured to the cover 7a and the other end of the same is secured to the movable frame 81a so that the compression coil spring 71 supports the movable frame 91a.

(3) In the foregoing embodiment, the positioning engaging portion of the upper unit 7 comprises the cylindrical positioning pin 94a, while the positioning engaging portion of the lower unit 8 comprises the positioning hole 94b having the shape corresponding to that of the positioning pin 94a. The specific shapes of these positioning engaging portions 94a, 94b may be conveniently varied. For instance, for smooth engagement, the positioning pin 94a may have a tapered conical shape.

(4) In the foregoing embodiment, only the upstream support member 91a is rendered movable. Instead, the downstream support member 91b too may be rendered movable. Further, both the upstream support member 91a and the downstream support member 91b may be fixed.

(5) In the foregoing embodiment, the lower unit 8 includes the light emitting portions 85a, 86a, 87a of the film information detecting optical sensors 85, 86, 87 while the upper unit 7 includes the light receiving portions 85b, 86b, 87b of the same. Conversely, the light emitting portions 85a, 86a, 87a may be provided to the upper unit 7 and the light receiving portions 85b, 86b, 87b may be provided to the lower unit 8.

(6) In the foregoing embodiment, the drive rollers 80a, 80b, 80c, 80d, 80e for driving and transporting the film 2 and the motors 83a, 83b for driving these drive rollers 80a, 80b, 80c, 80d, 80e are disposed within the exposure-section film transport unit U2. Instead, it is also conceivable for this unit not to incorporate the drive means for transporting the film 2 but to incorporate only he guides for guiding and supporting the film 2.

(7) In the foregoing embodiment, the scanner-section film transport unit U1 is slided and then the exposure-section film transport unit U2 is detached from the photographic printing system 1, thereby to effect the switching-over between the set condition and the retracted condition. Whether this switch-over operation is effected by the sliding operation or detaching operation may be conveniently selected.

Further, in place of moving these transport units U1, U2 on the rails, it is also conceivable to provide the positioning engaging portions on the support table 40 and the two transport units U1, U2, thereby to render these transport units U1, U2 respectively detachably at the scanner section SC and the exposure section EX.

(8) In the foregoing embodiment, the index M is provided to the negative mask 31 providing the processing position at the scanner section SC. In this respect, the further negative mask 88 providing the processing position at the exposure section EX for printing the image information of the film 2 onto the print paper 3 may be provided with the same construction with such index M. In this case, the exposure section Ex functions as the film processing means.

(9) In the foregoing embodiment, the second index portion M2 is designed to correspond to the short side of the half-size frame 2a. Instead, this may be designed to have a length for indicating only the proper position of the end of the half-size frame 2a in the transport direction.

(10) In the foregoing embodiment, the projection 31b formed on the negative mask 31 on the side of the mirror tunnel 53 comprises the second index portion M2. Instead, it is conceivable to provide this second index portion M2 by forming a pawl on the face of the negative mask 31 on the side of the image sensor 51 with slightly projecting to the position of the perforation of the film 2 with the projection not obstructing the optical path L1 and being located within the view range L2 of the operator.

(11) In the foregoing embodiment, the index M includes the first index portion M1 and the second index portion M2. Instead, only one of them, e.g. the negative mask 31, may be provided as the index M.

(12) In the foregoing embodiment, the rod type lens is used as the lens. However, the type of this lens is not limited thereby. For instance, any other refractive index distribution type of lens capable of achieving the object of this invention may be employed instead.

(13) In the foregoing embodiment, the refractive index distribution of the rod type lens is represented by the Expression (1). However, this is not limited thereto, but may be modified in any other manner. Further, the described rod type lens is placed in close contact with the light receiving face. However, this construction too is not limited in the present invention. For instance, these may be located slightly apart from each other. Yet, by placing these in such close vicinity to each other, the effect of the present invention will be achieved more conspicuously.

(14) In the foregoing embodiment, the light emitting portions comprises the light emitting diodes. This too is not limited thereto in the present invention. For instance, other types of light emitting elements such as incandescent lamps, EL plates may be employed. Further, the emitted light may be any kind, e.g. visible light, near-infrared light, infrared light, selectable in accordance with the characteristics of the light receiving portions.

Also, in place of the photo transistors, the light receiving portions may comprise any other type capable of detecting other kind of light.

(15) In the foregoing embodiment, the transport means for transporting the film is constructed from the drive rollers, the pressing rollers, the belts and the motors. The construction of the transport means is not limited thereto. For instance, it may be constructed so that each roller is driven by a motor corresponding thereto. Further, the film may be transported not by rollers but by sprockets. Any other modification in the construction will be also conceivable.

(16) In the foregoing embodiment, the 135 mm negative film is used. Instead, any other kind of film may be employed. Further, the invention may be used for processing not a negative film but a positive film. The size of the film frame too is not limited to the two sizes of the full-size and panoramic size, and the invention may be used for processing any other size of film frame.

For instance, the invention may be used for processing such a film as including full-size frames and high-vision size frames in a mixed state or as including full-size frames and half-size frames in a mixed state. In such cases, the first axis and the second axis should be disposed so as to extend normal to the film transport direction.

(17) In the foregoing embodiment, the film includes full-size frames and panoramic size frames in a mixed state. Needless to say, the present invention may be applied for processing a film including only full-size frames or only panoramic size frames.

(18) In the foregoing embodiment, the system is so constructed as being capable of coping with the two kinds of sizes, i.e. the full size and panoramic size. Instead, the system may be adapted to cope with three types of frames of e.g. the full-size, high-vision size and panoramic size.

That is, if the system is so designed as to stop the light shielding plates not only at the retracted position and the light shielding position but at a further position therebetween, this system may provide more than three kinds of opening dimensions.

(19) In the foregoing embodiment, the first opening dimension is determined by the opening of the mask and the second opening dimension is determined by the mask and the pair of light shielding members. The construction is not limited thereto. For instance, both the first opening dimension and the second opening dimension may be determined by only the pair of light shielding members.

(20) In the foregoing embodiment, the light shielding members are formed by pressing of metal material. Instead, these may be formed of plastic resin. The members formed of plastic are lighter than those made of metal; thus, there is the advantage that the energy required for driving the light shielding members may be smaller.

(21) In the foregoing embodiment, the gear portions are formed integrally with the light shielding plates. Instead, the gear portions may be formed as separate elements which may be pivotable in unison with the light shielding plates. By constructing these as such separate elements, it becomes possible to form the light shielding plates by pressing metal material and to form the gear portions of plastic material. And, this separate type construction is advantageous when the light shielding piece has a thinner thickness and the gear portion has a greater tooth width.

In the foregoing embodiment, the solenoid is used as the drive means. Instead, a solenoid motor, a pulse motor, a DC motor or the like may be employed.

(22) A still further embodiment of the invention will be described next.

A scanner-section film transport unit U1' of this further embodiment is constructed as will be described next.

The inner construction of this scanner-section film transport unit U1' is substantially the same as that of the exposure-section film transport unit U2 described in the foregoing embodiment. Thus, those components thereof having the same functions are denoted with the same reference marks and numerals.

This scanner-section film transport unit U1' includes, as a pair of frame members, an upper unit 7' and a lower unit 8' pivotably connected to each other to be opened and closed. And, these members are urged in the opening direction by means of an unillustrated spring.

Figure 32:
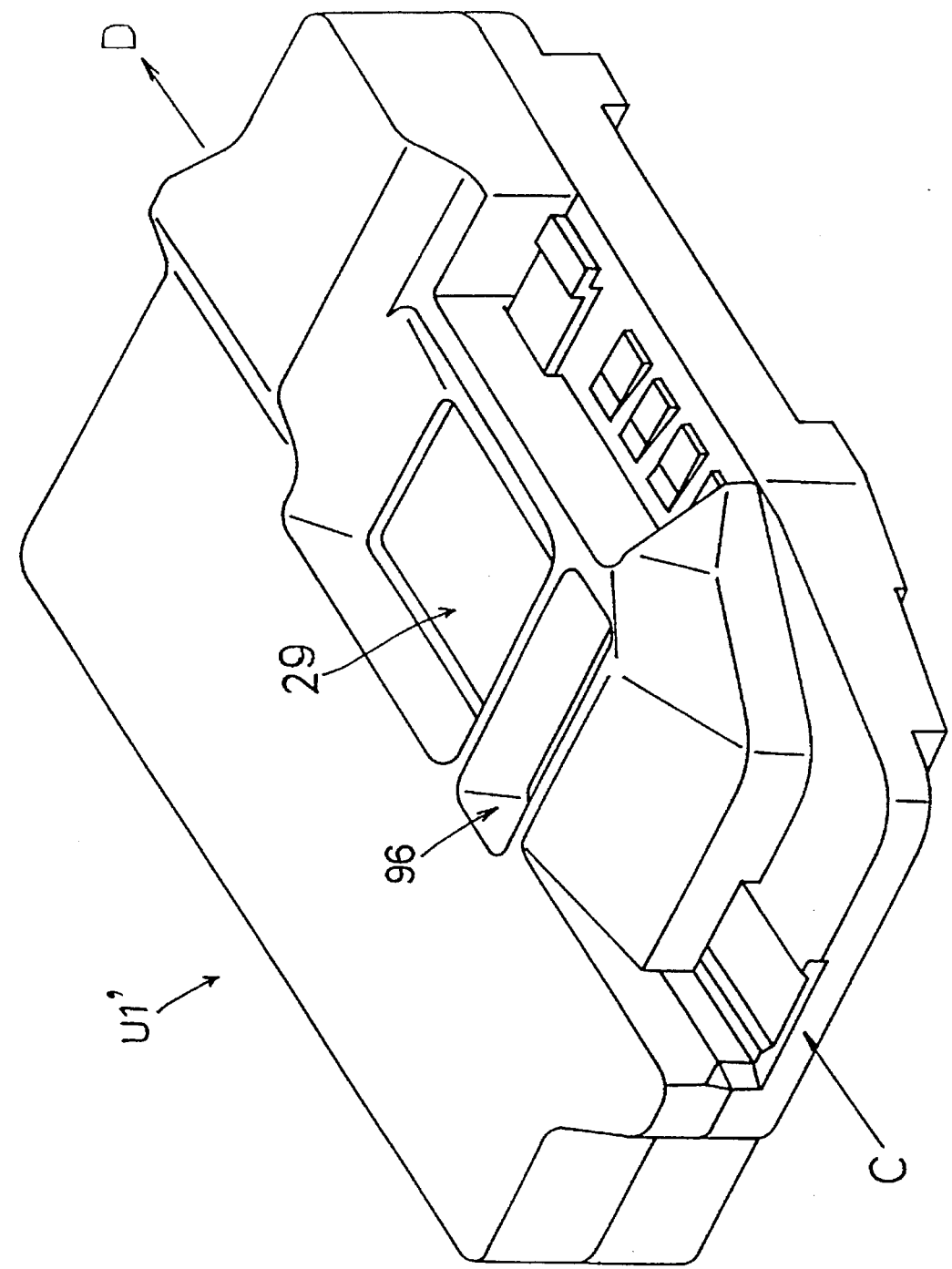
FIG. 32 is a perspective view of major portions of a further embodiment.
Figure 33:
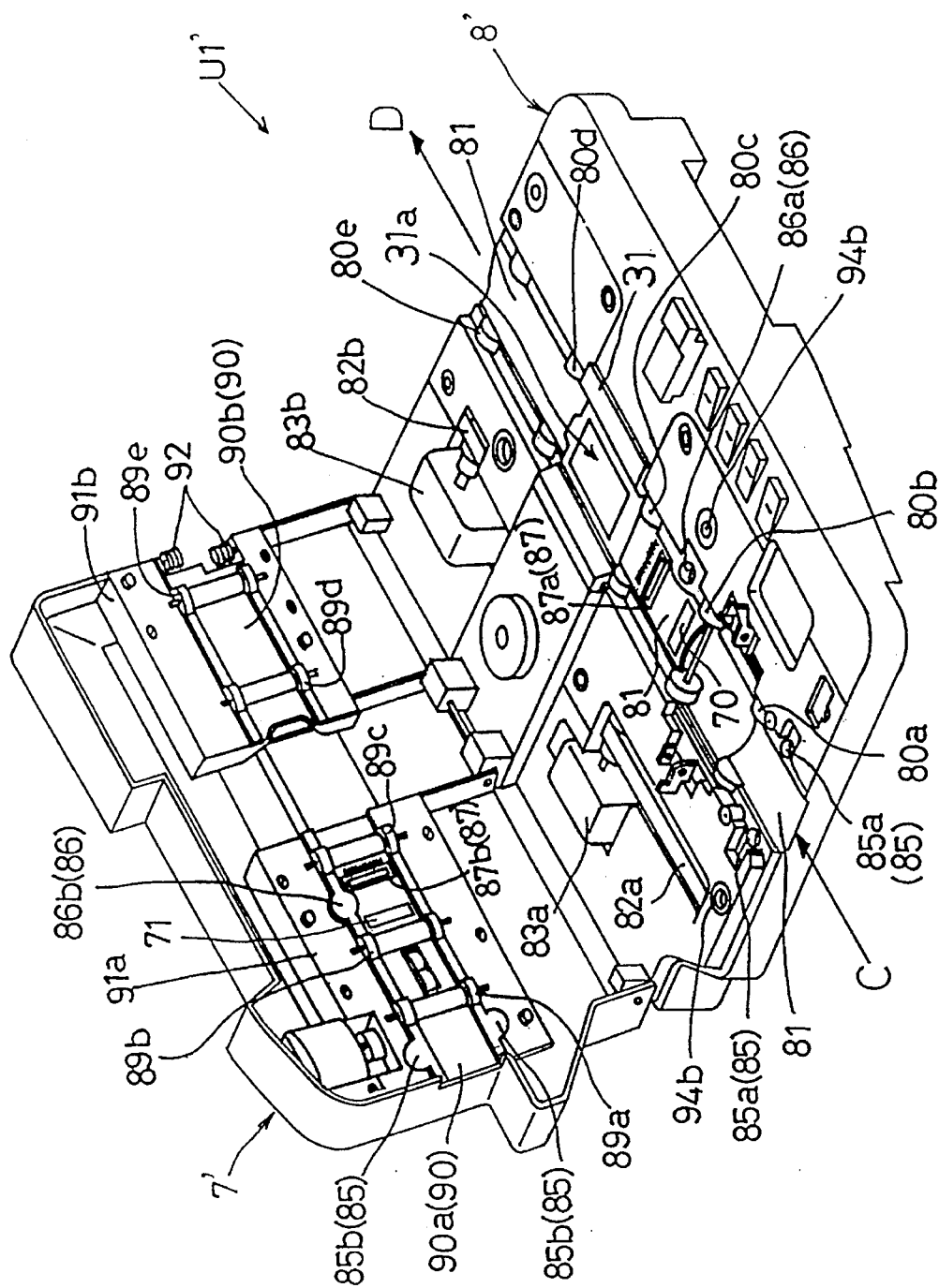
FIG. 33 is a perspective view of the major portions of the embodiment of FIG. 32.
Figure 34:
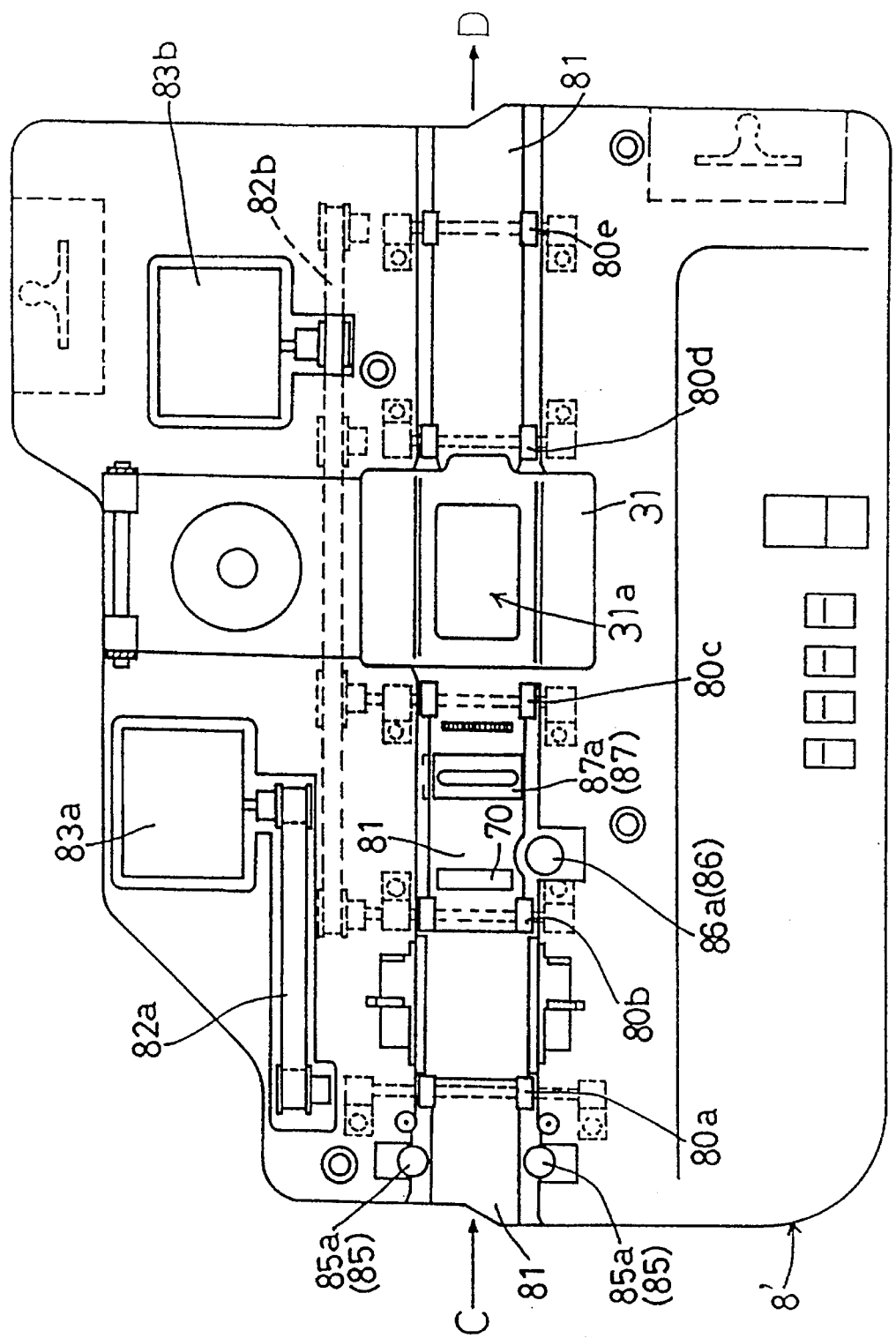
FIG. 34 is an enlarged view of the major portions of the embodiment of FIG. 32, FIGS. 35(a), (b) are perspective views of the major portions of the embodiment of FIG. 32.

FIG. 32 shows a condition where the upper unit 7' and the lower unit 8' are closed. And, FIG. 33 shows a further condition where these units are opened. This film 2 is inserted in the arrowed direction C and discharged in the further arrowed direction D. In FIG. 32, a reference numeral 29 denotes a scanner opening, and this opening 29 includes a fist film stop position confirming portion as will be described later, and a viewer portion 96 includes a second film stop position confirming portion.

As shown in FIG. 33, the lower unit 8' includes drive rollers 80a, 80b, 80c, 80d, 80e, a lower guide 81 for supporting and guiding right and left ends of the film 2 and defining a recess at a portion thereof where an image-bearing face of the film 2 is to pass through, a motor 83a for driving the drive roller 80a via a belt 82a, a further motor 83b for driving the rollers 80b, 80c, 80d, 80e via a further belt 82b, a pivot guide 84 which forms a part of a film loop forming mechanism R to be detailed later, a light emitting portion 85a of a DX code detecting optical sensor 85 for detecting a DX code of the film 2, a light emitting portion 86a of a perforation detecting optical sensor 86 for detecting perforations of the film 2, a light emitting portion 87a of an image detecting optical sensor 87 for detecting the image-bearing area of the film 2, and a negative mask 31 having an opening 31a for regulating an area to be printed on the print paper 3 of the image-bearing area of the film 2. Though will be described more particularly later, a lower light introducing hole 70 is a hole for introducing the light passing the mirror tunnel 53 to the viewer portion 96.

Incidentally, the mask 31 is fixedly provided as having the opening 31a corresponding the dimension of the full-size frame of the film 2.

The upper unit 7', as shown in FIG. 33, includes an upper guide 90 for supporting and guiding, in cooperation with the above-described lower guide 81, the right and left ends of the film 2 and also defining a recess at a portion thereof where the image-bearing face of the film 2 is passed through. The upper guide 90 consists essentially of an upstream portion 90a formed in an upstream support member 91a located on the upstream side of the transport passage of the film 2 across the position of the negative mask 31 where the irradiation light from the scanning light source 50 travels and a downstream portion 90b formed in a downstream support member 91b disposed on the downstream side of the transport passage of the film 2.

The upstream support member 91a includes pressing rollers 89a, 89b, 89c disposed in positions corresponding to the drive rollers 80a, 80b, 80c when the upper unit 7' and the lower unit 8' are closed to each other, a light receiving portion 85b of the DX code detecting optical sensor 85, a light receiving portion 86b of the perforation detecting optical sensor 86, a light receiving portion 87b of the image detecting optical sensor 87, and a solenoid 93 forming a further part of the film loop forming mechanism R to be described later. The downstream support member 91b includes pressing rollers 89d, 89e disposed at positions corresponding to the drive rollers 80d, 80e when the upper unit 7' and the lower unit 8' are closed to each other and an exit roller 92.

An upper light introducing hole 71 is provided for guiding the light introduced from the lower light introducing hole 70 to the viewer portion 96. And, the upper light introducing hole 71 and the lower light introducing hole 70 are disposed in opposition to each other across the film transport face.

Next, the functions and operations of the scanner-section film transport unit U1' having the above-described construction will be briefly described.

As the film 2 is inserted into the scanner-section film transport unit U1', the film 2 is transported with its right and left ends being pinched by the drive rollers 80a, 80b, 80c, 80d, 80e and the pressing rollers 89a, 89b, 89c, 89d and 89e. These drive rollers 80a, 80b, 80c, 80d, 80e, the pressing rollers 89a, 89b, 89c, 89d, 89e and the motors 83a, 83b together function as transport means TM for transporting the film 2.

In the course of this transport, the image detecting optical sensor 87 discriminates between the image area and the non-image area of the film 2. Based on this detection, the un-illustrated control circuit provided in the lower unit 8' controls the operation of the motor 83b to properly stop the image area of the film within the opening 31a of the negative mask 31 and a scanning operation of the image information is effected under the control of the controller CO.

An exposure-section film transport unit U2' to be used in combination with the scanner-section film transport unit U1' is as shown in FIGS. 2 through 4. And, the scanner-section film transport unit U1' and the exposure-section film transport unit U2' are disposed on the support table 40 for use in the manner as illustrated in FIG. 12.

Figure 36:
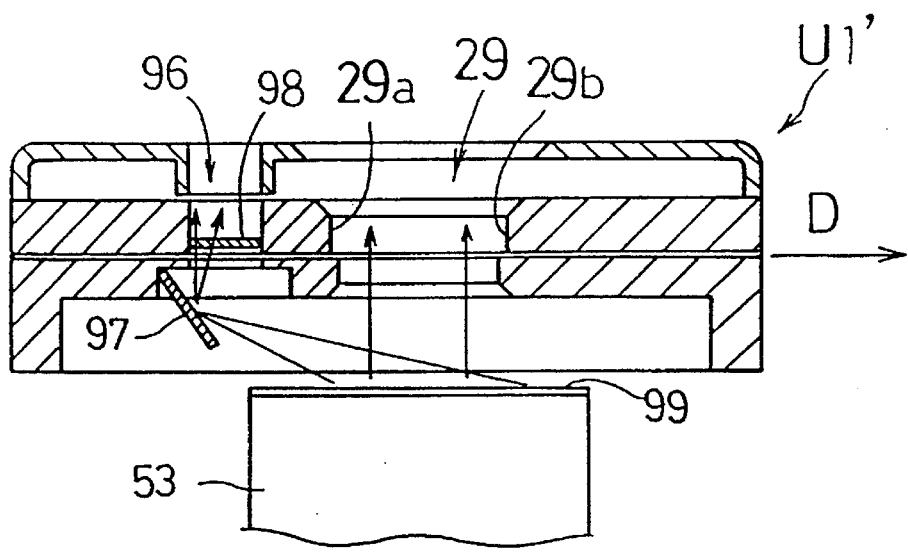
FIG. 36 is a section view of the major portions of the embodiment of FIG. 32.

In the setting condition shown in FIG. 36, the opening 29 of the scanner-section film transport unit U1' is located on the optical path of the irradiation light from the light source 49 of the scanner section SC, whereas the opening 31a of the mask 31 of the exposure-section film transport unit U2 is located on the optical path of the irradiation light from the exposure light source 60. Thus, these units are located at the respective set positions for the film transport in the scanner section SC and the exposure section EX.

Under this set condition, the transport passages of the film 2 of the scanner-section film transport unit U1' and the exposure-section film transport unit U2 are serially aligned.

If the scanner-section film transport unit U1' and the exposure-section film transport unit U2 are set to the condition shown in FIG. 12, when the film 2 is introduced into the scanner-section film transport unit U1', the image information of the film 2 is serially scanned by the image sensor 51 of the scanner section SC. And, this film 2 whose image scanning operation has been completed is introduced directly into the exposure-section film transport unit U2 for serial exposure operations.

Figure 35A:
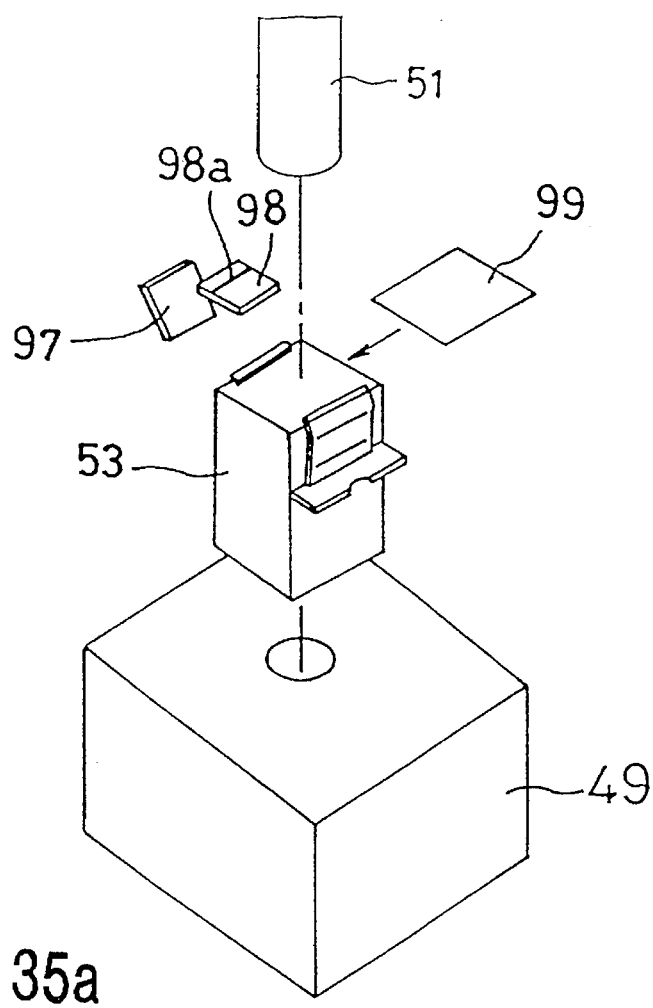
Figure 35B:
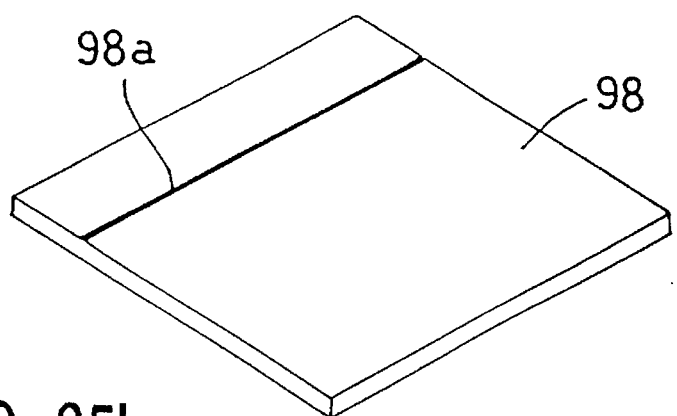

Next, the mechanism of the film stop position confirming portions relating to the present invention will be described in details with reference to FIGS. 35 through 37.

Figure 37:
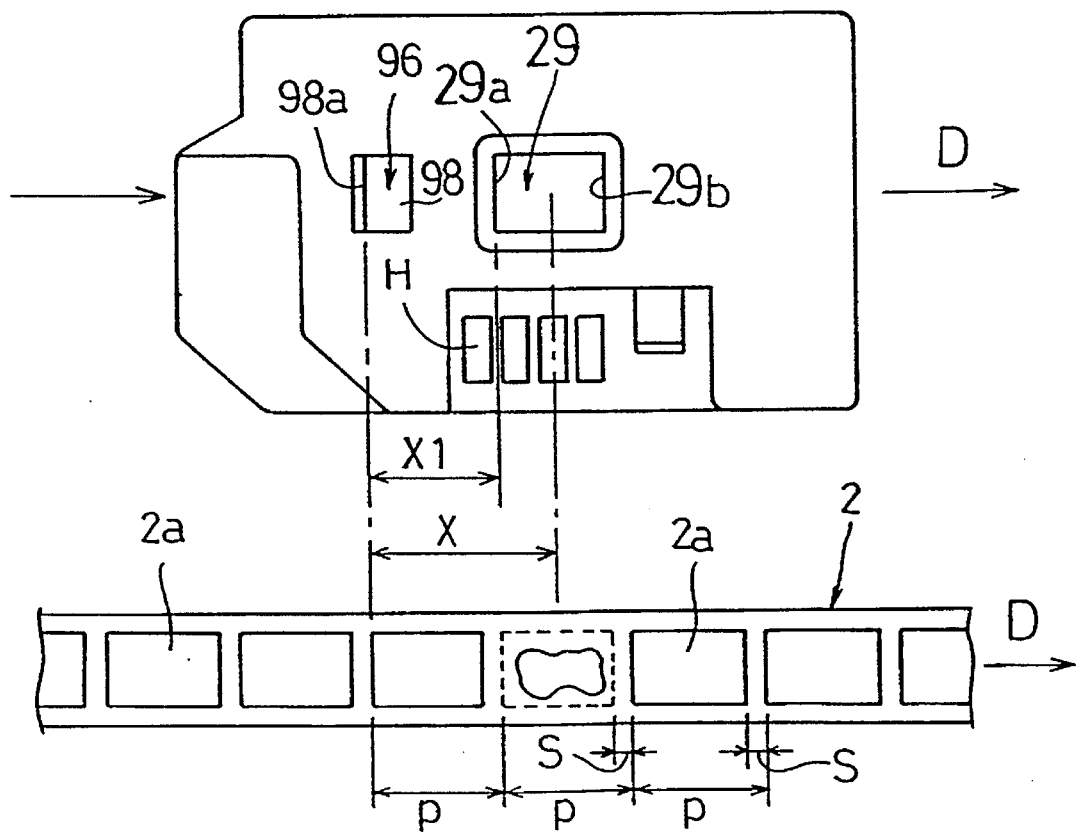
FIG. 37 is a plane view of the major portions of the embodiment of FIG. 32.

In FIGS. 36 and 37, the light irradiated from the light source 49 and passing through the mirror tunnel 53 and a diffuser 99 passes through the opening 29. Then, the image sensor 51 reads the image information of the film 2 located within the opening 29. The light passing through the mirror tunnel 53 and the diffuser 99 is uniformly mixed and has no orientation. The diffuser 99 is disposed at the exit opening of the mirror tunnel 53 and functions to diffuse the light.

A portion of the light through the mirror tunnel 53 is reflected by a reflecting plate 97 and introduced to the viewer portion 96. The light component reflected by the reflecting plate 97 is caused to pass the film 2 and then through a sheet 98 disposed immediately above this film 2 and this light reaches the viewer 96. That is, the reflecting plate 97 functions as introducing means for introducing the light passing the mirror tunnel 53 to the second film stop position confirming portion. This sheet 98 is formed of transparent resin material such as polycarbonate. A line 98a is formed by painting or printing on the sheet 98. By aligning this line 98a and a frame edge of the film 2, the stop position of the frame of the film 2 is confirmed. This line 98a indicates the proper position of the frame edge of the film 2. That is to say, this line 98a functions as the second film stop position confirming portion.

The opening 29 has a rectangular configuration corresponding to the size of the frame of the film 2. And, the opening 29 includes an upstream edge 29a and a downstream edge 29b extending normal to the film transport direction. Then, by aligning the upstream edge 29a and the downstream edge 29b with the frame edge of the film 2, the stop position of the frame of the film 2 is confirmed. These upstream and downstream edges 29a, 29b indicate the proper position of the frame of the film 2. That is to say, the upstream edge 29a and the downstream edge 29b respectively function as the first film stop position confirming portion.

Next, the dimensional relationship between the position of the frame of the film 2 and the first and second film stop position confirming portions will be described with reference to FIG. 37.

The frames 2a of the film 2 are disposed with an equal pitch P and has a non-image area of a width S between the adjacent frames. Here, a distance X1 between the upstream edge 29a and the line 98a is set to be equal to the frame pitch p. That is: $X1 = p \times N$ (N=1), so that N1 is an integer multiple of (p). X1 is set as such integer multiple of (p) because the frames 2a of the film 2 are disposed with substantially the same pitch. For the confirmation of the stop position of the film 2, at the opening 29, this is done by confirming the stop position of the frame 2a of the film at both the upstream and downstream edges 29a and 29b. Further, at the viewer portion 96, this is done by aligning the upstream frame edge of the frame 2a of the film 2 to the line 98a.

Next, the operation for confirming the stop position of the frame 2a of the film 2 will be described.

As the film 2 is inserted to the scanner-section film transport unit U1', the film 2 is transported by the drive rollers 80a, 80b, 80c, 80d, 80e. For the frame(s) of the film 2 which have been transported, the edge portion of the frame is detected by the image detecting optical sensor 87; then, based on this detected information, the frame of the film 2 is registered with the mask 31 (the opening 29).

Now, the detection of the frame edge of the film 2 will be described with reference to FIG. 40.

Figure 40A:
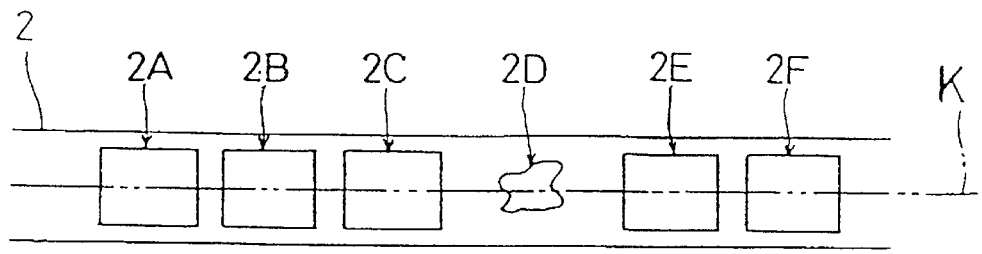
Figure 40B:
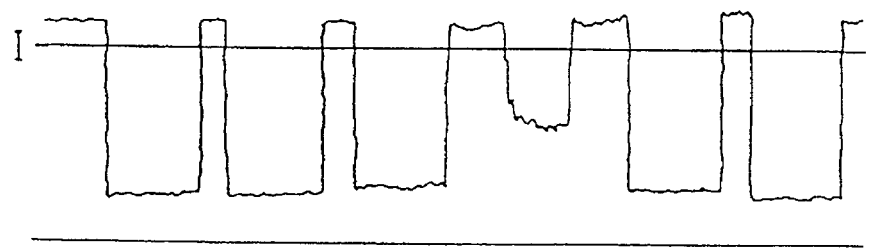

For instance, if the frames 2A through 2F are arranged one after another as shown in FIG. 40(a) and the frames 2A, 2B, 2C, 2E, 2F were exposed under normal exposure conditions and these frames are disposed with an equal pitch therebetween. Whereas, the frame 2D was insufficiently exposed so that its image area and its non-image peripheral area are clearly distinguished in their concentrations. Then, a transmission light amount of this film 2 is measured along a two-dot chain line K, the image detecting sensor 87 will outputs a signal as illustrated in FIG. 40(b).

This detection information of the image detecting optical sensor 87 is transmitted to the controller CO. Then, the controller CO binarizes a signal transmitted by a reference signal denoted by a straight line I in FIG. 40(b) into an 'L'-level signal indicating a low transmission light amount below the reference value, i.e. a transmission density over a predetermined value and an 'H'-level signal indicating a a high transmission light amount over the reference value, i.e. a transmission density below the predetermined value, as illustrated in FIG. 40(c).

Figure 40C:
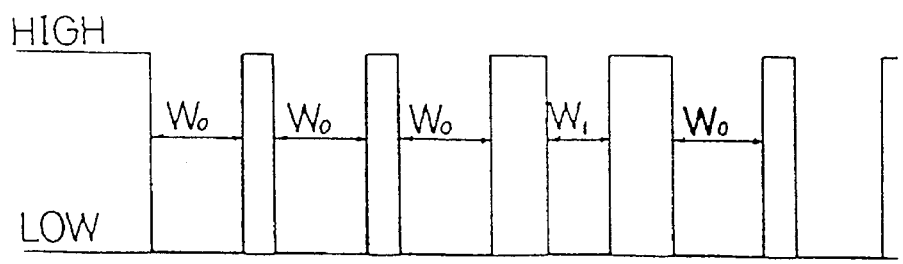
Figure 41:
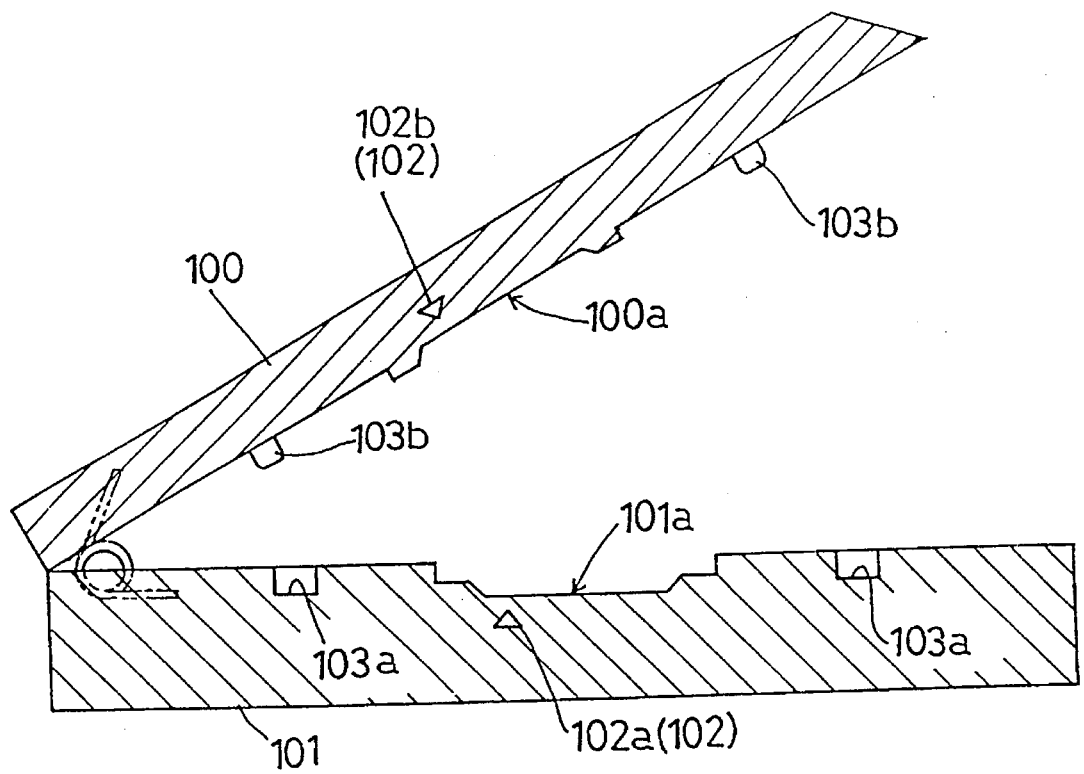
FIG. 41 is a view illustrating a construction and functions (showing an opened condition) of a conventional transporting apparatus.
Figure 42:
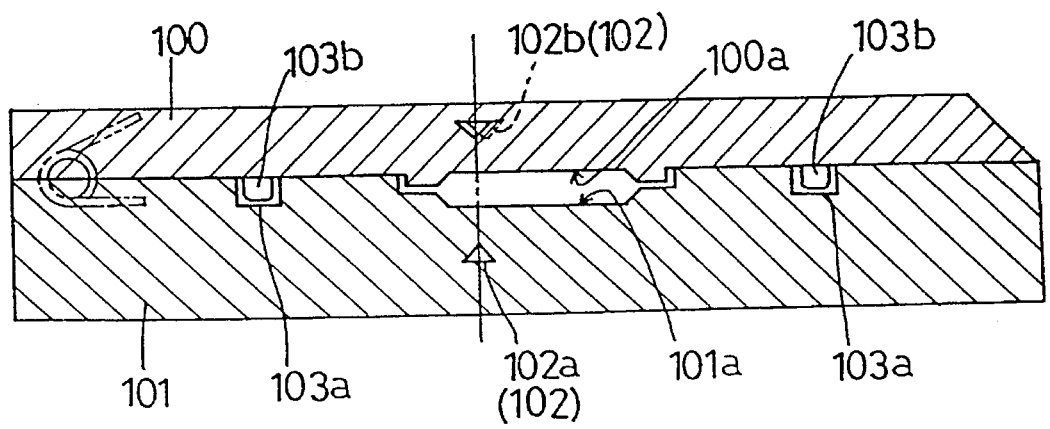
FIG. 42 is a view illustrating the construction and functions (showing a closed condition) of the conventional transporting apparatus.

In the signal shown in FIG. 40(c), the frames 2A, 2B, 2C, 2E, 2F exposed under the normal exposure conditions have a predetermined width W0 corresponding to the frame pitch p; whereas, the frame 2D having the ambiguous density difference between the image area and the non-image area due to e.g. insufficient exposure has a width W1 of the L-level narrower than the width W0. Therefore, if such frame having ambiguous frame edge as this frame 2D is to be located at the processing position based on the signal of FIG. 40(c), there is high possibility that the frame of the film 2 will not be precisely located at the processing position. In such case, the confirmation of the stop position of the frame of the film 2 is particularly needed.

In the case of the frames having clear edges such as the frames 2A, 2B, 2C, 2E, 2F shown in FIG. 40(a), the stop position of the frame is possible by utilizing the upstream edge 29a and the downstream edge 29b of the opening 29. If the frame edge of the film 2 is displaced from the upstream edge 29a or downstream edge 29b relative to the transport direction, i.e. if the frame of the film 2 is not located at the proper position, by pressing a key K shown in FIG. 37, the film 2 is transported to bring the frame to the proper processing position. Then, with precise position of the frame of the film 2, the reading operation of the image information is effected by the image sensor 51.

In the case of the frame 2D shown in FIG. 40(a), its frame edge is ambiguous. So, it is difficult to confirm the stop position of this frame at the opening 29. Therefore, in such case, the stop position confirmation is effected by using the viewer portion 96. For instance, when the frame 2D is to be positioned at the processing position, the positioning of this frame 2D is effected by utilizing the upstreamly adjacent frame 2C.

That is, the confirmation is done by aligning the upstream edge of the frame 2C and the line 98a provided at the viewer portion 96. If the line 98a and the edge of the frame 2C are displaced from each other in the transport direction at the viewer portion 96, the key K is operated in the aforedescribed manner.

As described above, the film stop position confirming portions are provided in plurality at the scanner-section film transport unit U1'. Thus, confirmation of film stop has become possible by using either one or both of the film stop position confirming portions. Further, in effecting confirmation of film stop at the exposure-section film transport unit U2 too, this is possible in the same manner as at the scanner-section film transport unit U1'.

(23) In the above embodiment, the distance X1 between the first film stop confirming portion and the second film stop confirming portion is set to be equal to the frame pitch p. Instead, the object of the invention may be achieved as long as the distance comprises an integer multiple of the frame pitch p.

That is, the condition:

$$X1 = p \times N \ (N=1, 2, 3 \ldots \text{any integer})$$

must be satisfied to achieve the object.

Figure 38:
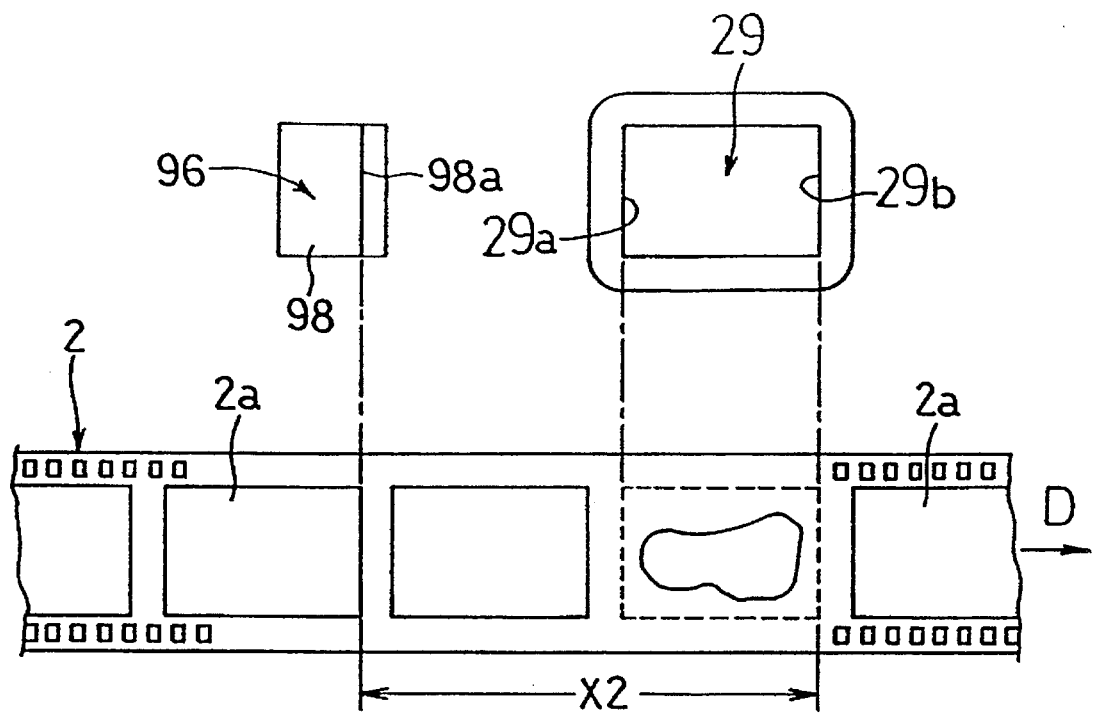
FIG. 38 is a schematic plane view of major portions of a still further embodiment of the present invention.

(24) In the above embodiment, at the viewer portion 96, the line 98a of the sheet 98 is to be aligned with the upstream edge of the film frame. Instead, as shown in FIG. 38, the line may be aligned with the downstream edge of the film frame. In FIG. 38, the distance X2 between the first film stop confirming portion and the second film stop confirming portion is set as: X2=p×2, using the downstream edge 29b of the opening 29 as the reference.

(25) In the above embodiment, the confirmation is effected by aligning the line 98a with the upstream edge of the film frame alone. Instead, it is also conceivable to provide the viewer portion 96 with a sheet having two lines, so that both the upstream and downstream frame edges are to be aligned with the same.

Figure 39:
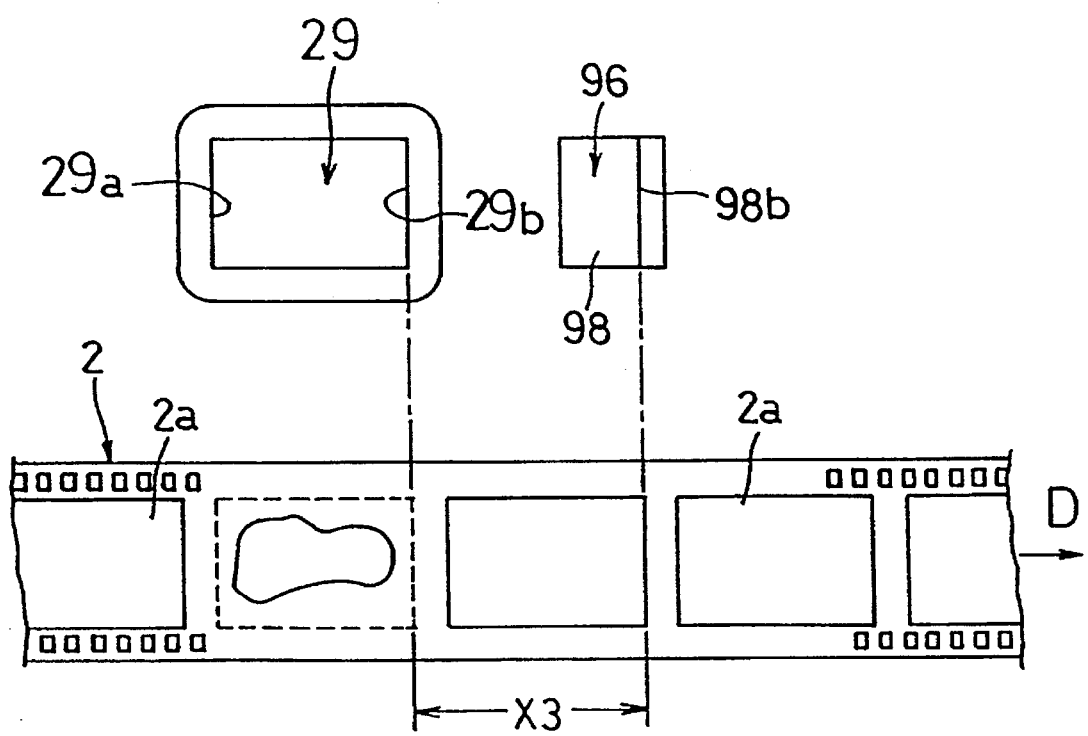
FIG. 39 is a schematic plane view of major portions of a still further embodiment of the present invention, FIGS. 40(a), (b), (c) are views illustrating film frame edges relating to the embodiments of FIGS. 32 through 39.

(26) In the above embodiment, the viewer portion 96 is disposed on the upstream side relative to the opening 29 in the film transport direction. Instead, as illustrated in FIG. 39, the viewer portion may be disposed on the downstream side. In FIG. 39, a distance X3 between the first film stop confirming portion 29a and the second film stop position confirming portion 29b is set to be equal to the frame pitch.

(27) In the above embodiment, the viewer 96 is provided at only one location. Instead, the same may be provided at more than two locations. For instance, an upstream viewer portion 96 and a downstream viewer portion 96' may be provided.

Further, in case the viewer portions are provided at more than two locations, a variety of modified constructions will be possible by providing two of the same on the upstream side of the opening 29 or on the downstream side of the same.

(28) In the above embodiment, the opening 29 for the scanner functions also as the first film stop position confirming portion. Instead, it is also conceivable to provide at the opening 29 with a sheet substantially same as that provided at the viewer portion 96.

Further, in the above embodiment, the second film stop position confirming portion at the viewer portion 96 comprises the sheet 98. Instead, this second film stop position confirming portion may comprise an opening provided at the viewer portion 96 formed in the same manner as the scanner opening.

(29) In the above embodiment, the introducing means for introducing the light to the viewer portion 96 comprises the reflecting plate 97. As a further example of the reflecting plate, a prism may be used in place of the mirror.

Further, the introducing means may comprise an optical fiber.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A film transporting apparatus for a film processing system, comprising:

a pair of frame members pivotably connected to each other to be opened and closed;

transport means provided to each of the frame members and operable to transport a film along a predetermined film transport passage when said frame members are closed;

an optical sensor for detecting film information including a light emitting portion provided in one of the frame members and a light receiving portion provided in the other frame member;

positioning engaging portions provided respectively to the frame members and coming into engagement with each other in association with a pivotal movement of the frame members to a closed state; and a movable frame member movably provided to one of said frame members, said movable frame member supporting said positioning engaging portions and said light emitting portion of said light receiving portion, said movable frame member allowing relative movement between said positioning engaging portions provided respectively to said pair of frame members.

2. A film transporting apparatus as claimed in claim 1, wherein said transport means provided to the frame member attached with the movable frame member is supported to said movable frame member.

3. A film transporting apparatus as claimed in claim 2, wherein said movable frame member is supported to said frame member via a pin having one end thereof secured to said frame member and urging means, said pin having a large-diameter head portion thereof retained to said movable frame, said urging means urging said frame member and said movable frame in a direction away from each other.

4. A film transporting apparatus as claimed in claim 2, further comprising:

film loop forming means provided to said movable frame for forming and accumulating the film transported by said transport means until an exposure operation of the film.

5. A film transporting apparatus as claimed in claim 1, wherein said light emitting portion and said light receiving portion are disposed on one side and the other side of the film at positions facing perforation portions of the film to be transported by the transport means, so that the transportation of the film is controlled with detecting movement of the perforations based on an output signal from said light receiving portion.

6. A film transporting apparatus as claimed in claim 5, wherein on an optical path extending between the light receiving portion and the light emitting portion and between the light receiving portion and the film face, there is interposed a lens having an aperture angle thereof restricted in such a manner as to allow passage of only a portion of the light beam traveling through the perforation portions of the film toward the light receiving portion.

7. A film transporting apparatus as claimed in claim 6, wherein said lens comprises a rod type lens to allow an image of the film face to be formed on the light receiving portion.

8. A film transporting apparatus as claimed in claim 7, wherein said light receiving portion, said light emitting portion and said lens are disposed within an integral processing unit including said transport means and an opening for processing the film.

9. A film transporting apparatus as claimed in claim 8, wherein a binary signal is generated by comparing the output signal from the light receiving portion with a reference signal and the perforation edge is detected based on said binary signal.

10. A film processing system comprising:

a film transporting apparatus including;

a pair of frame members pivotably connected to each other to be opened and closed.

transport means provided to each of the frame members and operable to transport a film along a predetermined film transport passage when said frame members are closed, an optical sensor for detecting film information including a light emitting portion provided in one of the frame members and a light receiving portion provided in the other frame member, positioning engaging portions provided respectively to the frame members and coming into engagement with each other in association with a pivotal movement of the frame members to a closed state, and a movable frame member movably provided to one of said frame members, said movable frame member supporting said positioning engaging portions and said light emitting portion or said light receiving portion, said movable frame member allowing relative movement between said positioning engaging portions provided respectively to said pair of frame members;

a scanner section for detecting the image information of the film; and an exposure section for exposing the image information of the film onto a photosensitive material.

11. A film processing system as claimed in claim 10, further comprising:

a scanner-section film transport unit for transporting the film in said scanner section for detecting the image information of the film; and an exposure-section film transport unit provided separately from said scanner-section film transport unit and adapted for transporting the film in said exposure section;

wherein said scanner-section film transport unit and said exposure-section film transport unit are independently switchable between a set state where said either film transport unit is set to a film transporting position thereof and a retracted state where said film transport unit is retracted away from said film transporting position.

12. A film processing system as claimed in claim 11, wherein said exposure-section film transport unit may be set to the film transporting position either with a posture for transporting the film in a direction identical to a film transporting direction of said scanner-section film transport unit or with a further posture for transporting the film in a direction transverse to the film transporting direction of said scanner-section film transport unit.

13. A film processing system as claimed in claim 12, wherein an auxiliary unit including a film holder and a guide frame for guiding the film holder selectively to either the scanner section or the exposure section may be set to said film processing system when said two film transport units are retracted to the respective retracted states.

14. A film processing system comprising:
a film transporting apparatus including;
a pair of frame members pivotably connected to each other to be opened and closed,
transport means provided to each of the frame members and operable to transport a film along a predetermined film transport passage when said frame members are closed,
an optical sensor for detecting film information including a light emitting portion provided in one of the frame members and a light receiving portion provided in the other frame member,
positioning engaging portions provided respectively to the frame members and coming into engagement with each other in association with a pivotal movement of the frame members to a closed state, and
a movable frame member movably provided to one of said frame members, said movable frame member supporting said positioning engaging portions and said light emitting portion or said light receiving portion, said movable frame member allowing relative movement between said positioning engaging portions provided respectively to said pair of frame members;
film processing means for effecting a detecting or printing operation of image information of the film by irradiating the frame located at the processing position with a light source;
wherein an index for indicating a proper position of the frame located at said processing position in a film transport direction is disposed out of an optical path from said light source through said frame to a light receiving portion and in such a condition as to allow a visual confirmation thereof together with said frame located at said processing position as viewed from the outside said optical path to said processing position.

15. A film processing system as claimed in claim 14, wherein said film processing system is rendered capable of processing films having different frame lengths relative to the film transport direction, and said index includes a first index portion for a film having a long frame length relative to the film transport direction, said first index portion being positioned closer to said light receiving portion than to said film frame located at said processing position and covering the film and including an opening through which said frame is exposed and a second index portion for a further film having a short frame length relative to the film transport direction, said second index portion being positioned closer to said light source than to said film frame located at said processing position and allowing a visual confirmation thereof through said opening with said frame in an overlapping manner.

16. A film processing system as claimed in claim 14, further comprising:
opening varying means for varying the dimension of an opening of an exposure opening for exposing the film frame located at an exposure printing position.

17. A film processing system as claimed in claim 16, wherein said opening varying means includes;
a first light shielding member pivotable about a first axis extending parallel to a film transport surface,
a first gear rotatable with said first light shielding member,
a second light shielding member pivotable about a second axis extending parallel to said first axis,
a second gear rotatable with said second light shielding member and meshing with said first gear, and
drive means to be connected to said first light shielding member, so that said opening dimension is varied with drive of said drive means.

18. A film processing system as claimed in claim 17, wherein said drive means drives the first light shielding member and the second shielding member in such a manner that said first and second shielding members are driven to switch the opening dimension between a first opening dimension having a predetermined area and a second opening dimension having an area smaller than said first opening dimension; and
when the opening dimension is switched to said second opening dimension, a first contact portion provided to said first light shielding member and a second contact portion provided to said second light shielding member come into contact with each other to determine the magnitude of said second opening dimension.

19. A film processing system as claimed in claim 18, wherein said first light shielding member and said first gear are formed integrally to each other and said second light shielding member and said second gear are formed integrally to each other.

20. A film processing system as claimed in claim 19, wherein said first light shielding member and said second light shielding member are formed of a same material.

21. A film processing system as claimed in claim 20, wherein said first axis and said second axis are disposed away from said film transport surface and an inter-axial distance between said first axis and said second axis is set shorter than a shorter dimension of said opening.

22. A film processing system comprising:
a film transporting apparatus including;
a pair of frame members pivotably connected to each other to be opened and closed,
transport means provided to each of the frame members and operable to transport a film along a predetermined film transport passage when said frame members are closed,
an optical sensor for detecting film information including a light emitting portion provided in one of the frame members and a light receiving portion provided in the other frame member,
positioning engaging portions provided respectively to the frame members and coming into engagement with each other in association with a pivotal movement of the frame members to a closed state, and
a movable frame member movably provided to one of said frame members, said movable frame member supporting said positioning engaging portions and said light emitting portion or said light receiving portion, said movable frame member allowing relative movement between said positioning engaging portions provided respectively to said pair of frame members;

film processing means for effecting a detecting or printing operation of image information of the film by irradiating the frame located at the processing position with a light source;

a first film stop position confirming portion for indicating, at said processing position, a proper position of an edge portion of the film frame extending normal to a transporting direction of the film; and a second film stop position confirming portion for indicating, at a position apart by a predetermined distance from said first film stop position confirming portion in the film transporting direction, an edge portion of a film frame other than said frame located at said processing position, said edge portion extending normal to the film transporting direction.

23. A film processing system as claimed in claim 22, further comprising:

introducing means for introducing the irradiation light from the light source to said second film stop position confirming portion.

24. A film processing system as claimed in claim 23, further comprising:

a mirror tunnel for uniformly mixing the irradiation light from the light source and irradiating the frame located at the processing position, and wherein said introducing means guides a portion of said irradiation light from said mirror tunnel to said second film stop position confirming portion.

* * * * *